(12) United States Patent
Hart et al.

(10) Patent No.: US 12,422,604 B2
(45) Date of Patent: Sep. 23, 2025

(54) HARDENED OPTICAL WINDOWS FOR LIDAR APPLICATIONS AT 850-950NM

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Charles Andrew Paulson, Painted Post, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 888 days.

(21) Appl. No.: 17/616,008

(22) PCT Filed: May 29, 2020

(86) PCT No.: PCT/US2020/035034
§ 371 (c)(1),
(2) Date: Dec. 2, 2021

(87) PCT Pub. No.: WO2020/247245
PCT Pub. Date: Dec. 10, 2020

(65) Prior Publication Data
US 2022/0317353 A1     Oct. 6, 2022

Related U.S. Application Data

(60) Provisional application No. 62/857,507, filed on Jun. 5, 2019.

(51) Int. Cl.
*G02B 5/28* (2006.01)
*C03C 17/34* (2006.01)
(Continued)

(52) U.S. Cl.
CPC .......... *G02B 5/281* (2013.01); *C03C 17/3435* (2013.01); *G01S 7/4811* (2013.01); *G01S 17/931* (2020.01); *C03C 2217/734* (2013.01)

(58) Field of Classification Search
None
See application file for complete search history.

(56) References Cited

U.S. PATENT DOCUMENTS 5,398,133 A    3/1995  Tsai et al.
8,619,021 B2  12/2013  Hayton
(Continued)

FOREIGN PATENT DOCUMENTS

CN  101369015 A  2/2009
CN  107735697 A  2/2018
(Continued)

OTHER PUBLICATIONS

Oliver et al., "Measurement of Hardness and Elastic Modulus by Instrument Indentation: Advances in Understanding and Refinements to Methodology", J. Mater. Res., vol. 19, No. 1, 2004, pp. 3-20.
(Continued)

*Primary Examiner* — Toan Ton
*Assistant Examiner* — Danell L Owens
(74) *Attorney, Agent, or Firm* — Daniel J. Greenhalgh

(57) ABSTRACT

A window for a sensing system is provided. The window includes a substrate having a predetermined thickness and an index of refraction for electromagnetic radiation having a wavelength of 905 nm and a layered film disposed on the substrate, the layered film including alternating layers of a high refractive index material and a lower refractive index material, the high refractive index material having a higher refractive index than the lower refractive index material, wherein each layer of the alternating layers of the layered
(Continued)

film has a thickness, and the thicknesses of the alternating layers are configured so that the window has a transmittance of at least 80% for electromagnetic radiation having a wavelength within the range of 850 nm to 950 nm. The window further includes a hardness of at least 10 GPa, at the layered film, as measured by the Berkovich Indenter Hardness Test.

19 Claims, 39 Drawing Sheets

(51) Int. Cl.
    *G01S 7/481*     (2006.01)
    *G01S 17/931*     (2020.01)

(56) References Cited

U.S. PATENT DOCUMENTS

| | | | |
|---|---|---|---|
| 9,023,457 B2 | 5/2015 | Carrilero et al. | |
| 9,079,802 B2 | 7/2015 | Bellman et al. | |
| 9,140,543 B1 | 9/2015 | Allan et al. | |
| 9,335,444 B2 | 5/2016 | Hart et al. | |
| 9,359,261 B2 | 6/2016 | Bellman et al. | |
| 9,366,784 B2 | 6/2016 | Bellman et al. | |
| 9,411,180 B2 | 8/2016 | Gollier et al. | |
| 9,573,842 B2 | 2/2017 | Gollier et al. | |
| 9,582,098 B2 | 2/2017 | Rosenberg et al. | |
| 9,701,579 B2 | 7/2017 | Gollier et al. | |
| 9,869,754 B1 | 1/2018 | Campbell et al. | |
| 10,288,973 B1 | 5/2019 | Gupta et al. | |
| 10,620,344 B2 | 4/2020 | Hart et al. | |
| 10,919,473 B2 | 2/2021 | Bhatia et al. | |
| 10,948,640 B2 | 3/2021 | Ockenfuss et al. | |
| 2014/0335330 A1 | 11/2014 | Bellman et al. | |
| 2018/0314368 A1 | 11/2018 | Isaacson et al. | |
| 2018/0321425 A1* | 11/2018 | Hart | G06F 3/0604 |
| 2018/0373913 A1 | 12/2018 | Panchawagh et al. | |
| 2019/0285784 A1* | 9/2019 | Ockenfuss | G02B 5/285 |
| 2021/0181382 A1 | 6/2021 | Gregorski et al. | |
| 2022/0206201 A1 | 6/2022 | Sugihara et al. | |
| 2022/0274368 A1 | 9/2022 | Burdette et al. | |
| 2022/0299606 A1 | 9/2022 | Hart et al. | |
| 2022/0317353 A1 | 10/2022 | Hart et al. | |

FOREIGN PATENT DOCUMENTS

| | | |
|---|---|---|
| CN | 109270617 A | 1/2019 |
| CN | 109485271 A | 3/2019 |
| CN | 110218006 A | 9/2019 |
| CN | 213210526 U | 5/2021 |
| EP | 2196870 A1 | 6/2010 |
| JP | 2020076990 A * | 5/2020 |
| WO | 2018/015312 A1 | 1/2018 |
| WO | 2018/178286 A1 | 10/2018 |
| WO | 2019/027526 A2 | 2/2019 |
| WO | 2019/058834 A1 | 3/2019 |
| WO | 2020/247292 A1 | 12/2020 |
| WO | 2023/167837 A1 | 9/2023 |
| WO | 2024/015094 A2 | 1/2024 |

OTHER PUBLICATIONS

Oliver et al., "An improved technique for determining hardness and elastic modulus using load and displacement sensing indentation experiments", J. Mater. Res., vol. 7, No. 6, 1992, pp. 1564-1583.
Williams, "Optimization of eyesafe avalanche photodiode lidar for automobile safety and autonomous navigation systems", Optical Engineering, vol. 56(3), 2017, 10 pages.
Chinese Patent Application No. 202080041361.4, Office Action dated Jan. 30, 2024, 4 pages (English Translation only), Chinese Patent Office.
Maniyara, R. et al., "An antireflection transparent conductor with ultralow optical loss(<2%) and electrical resistance (<sq-1)", Nature Communications, vol. 7, Art. No. 13771 (2016), 8 pages.
International Search Report and Written Opinion of the International Searching Authority; PCT/US2020/035034; dated Oct. 12, 2020; 10 pages; European Patent Office.

* cited by examiner

HARDENED OPTICAL WINDOWS FOR LIDAR APPLICATIONS AT 850-950NM

CROSS-REFERENCE TO RELATED APPLICATIONS

This application claims the benefit of priority under 35 U.S.C. § 371 of International Application No. PCT/US2020/035034, filed on May 29, 2020, which claims the benefit of priority under 35 U.S.C. § 119 of U.S. Provisional Application Ser. No. 62/857,507 filed on Jun. 5, 2019 the content of which are relied upon and incorporated herein by reference in their entirety.

BACKGROUND

Light detection and ranging ("LIDAR") systems include a laser and a sensor. The laser emits a laser beam, which may reflect off an object, and the sensor detects the reflected laser beam. The laser beams are pulsed or otherwise distributed across a radial range to detect objects across a field of view. Information about the object can be deciphered from the properties of the detected reflected laser beam. Distance of the object from the laser beam can be determined from the time of flight from emission of the laser beam to detection of the reflected laser beam. If the object is moving, path and velocity of the object can be determined from shifts in radial position of the emitted laser beam being reflected and detected as a function of time, as well as from Doppler frequency measurements.

Vehicles are a potential application for LIDAR systems, with the LIDAR systems providing spatial mapping capability to enable assisted, semi-autonomous, or fully autonomous driving. Conventionally, the laser emitter and sensor are mounted on the roof of the vehicle or on a low forward portion of the vehicle. Lasers emitting electromagnetic radiation having a wavelength outside the range of visible light, such as at or near 905 nm or 1550 nm are considered for vehicle LIDAR applications. To protect the laser and sensor from impact from rocks and other objects, a window is placed between the laser and sensor, and the external environment in the line of sight of the laser and sensor. However, there is a problem in that impacting rocks and other objects scratch and cause other types of damage to the window, which cause the window to scatter the emitted and reflected laser beams, thus impairing the effectiveness of the LIDAR system.

SUMMARY

The present disclosure provides a layered film for a window that includes one or more layers of material that provides hardness and scratch resistance to the window. The layered film further includes alternating layers of materials having different indices of refraction (including the material providing the hardness and scratch resistance), such that the number of alternating layers and their thicknesses can be configured so that the window has high transmittance and low reflection of the 905 nm wavelength (and surrounding wavelengths). The number of alternating layers and their thicknesses can further be configured so that the window has low transmittance and high reflection of the visible light wavelengths.

According to an embodiment of the present disclosure a window for a sensing system is provided. The window includes a substrate having a predetermined thickness and an index of refraction for electromagnetic radiation having a wavelength of 905 nm and a layered film disposed on the substrate, the layered film comprising alternating layers of a high refractive index material and a lower refractive index material, the high refractive index material having a higher refractive index than the lower refractive index material, wherein each layer of the alternating layers of the layered film has a thickness, and the thicknesses of the alternating layers are configured so that the window has a transmittance of at least 80% for electromagnetic radiation having a wavelength within the range of 850 nm to 950 nm. The window further includes a hardness of at least 10 GPa, at the layered film, as measured by the Berkovich Indenter Hardness Test.

According to another embodiment of the present disclosure, a window for a sensing system is provided. The window includes a glass substrate having a predetermined thickness and an index of refraction for electromagnetic radiation having a wavelength of 905 nm and a layered film disposed on the glass substrate, the layered film including a quantity of at least seven alternating layers of $Si_3N_4$ and $SiO_2$, the layers of $Si_3N_4$ having a higher refractive index than the layers of $SiO_2$, wherein each layer of the alternating layers of the layered film has a thickness, and the thicknesses of the alternating layers are configured so that the window has a transmittance of at least 80% for electromagnetic radiation having a wavelength within the range of 850 nm to 950 nm. The window further includes a hardness of at least 8 GPa, at the layered film, as measured by the Berkovich Indenter Hardness Test.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
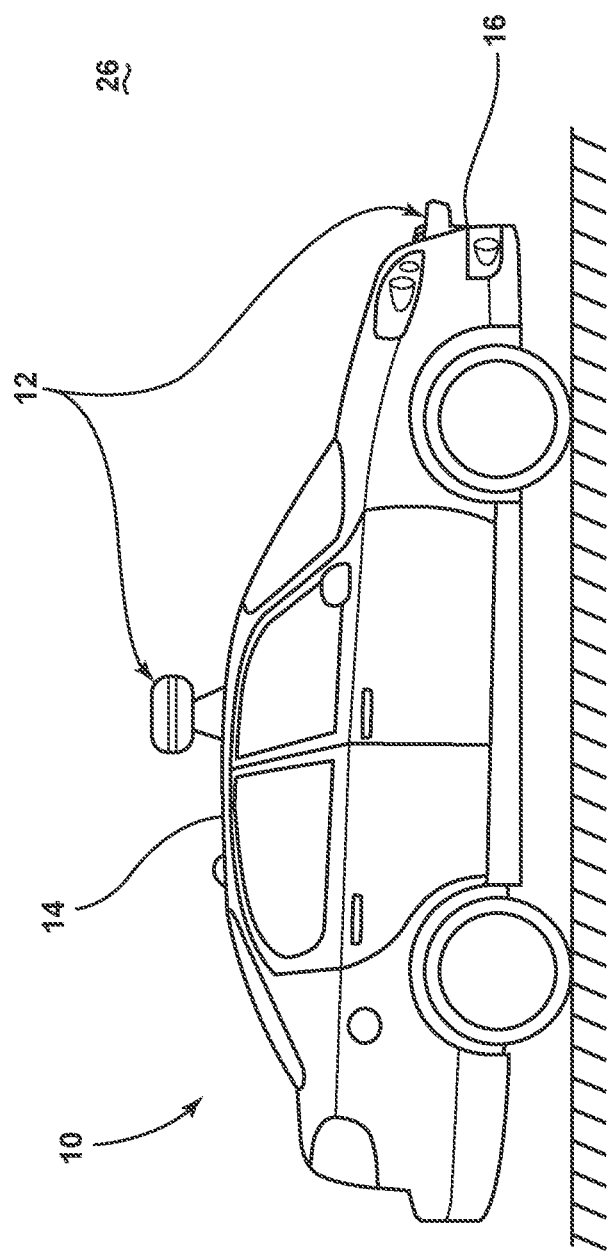
FIG. 1 is a side view of a vehicle having a LIDAR system mounted on a roof of the vehicle and a LIDAR system mounted on a forward portion of the vehicle.

Reference will now be made in detail to the present embodiments, examples of which are illustrated in the accompanying drawings. Whenever possible, the same reference numerals will be used throughout the drawings to refer to the same or like parts.

Referring now to FIG. 1, a vehicle 10 includes one or more LIDAR systems 12. The one or more LIDAR systems 12 can be disposed anywhere on or within the vehicle 10. For example, the one or more LIDAR systems 12 can be disposed on a roof 14 of the vehicle 10 and/or a forward portion 16 of the vehicle 10.

Figure 2:
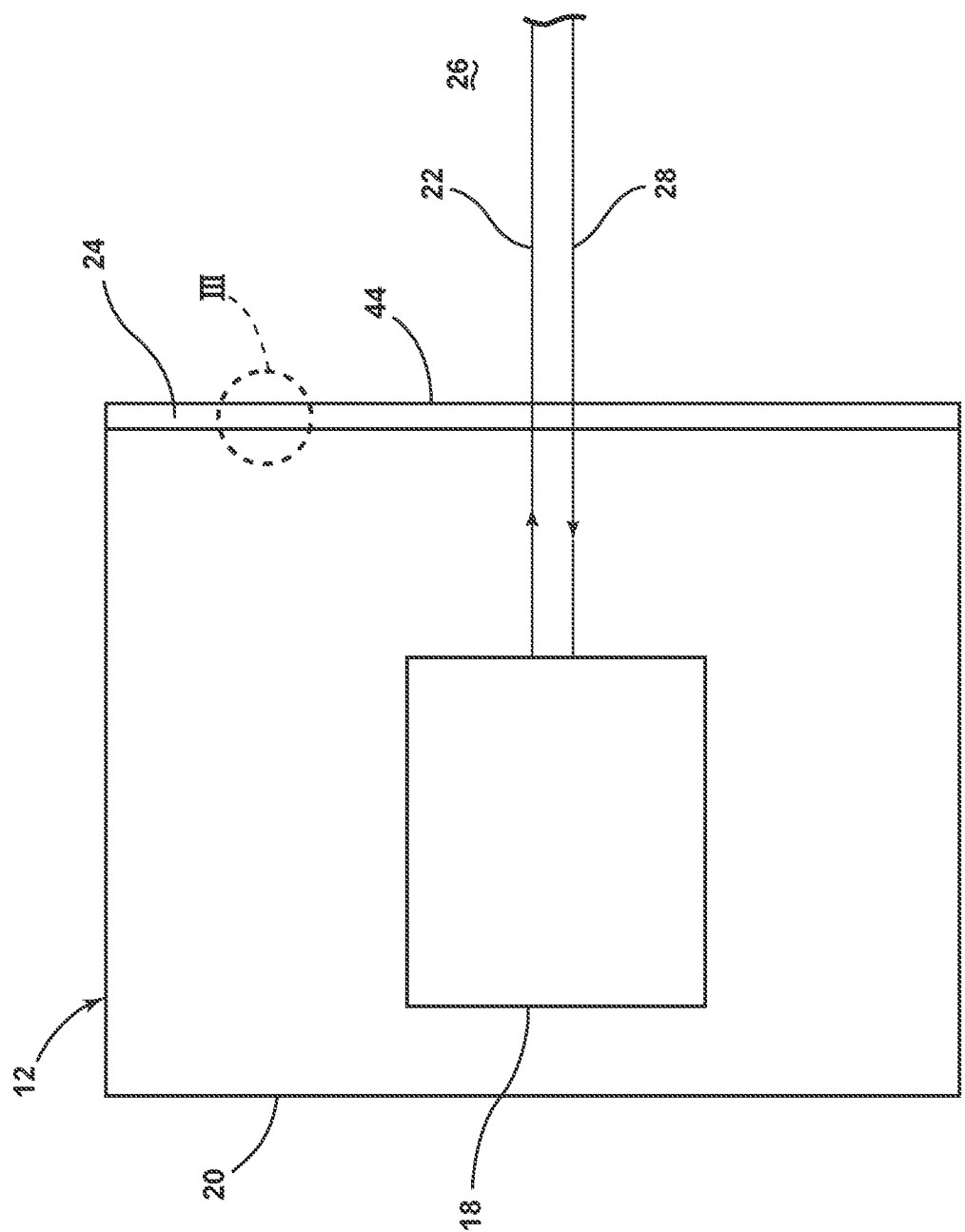
FIG. 2 is a conceptual view of one of the LIDAR systems of FIG. 1, illustrating an electromagnetic radiation emitter and sensor emitting electromagnetic radiation through a window, which is reflected off of an object as reflected radiation that proceeds back through the window to be sensed by the electromagnetic radiation emitter and sensor.

Referring now to FIG. 2, each of the one or more LIDAR systems 12 include an electromagnetic radiation emitter and sensor 18, as known in the art, which may be enclosed in an enclosure 20. The electromagnetic radiation emitter and sensor 18 emits electromagnetic radiation 22 having a wavelength or range of wavelengths. The emitted radiation 22 exits the enclosure 20 through a window 24. If an object (not illustrated) in an external environment 26 is in the path of the emitted radiation 22, the emitted radiation 22 will reflect off of the object and return to the electromagnetic radiation emitter and sensor 18 as reflected radiation 28. The reflected radiation 28 again passes through the window 24 to reach the electromagnetic radiation emitter and sensor 18. In embodiments, the emitted radiation 22 and the reflected radiation 28 have a wavelength of 905 nm or 1550 nm or a range including either the 905 nm or 1550 nm wavelengths. Electromagnetic radiation other than the reflected radiation 28 (such as electromagnetic radiation having wavelengths in the visible spectrum) may or may not pass through the window 24, depending on the optical properties of the window 24 as described herein. As used herein, the term "visible spectrum" is used to refer to the portion of the electromagnetic spectrum that is visible to the human eye and generally refers to electromagnetic radiation having a wavelength within the range of about 380 nm to 700 nm.

Figure 3:
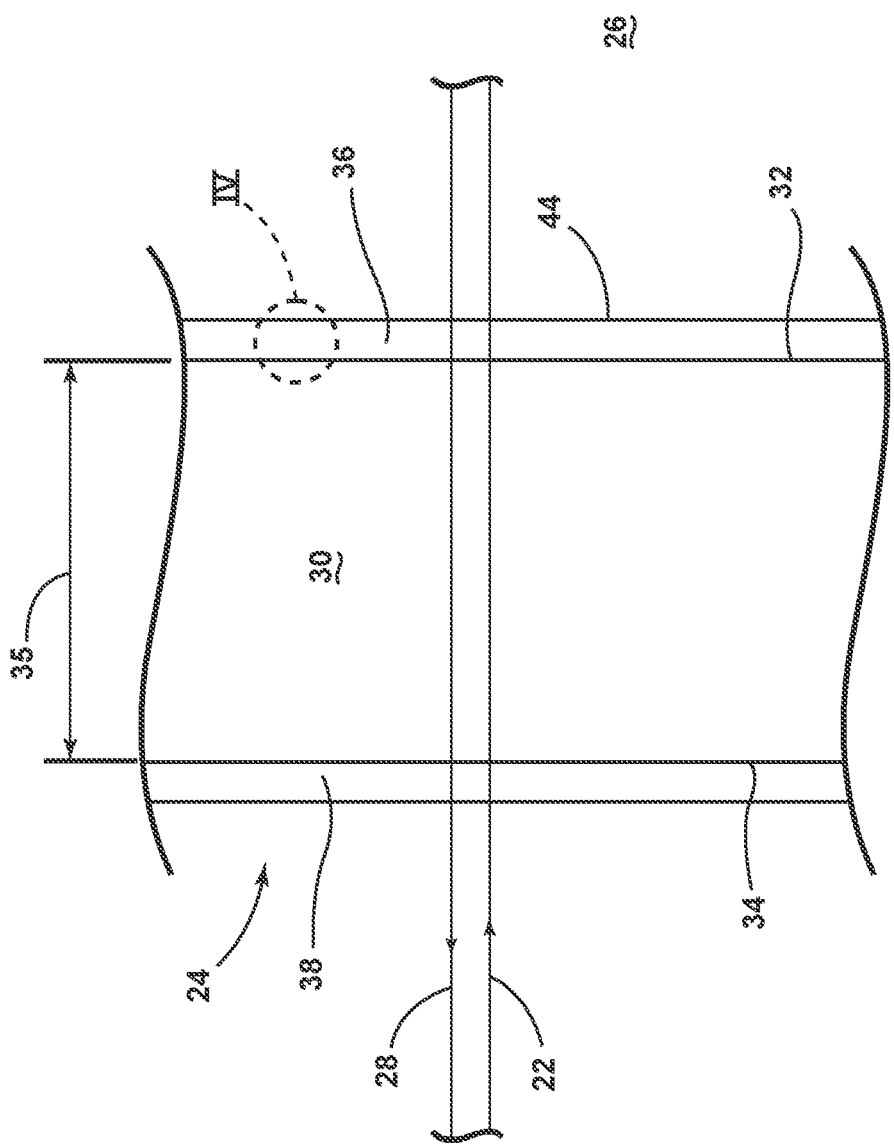
FIG. 3 is a cross-sectional view of area III of FIG. 2, illustrating the window of FIG. 2 having a glass substrate with a first surface and a second surface that encounters the emitted radiation before the first surface, and a layered film over the first surface and optionally over the second surface.

Referring now to FIG. 3, the window 24 for each of the one or more LIDAR systems 12 includes a substrate 30. The substrate 30 includes a first surface 32 and a second surface 34. The first surface 32 and the second surface 34 are the primary surfaces of the substrate 30. The first surface 32 is closest to the external environment 26. The second surface 34 is closest to the electromagnetic radiation emitter and sensor 18. The emitted radiation 22 encounters the second surface 34 before the first surface 32. The reflected radiation 28 encounters the first surface 32 before the second surface 34. The substrate 30 further includes a layered film 36 disposed on the first surface 32 of the substrate 30, and, in some embodiments, a second layered film 38 is disposed on the second surface 34 of the substrate 30.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) between the disposed material and the surface. The intervening material(s) may constitute a layer, as defined herein.

The substrate 30 can be a glass substrate. The glass substrate can have a composition of soda lime glass, alkali aluminosilicate glass, alkali containing borosilicate glass and alkali aluminoborosilicate glass, although other glass compositions are contemplated. Such glass compositions are capable of being chemically strengthened by an ion exchange process. In some variants, the composition may be free of lithium ions.

An alkali aluminosilicate glass composition suitable for the substrate 30 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma_{modifiers}$ (i.e., sum of modifiers) is greater than 1, wherein the ratio of the components are expressed in mol. % and the modifiers are alkali metal oxides. This composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma_{modifiers}$ (i.e., sum of modifiers) is greater than 1.

Another suitable alkali aluminosilicate glass composition for the substrate 30 comprises: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % $MgO$; and 0-5 mol. % $CaO$, wherein: 66 mol. %≤$SiO_2+B_2O_3+CaO$≤69 mol. %; $Na_2O+K_2O+B_2O_3+MgO+CaO+SrO$>10 mol. %; 5 mol. %≤$MgO+CaO+SrO$≤8 mol. %; $(Na_2O+B_2O_3)-Al_2O_3$≤2 mol. %; 2 mol. %≤$Na_2O-Al_2O_3$≤6 mol. %; and 4 mol. %≤$(Na_2O+K_2O)-Al_2O_3$≤10 mol. %.

Another suitable alkali aluminosilicate glass composition for the substrate 30 comprises: 2 mol. % or more of $Al_2O_3$ and/or $ZrO_2$, or 4 mol. % or more of $Al_2O_3$ and/or $ZrO_2$.

One example glass composition comprises $SiO_2$, $B_2O_3$ and $Na_2O$, where $(SiO_2+B_2O_3)$≥66 mol. %, and $Na_2O$≥9 mol. %. In an embodiment, the composition includes at least 6 wt. % aluminum oxide. In a further embodiment, the composition includes at least 5 wt. % alkaline earth oxides. Suitable compositions, in some embodiments, further comprise at least one of $K_2O$, $MgO$, and $CaO$. In a particular embodiment, the composition of the substrate 30 comprises 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % $MgO$; and 0-3 mol. % $CaO$.

A further example composition suitable for the substrate 30 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % $MgO$; 0-10 mol. % $CaO$; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤$(Li_2O+Na_2O+K_2O)$≤20 mol. % and 0 mol. %≤$(MgO+CaO)$≤10 mol. %.

A still further example glass composition suitable for the substrate 30 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % $MgO$; 0-2.5 mol. % $CaO$; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤$(Li_2O+Na_2O+K_2O)$≤18 mol. % and 2 mol. %≤$(MgO+CaO)$≤7 mol. %.

The substrate 30 may be substantially planar or sheet-like, although other embodiments may utilize a curved or otherwise shaped or sculpted substrate. The length and width of the substrate 30 can vary according to the dimensions required for the window 24. The substrate 30 can be formed using various methods such as float glass processes and down-draw processes such as fusion draw and slot draw. The substrate 30 can be used in a non-strengthened state.

The glass forming the substrate 30 can be modified to have a region contiguous with the first surface 32 and/or a region contiguous with the second surface 34 to be under compressive stress ("CS"). In such a circumstance, the region(s) under compressive stress extends from the first surface 32 and/or the second surface 34 to a depth(s) of compression. This generation of compressive stress further creates a central region that is under a tensile stress, having a maximum value at the center of the central region, referred to as central tension or center tension (CT). The central region extends between the depths of compression and is under tensile stress. The tensile stress of the central region balances or counteracts the compressive stresses of the regions under compressive stress. As used herein, the terms "depth of compression" and "DOC" refer to the depth at which the stress within the substrate 30 changes from compressive to tensile stress. At the depth of compression, the stress crosses from a positive (compressive) stress to a negative (tensile) stress and thus has a value of zero. The depth of compression protects the substrate 30 from the propagation of flaws introduced by sharp impact to the first and/or second surfaces 32, 34 of the substrate 30, while the compressive stress minimizes the likelihood of a flaw growing and penetrating through the depths of compression. In embodiments, the depths of compression are each at least 20 µm. In embodiments, the absolute value of the maximum compressive stress CS within the regions is at least 200 MPa, up to about 400 MPa, or up to about 1000 MPa. In embodiments, the absolute value of the maximum compressive stress within the regions is at least 600 MPa.

Two methods for extracting detailed and precise stress profiles (stress as a function of depth) for a substrate 30 with regions under compressive stress are disclosed in U.S. Pat. No. 9,140,543, entitled "Systems and Methods for Measuring the Stress Profile of Ion-Exchanged Glass, filed by Douglas Clippinger Allan et al. on May 3, 2012, and claiming priority to U.S. Provisional Patent Application No. 61/489,800, having the same title, and filed on May 25, 2011, the contents of which are incorporated herein by reference in their entirety.

In embodiments, generating the region(s) of the substrate 30 that is/are under compressive stress includes subjecting the substrate 30 to an ion-exchange chemical tempering process (chemical tempering is often referred to as "chemical strengthening"). In the ion-exchange chemical tempering process, ions at or near the first and second surfaces 32, 34 of the substrate 30 are replaced by—or exchanged with—larger ions usually having the same valence or oxidation state. In those embodiments in which the substrate 30 comprises, consists essentially of, or consists of an alkali aluminosilicate glass, an alkali borosilicate glass, an alkali aluminoborosilicate glass, or an alkali silicate glass, ions in the surface layer of the glass and the larger ions are monovalent alkali metal cations, such as $Na^+$ (when $Li^+$ is present in the glass), $K^+$, $Rb^+$, and $Cs^+$. Alternatively, monovalent cations in, at, or near the first and second surfaces 32, 34 may be replaced with monovalent cations other than alkali metal cations, such as $Ag^+$ or the like.

In embodiments, the ion-exchange process is carried out by immersing the substrate 30 in a molten salt bath containing the larger ions to be exchanged with the smaller ions in the substrate 30. It will be appreciated by those skilled in the art that parameters for the ion-exchange process, including, but not limited to, bath composition and temperature, immersion time, the number of immersions of the glass in a salt bath (or baths), use of multiple salt baths, and additional steps such as annealing, washing and the like, are generally determined by the composition of the substrate 30 and the desired depths of compression and compressive stress of the substrate 30 that result from the strengthening operation. By way of example, ion-exchange of alkali metal-containing glass substrates may be achieved by immersion in at least one molten bath containing a salt such as, but not limited to, nitrates, sulfates, and chlorides of the larger alkali metal ion. In embodiments, the molten salt bath comprises potassium nitrate (0-100 wt %), sodium nitrate (0-100 wt %), and lithium nitrate (0-12 wt %), the combined potassium nitrate and sodium nitrate having a weight percentage within the range of 88 wt % to 100 wt %. In embodiments, the temperature of the molten salt bath typically is in a range from about 350° C. up to about 500° C., while immersion times range from about 15 minutes up to about 40 hours, including from about 20 minutes to about 10 hours. However, temperatures and immersion times different from those described above may also be used. The substrate 30 may be acid polished or otherwise treated to remove or reduce the effect of surface flaws.

The substrate 30 has a thickness 35 defined as the shortest straight-line distance between the first surface 32 and the second surface 34. In embodiments, the thickness 35 of the substrate 30 is between about 100 μm and about 5 mm. The substrate 30, according to one or more embodiments, can have a physical thickness 35 ranging from about 100 μm to about 500 μm (e.g., 100, 200, 300, 400, or 500 μm). In other embodiments, the thickness 35 ranges from about 500 μm to about 1000 μm (e.g., 500, 600, 700, 800, 900, or 1000 μm). The thickness 35 may be greater than about 1 mm (e.g., about 2, 3, 4, or 5 mm). In one or more specific embodiments, the thickness 35 is 2 mm or less or less than 1 mm A commercially available composition suitable for the substrate 30 is Gorilla® Glass (Corning code #5318 having a CS of about 850 MPa, and a DOC of about 40 microns, and a thickness 35 of 1.0 millimeter (mm)).

Instead of glass, or in addition to glass, the substrate 30 can include or be a visible light absorbing, IR-transmitting material layer. Examples of such materials include infrared wavelength transmitting, visible wavelength absorbing, acrylic sheets such as those commercially available from ePlastics under the trade names Plexiglas® IR acrylic 3143 and CYRO's ACRYLITE® IR acrylic 1146. Plexiglas® IR acrylic 3143 has a transmittance of less than 1% (at least less than 10%) for electromagnetic radiation having wavelengths of about 700 nm or shorter (within the visible spectrum), but a transmittance of about 90% (above 85%) for wavelengths within the range of 800 nm to about 1100 nm (including 905 nm).

In one or more embodiments, the substrate 30 exhibits a refractive index in the range from about 1.45 to about 1.55. As used herein "refractive index" refers to the refractive index of the material (here, the substrate 30) for electromagnetic radiation having a wavelength of 905 nm. Here, "refractive index" and "index of refraction" are used synonymously.

Figure 4:
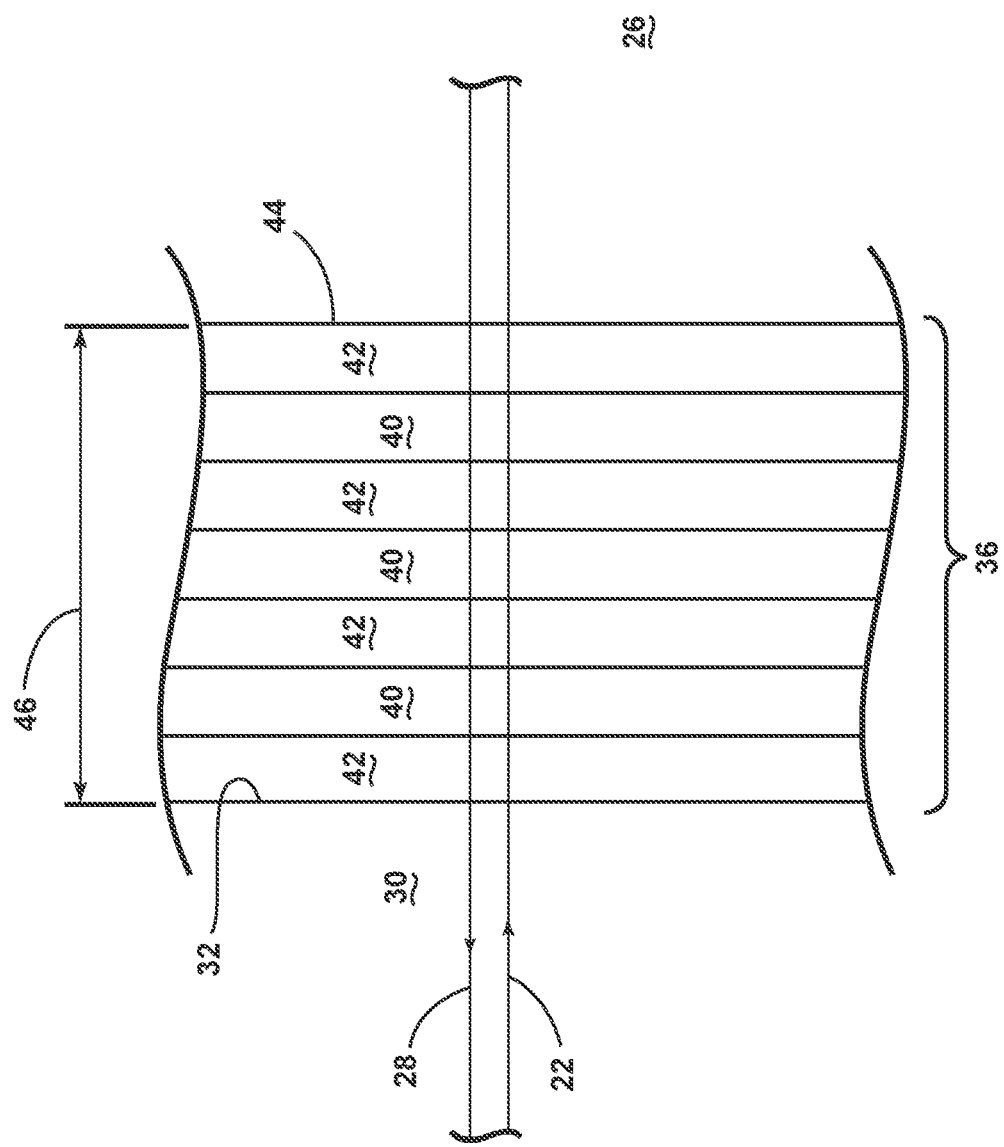
FIG. 4 is a cross-sectional view of area IV of FIG. 3, illustrating the layered film disposed on the first surface of the glass substrate including alternating layers of a high refractive index material and a lower refractive index material.

Referring now to FIG. 4, the layered film 36 (and the second layered film 38, if present) includes alternating layers of a high refractive index material 40 and a lower refractive index material 42. As used herein, the terms "high refractive index" and "lower refractive index" refer to the values of the refractive index relative to each other. In embodiments, the high refractive index material 40 has a refractive index from about 1.7 to about 3.0. In embodiments, the lower refractive index material 42 has a refractive index from about 1.3 to about 1.6. In other embodiments, the lower refractive index material 42 has a refractive index from about 1.3 to about 1.7, while the high refractive index material 40 has a refractive index from about 1.7 to about 2.5. The difference in the refractive index of the high refractive index material 40 and the lower refractive index material 42 may be about 0.10 or greater, 0.20 or greater, 0.3 or greater, 0.4 or greater, or even 0.5 or greater. Because of the difference in the refractive indices of the high refractive index material 40 and the lower refractive index material 42, manipulation of the number (quantity) of alternating layers and their thicknesses can cause selective transmission of electromagnetic radiation within a range of wavelengths through the layered film 36 and, separately, selective reflectance of electromagnetic radiation within a range of wavelengths off of the layered film 36. The layered film 36 is, and together with the second layered film 38 are, thus a thin-film optical filter having predetermined optical properties.

Some examples of suitable materials for use in or as the lower refractive index material 42 layer include $SiO_2$, $Al_2O_3$, $GeO_2$, $SiO$, $AlO_xN_y$, $SiO_xN_y$, $Si_uAl_xN_y$, $MgO$, $MgAl_2O_4$, $MgF_2$, $BaF_2$, $CaF_2$, $DyF_3$, $YbF_3$, $YF_3$, and $CeF_3$. The nitrogen content of the materials for use in or as the lower refractive index material 42 may be minimized (e.g., in materials such as $AlO_xN_y$, $SiO_xN_y$, and $Si_uAl_xO_xN_y$). For example, the nitrogen content can be less than 20 atom percent nitrogen, or less than 10 atom percent nitrogen, in materials such as $AlO_xN_y$, $SiO_xN_y$, and $Si_uAl_xO_xN_y$.

Some examples of suitable materials for use in or as the high refractive index material 40 include $SiN_x$, $AlN_x$, $Si_uAl_xO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$, and diamond-like carbon. The oxygen content of the materials for the high refractive index material 40 may be minimized, especially in $SiN_x$ or $AlN_x$, materials. $AlO_xN_y$ materials may be considered to be oxygen-doped $AlN_x$, that is they may have an $AlN_x$ crystal structure (e.g., wurtzite) and need not have an AlON crystal structure. Exemplary $AlO_xN_y$ materials for use in or as the high refractive index material 40 may comprise from about 0 atom % to about 20 atom % oxygen, or from about 5 atom % to about 15 atom % oxygen, while including 30 atom % to about 50 atom % nitrogen. Exemplary $Si_uAl_xO_xN_y$ for use in or as the high refractive index material 40 may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Because the refractive indices of the high refractive index material 40 and the lower refractive index material 42 are relative to each other, the same material (such as $Al_2O_3$) can be appropriate for the high refractive index material 40 depending on the refractive index of the material(s) chosen for the lower refractive index material 42, and can alternatively be appropriate for the lower refractive index material 42 depending on the refractive index of the material(s) chosen for the high refractive index material 40.

In embodiments, the lower refractive index material 42 is $SiO_2$, and the high refractive index material 40 is $Si_3N_4$. The layers of the high refractive index material 40 of $Si_3N_4$ show high hardness.

The number of alternating layers of the high refractive index material 40 and the lower refractive index material 42 is not particularly limited. In embodiments, the number of alternating layers within the layered film 36 is 7 or more, 9 or more, 11 or more, 21 or more, 31 or more, 51 or more, and 81 or more. In general, the greater the number of layers within the layered film 36 (and the second layered film 38, if utilized), the more narrowly the transmittance and reflectance properties can be tailored to one or more specific wavelengths or wavelength ranges.

The reflected radiation 28 first encounters a terminal surface 44 of the layered film 36 upon interacting with the window 24, and the terminal surface 44 may be open to the exterior environment 26. In an embodiment, a layer of the lower refractive index material 42 provides the terminal surface 44 to more closely match the refractive index of the air in the external environment 26 and thus reduce reflection of incident electromagnetic radiation (whether the reflected radiation 28 or otherwise) off of the terminal surface 44. The layer of the lower refractive index material 42 that provides the terminal surface 44 is the layer of the layered film 36 that is farthest from the substrate 30. Similarly, in an embodiment, when the lower refractive index material 42 is $SiO_2$, a layer of the lower refractive index material 42 is disposed directly onto the first surface 32 of the substrate 30, which will typically comprise a large mole percentage of $SiO_2$. Without being bound by theory, it is thought that the similar chemical makeup between the lower refractive index material 42 of $SiO_2$ and the substrate 30 allows the $SiO_2$ to bond well to the substrate 30. In this instance, this layer of the lower refractive index material 42 is the layer of the layered film 36 that is closest to the substrate 30.

Materials that have a relatively high refractive index often simultaneously have a relatively high hardness that provides scratch resistance. The thickness of the high refractive index material 40, whether at the second layer of the layered film 36 or otherwise, can be maximized to increase the scratch and/or damage resistance of the window 24. In embodiments, the thickness of this maximized-thickness high refractive index material 40 has a thickness that is 50% or more, 60% or more, 70% or more, or even 80% or more of the thickness of the layered film 36. The thickness of the high refractive index material 40 chosen to impart scratch and/or damage resistance to the window 24 can be chosen as a function of the intended application for the window 24. For example, the layered film 36 for the window 24 utilized at the roof 14 of the vehicle 10 may have different hardness and scratch resistance requirements than the layered film 36 for the window 24 utilized at the forward portion 16 of the vehicle 10, and thus a different thickness for the maximized-thickness layer of the high refractive index material 40. The quantity and thickness of each of the remaining layers of the layered film 36 can be configured to impart the window 24 with the desired optical properties as described herein. In other words, the quantity and thicknesses of the remaining layers of the layered film 36 can be configured to accommodate a chosen thickness of the high refractive index material 30 that is maximized to impart scratch and/or damage resistance to the window 24, in order to provide the window 24 with the desired reflectance and transmittance optical properties as described herein. In general, the reflectance and transmittance properties of the layered film 36 (and thus the window 24) as a whole can be configured to minimize the sensitivity of those properties to the thickness of the maximized-thickness layer of the high refractive index material 40. If the second layered film 38 is utilized in addition to the layered film 36, the quantity of layers for both the layered film 36 and the second layered film 36, as well as the thicknesses of the alternating layers of both the layered film 36 and the second layered film 38, are configured so that the window 24 has the desired transmittance and/or reflectance percentages for electromagnetic radiation having a wavelength within the range of 850 nm to 950 nm (such as 905 nm). The maximized-thickness layer of the high refractive index material 40 can be disposed at the layered film 36, and the second layered film 38 can include a greater number of alternating layers than the layered film 36.

The thickness and location within the layered film 36 of the maximized thickness layer of the high refractive index material 40 can be optimized to provide the desired level of hardness and scratch resistance to the layered film 36 and thus the window 24 as a whole. In embodiments, the maximized thickness layer of the high refractive index material 40 serving as the layer providing the hardness and scratch resistance to the window 24 has a thickness between 500 nm and 10000 nm, such as a thickness within the range of 1950 nm to 5150 nm. The hardness of the high refractive index material 40 may be characterized specifically. In some embodiments, the maximum hardness of the maximized thickness layer of the high refractive index material 40, as measured by the Berkovich Indenter Hardness Test, may be about 8 GPa or greater, about 10 GPa or greater, about 12 GPa or greater, about 15 GPa or greater, or about 18 GPa or greater at one or more indentation depths from 50 nm to 1000 nm (measured from the terminal surface 44). These levels of hardness provide resistance to impact damage from sand, small stones, debris, and other objects encountered while the vehicle 10 is moving, as described above. Accordingly, these levels of hardness reduce or prevent the optical scattering and reduced performance of the LIDAR system 12 that the impact damage would otherwise cause. As used herein, the "Berkovich Indenter Hardness Test" includes measuring the hardness of a material on a surface thereof by indenting the surface with a diamond Berkovich indenter. The Berkovich Indenter Hardness Test includes indenting the terminal surface 44 of the substrate 30 with the diamond Berkovich indenter to form an indent to an indentation depth in the range from about 50 nm to about 1000 nm (or the entire thickness of the layered film 36, whichever is less) and measuring the maximum hardness from this indentation along the entire indentation depth range or a segment of this indentation depth range (e.g., in the range from about 100 nm to about 600 nm), generally using the methods set forth in Oliver, W. C.; Pharr, G. M. *An improved technique for determining hardness and elastic modulus using load and displacement sensing indentation experiments.* J. Mater. Res., Vol. 7, No. 6, 1992, 1564-1583; and Oliver, W. C.; Pharr, G. M. *Measurement of Hardness and Elastic Modulus by Instrument Indentation: Advances in Understanding and Refinements to Methodology.* J. Mater. Res., Vol. 19, No. 1, 2004, 3-20. As used herein, hardness refers to a maximum hardness, and not an average hardness.

In an embodiment, the lower refractive index material 42 providing the terminal surface 44 has a thickness that is less than 50%, or less than 45%, or less than 40%, or less than 35%, or less than 30%, or less than 25%, or less than 15%, or less than 10%, or less than 5%, or less than 4%, or less than 3%, or less than 2% and even less than 1.2% of the 905 nm wavelength of electromagnetic radiation at issue. For example, a thickness of less than 5% of 905 nm is less than 45.25 nm. In embodiments, the thickness of the lower refractive index material 42 providing the terminal surface 44 is between 130 nm and 180 nm. Minimizing the thickness of the lower refractive index material 42 providing the terminal surface 44 enhances the scratch and/or damage resistance provided by the high refractive index material 40 provided directly under the lower refractive index material 42 providing the terminal surface 44. As mentioned, in embodiments, the layer of the high refractive index material 40 imparting the maximum hardness to the window 24 is the second layer of the layered film 36 from the external environment 26, that is, is the layer adjacent to the layer of the lower refractive index material 42 providing the terminal surface 44 of the window 24.

The layered film 36 has a thickness 46. The thickness 46 of the layered film 36 may be about 1 µm or greater while still providing the transmittance and reflectance properties described herein. In embodiments, the thickness 46 is in the range of 1 µm to 20 µm, including from about 1 µm to about 10 µm. The lower bound of about 1 µm is approximately the minimum thickness 46 that still provides hardness and scratch resistance. The higher bound of thickness 46 is limited by cost and time required to dispose the layers of the layered film 36 onto the substrate 30. In addition, the higher bound of the thickness 46 is limited to prevent the layered film 36 from warping the substrate 30, which is dependent upon the thickness of the substrate 30.

While solving the problem discussed above in the background through imparting hardness and scratch resistance via the maximized thickness of a high refractive index material 40, the layered film 36 also maximizes transmittance of the reflected radiation 28 having a wavelength of 905 nm through the window 24. In embodiments, the window 24, via the layered film 36, maximizes transmittance within a range from 850 nm to 950 nm, and in some instances maximizes transmittance of the 1550 nm wavelength, or within the range of 1500 nm to 1600 nm. In embodiments, the window 24, via the layered film 36, has an average transmittance of the 905 nm wavelength, or wavelengths within the range of 850 nm to 950 nm, of greater than 80%, or greater than 90%, or greater than 94%, or greater than 95%, or even greater than 98%. In embodiments, the window 24, via the layered film 36, additionally has an average transmittance of the 1550 nm wavelength, or wavelengths within the range of 1500 nm to 1600 nm, of greater than 80%, or greater than 90%, or greater than 94%, or greater than 95%, or even greater than 98%. The term "transmittance" refers to the percentage of incident optical power within a given wavelength range transmitted through a material (e.g., the window 24, the substrate 30, the layered film 36, or portions thereof).

In addition, the layered film 36 minimizes reflectance of the reflected radiation 28 having a wavelength of 905 nm. In embodiments, the window 24 via the layered film 36 minimizes reflectance within a range from 850 nm to 950 nm, and in some instances minimizes reflectance of the 1550 nm wavelength, or within the range of 1500 nm to 1600 nm. In embodiments, the window 24, via the layered film 36, has an average reflectance of the 905 nm wavelength, or wavelengths within the range of 850 nm to 950 nm, of less than 5%, or less than 3%, or less than 2%, or less than 1%, or less than 0.8%, or even less than 0.6%, over an incident angle range of 0° to 8°, 0° to 15°, or 0° to 25°. In embodiments, the window 24, via the layered film 36, additionally has an average transmittance of the 1550 nm wavelength, or wavelengths within the range of 1500 nm to 1600 nm, of less than 5%, or less than 3%, or less than 2%, or less than 1%, or even less than 0.6%, over an incident angle range of 0° to 8°, 0° to 15°, or 0° to 25°. In an embodiment, the window 24, via the layered film 36, has a reflectance of less than 2% (such as less than 1%) at both the 905 nm and 1550 nm at or near an incidence angle of 0°. The term "reflectance" is similarly defined as the percentage of incident optical power within a given wavelength range that is reflected from a material (e.g., the window 24, the substrate 30, the layered film 36, or portions thereof).

In embodiments, the window 24 additionally includes organic dyes, interference mirror layers, or a combination of the two, to decrease transmittance of wavelengths within the visible light region (such as from 450 nm to 650 nm, or from 380 nm to 700 nm) to less than 5%, or less than 3%, or even less than 1%. Examples of organic dyes that absorb wavelengths within the visible region but transmit at 905 nm and 1550 nm include those available from Adam Gates & Company under the trade names 800 nm Long Pass and AG-300-800 nm Ink.

In embodiments, the window 24, via the reflected layered film 36, additionally maximizes reflectance of wavelengths within the visible light range (e.g., wavelengths within the range of 300 nm to 800 nm, or 350 nm to 750 nm, or 400 nm to 700 nm, or 500 nm to 700 nm, or 550-700 nm). For example, in embodiments, the window 24, via the reflected layered film 36, has an average reflectance at the visible range of more than 80%, or more than 90%, more than 95%, or even more than 97%, over an incident angle range of 0° to 8°, 0° to 15°, or 0° to 25°. In embodiments, the window 24, via the reflected layered film 36, additionally has an average transmittance of wavelengths within the visible range of less than 20%, less than 10%, less than 5%, or even less than 3%. As reflectance of wavelengths within the visible range increases, and/or transmittance decreases, the ability of those wavelengths to act as: (a) noise interfering with; and (b) a heat source heating, the electromagnetic radiation emitter and sensor 18 decreases.

The layers of the layered film 36 and the second layered film 38 (i.e., layers of the high refractive index material 40 and the lower refractive index material 42) layers may be formed by any known method in the art, including discrete deposition or continuous deposition processes. In one or more embodiments, the layer may be formed using only continuous deposition processes, or, alternatively, only discrete deposition processes.

EXAMPLES

The following examples are all modeled examples using computer facilitated modeling to demonstrate the transmittance of reflected radiation 28 having a wavelength 905 nm through embodiments of the window 24 described herein (thus including through the layered film 36 and the substrate 30), as well as the anti-reflectance of reflected radiation 28 having a wavelength 905 nm at the terminal surface 44 of the window 24.

The refractive indices (as a function of wavelength) of each of the alternating layers of the high refractive index material 40 and the lower refractive index material 42 of the layered film 36, as well as the substrate 30, were measured using spectroscopic ellipsometry from single-layer experimental samples fabricated by reactive sputtering. The refractive indices thus measured were then used to calculate transmission and reflectance spectra for the modeled examples. The modeled examples use a single refractive index value in their descriptive tables for convenience, which corresponds to a point selected from the refractive index dispersion curves at about 950 nm wavelength. As will become apparent from the examples, the quantity and thicknesses of the alternating layers of the high refractive index material 40 and the lower refractive index material 42 in the layered film 36, assuming a predetermined thickness 35 for the substrate 30 and predetermined maximized thickness for the layer of the high refractive index material 40 imparting the hardness and damage resistance properties, can be configured to provide the window 24 with average transmittance and average reflectance values desired. Indentation hardness values were also measured from experimentally fabricated single-layer films, and for multilayer stacks having properties similar to (but not exactly the same as) the Examples modeled below. This experimental hardness information enables estimation with a high degree of confidence that the maximum indentation hardness values, and the hardness values at 500 nm indentation depth, is higher than about 16 GPa for Example 1 and Example 1A, higher than about 15 GPa for Example 2 and Example 3, higher than about 18 GPa for Example 4, higher than about 16 GPa for Examples 5-7, and higher than about 15 GPa for Example 8.

Example 1—The window 24 of Example 1 included a layered film 36 of seven (7) alternating layers of a high refractive index material 40 ($Si_3N_4$) and a lower refractive index material 42 ($SiO_2$) sequentially disposed on top of one another, disposed on a strengthened aluminosilicate substrate 30 (Gorilla® Glass (Corning code #5318)), as shown in Table 1.

TABLE 1

| Structure of Example 1 | | | |
|---|---|---|---|
| Layer | Material | Refractive Index @905 nm | Physical Thickness (nm) |
| External Environment 26 | Air | 1 | |
| 1 | $SiO_2$ | 1.47139 | 153.7 |
| 2 | $Si_3N_4$ | 1.98054 | 2000.0 |
| 3 | $SiO_2$ | 1.47139 | 25.9 |
| 4 | $Si_3N_4$ | 1.98054 | 64.7 |
| 5 | $SiO_2$ | 1.47139 | 79.0 |
| 6 | $Si_3N_4$ | 1.98054 | 22.9 |
| 7 | $SiO_2$ | 1.47139 | 25.0 |
| Substrate 30 | GG5318 | 1.49539 | 1000000 |
| Medium Within Enclosure 20 | Air | 1 | |
| Total Coating Thickness | | | 2371.1 |

The first surface 32 of the substrate 30 reflects approximately 4% of incident reflected radiation 28 at the 905 nm wavelength. Thus, the highest possible transmittance through the window 24 including the substrate 30 is approximately 96%. As illustrated in the graph of percentage transmittance through the window 24 (incident toward the terminal surface 44 and through the second surface 34 of the substrate 30) as a function of wavelength and angle of incidence ("AOI") reproduced at FIG. 5A, the layered film 36 only insignificantly reduces transmittance from the maximum possible of 96% to between 95.6% and 95.8% at 905 nm, depending upon the angle of incidence. As illustrated in the graph reproduced at FIG. 5B, the window 24 of Example 1 has peak transmittance at about 905 nm, with transmittance oscillating downwards as the wavelength of the incident electromagnetic radiation shortens through the visible light spectrum (740 nm down to 380 nm) but still remains above about 50%. In such instances, the window 24 could additionally include organic dyes, interference mirror layers, or a combination of the two, to decrease transmittance of wavelengths within the visible light region (such as from 450 nm to 650 nm, or from 380 nm to 700 nm) to less than 5%, or less than 3%, or even less than 1%, as mentioned above. The graph reproduced at FIG. 5C illustrates that the layered film 36 minimally reflects between 0.2% and 0.4% (depending upon angle of incidence) of reflected radiation 28 having a wavelength of 905 nm off the terminal surface 44. The window 24 of Example 1 provides the above transmittance and reflectance properties optimized around 905 nm while additionally providing scratch resistance with the thickest outermost layer of high refractive index material 40 ($Si_3N_4$) (layer 2) protecting the majority of other layers of the layered film 36 layered beneath.

Example 1A—The window 24 of Example 1A is the same as Example 1, except for the thickness of the outermost layer of high refractive index material 40 ($Si_3N_4$), which was increased to 5000 nm from 2000 nm. The makeup of the window 24 of Example 1A is shown below in Table 1A.

TABLE 1A

| Structure of Example 1A | | | |
|---|---|---|---|
| Layer | Material | Refractive Index @905nm | Physical Thickness (nm) |
| Medium | Air | 1 | |
| 1 | $SiO_2$ | 1.47139 | 153.7 |
| 2 | $Si_3N_4$ | 1.98054 | 5000.0 |
| 3 | $SiO_2$ | 1.47139 | 25.9 |

TABLE 1A-continued

Structure of Example 1A

| Layer | Material | Refractive Index @905nm | Physical Thickness (nm) |
|---|---|---|---|
| 4 | $Si_3N_4$ | 1.98054 | 64.7 |
| 5 | $SiO_2$ | 1.47139 | 79.0 |
| 6 | $Si_3N_4$ | 1.98054 | 22.9 |
| 7 | $SiO_2$ | 1.47139 | 25.0 |
| Substrate 30 | GG5318 | 1.49539 | 1000000 |
| Medium Within Enclosure 20 | Air | 1 | |
| Total Coating Thickness | | | 5371.1 |

Figure 5A:
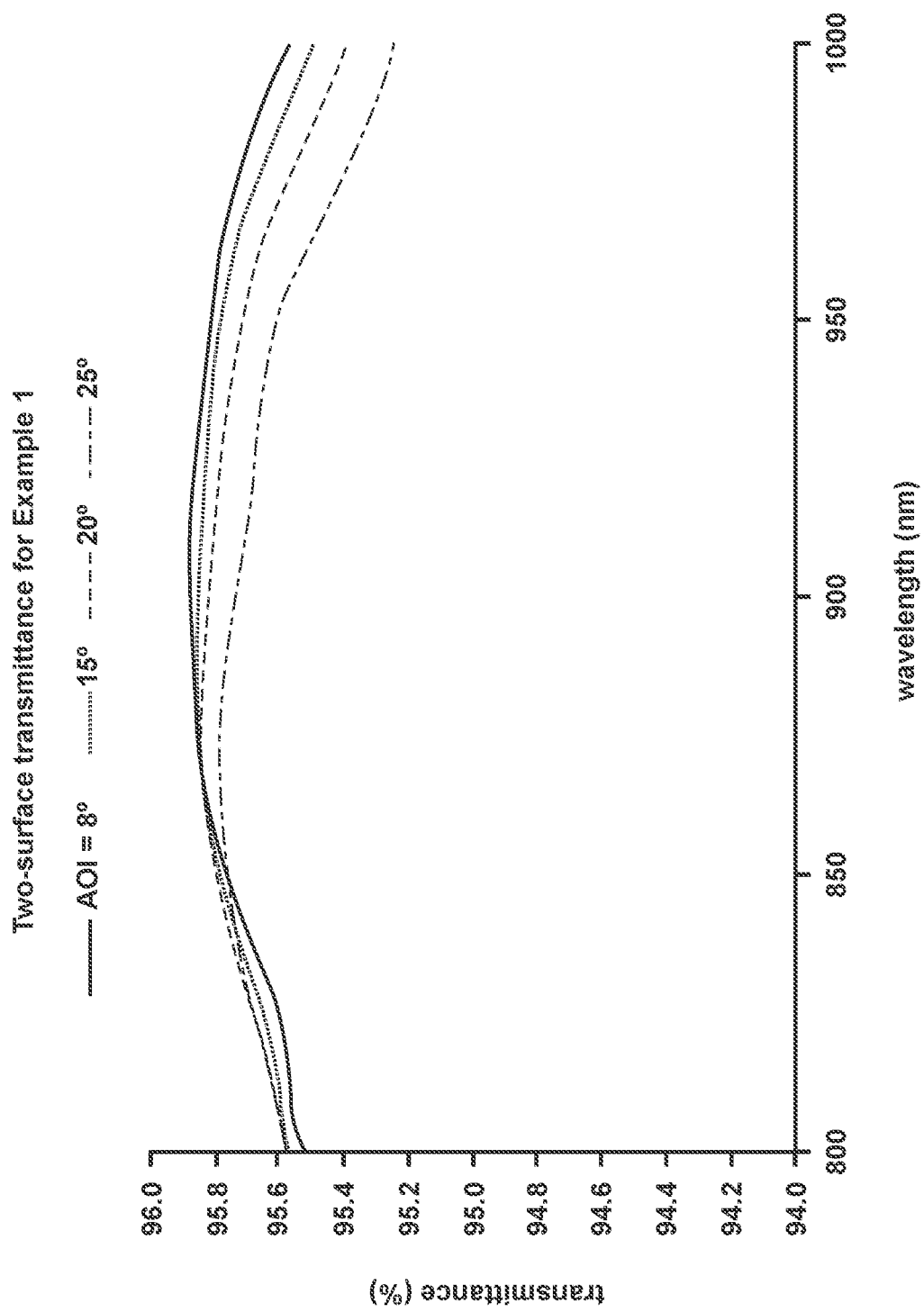
FIG. 5A is a graph of percentage transmittance through the window including a seven (7) layer embodiment of the layered film with a 2000 nm thick layer of $Si_3N_4$ imparting hardness and scratch resistance, as set forth in Example 1, illustrating a percentage transmittance of greater than 95% through the window for wavelengths within the range of 800 nm to 1000 nm, including 905 nm, for all angles of incidence from 8° to 25°.
Figure 5B:
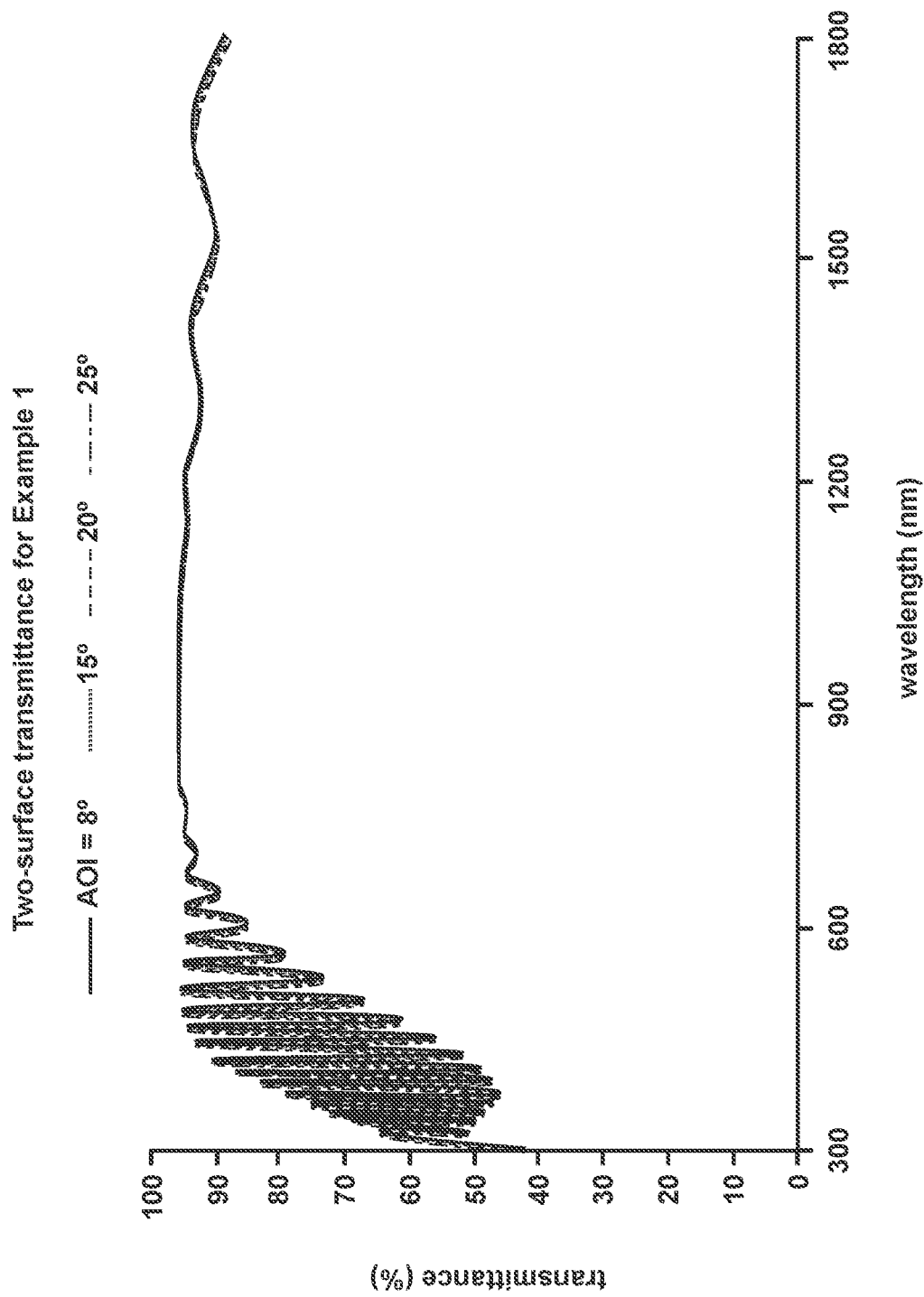
FIG. 5B is a graph of percentage transmittance through the window described in FIG. 5A, illustrating a percentage transmittance greater than 85% for wavelengths of the range from about 750 nm to about 1600 nm or larger, for all angles of incidence from 8° to 25°, but an oscillating reduction in percentage transmittance for wavelengths within the visible range from about 300 nm to about 700 nm.
Figure 5C:
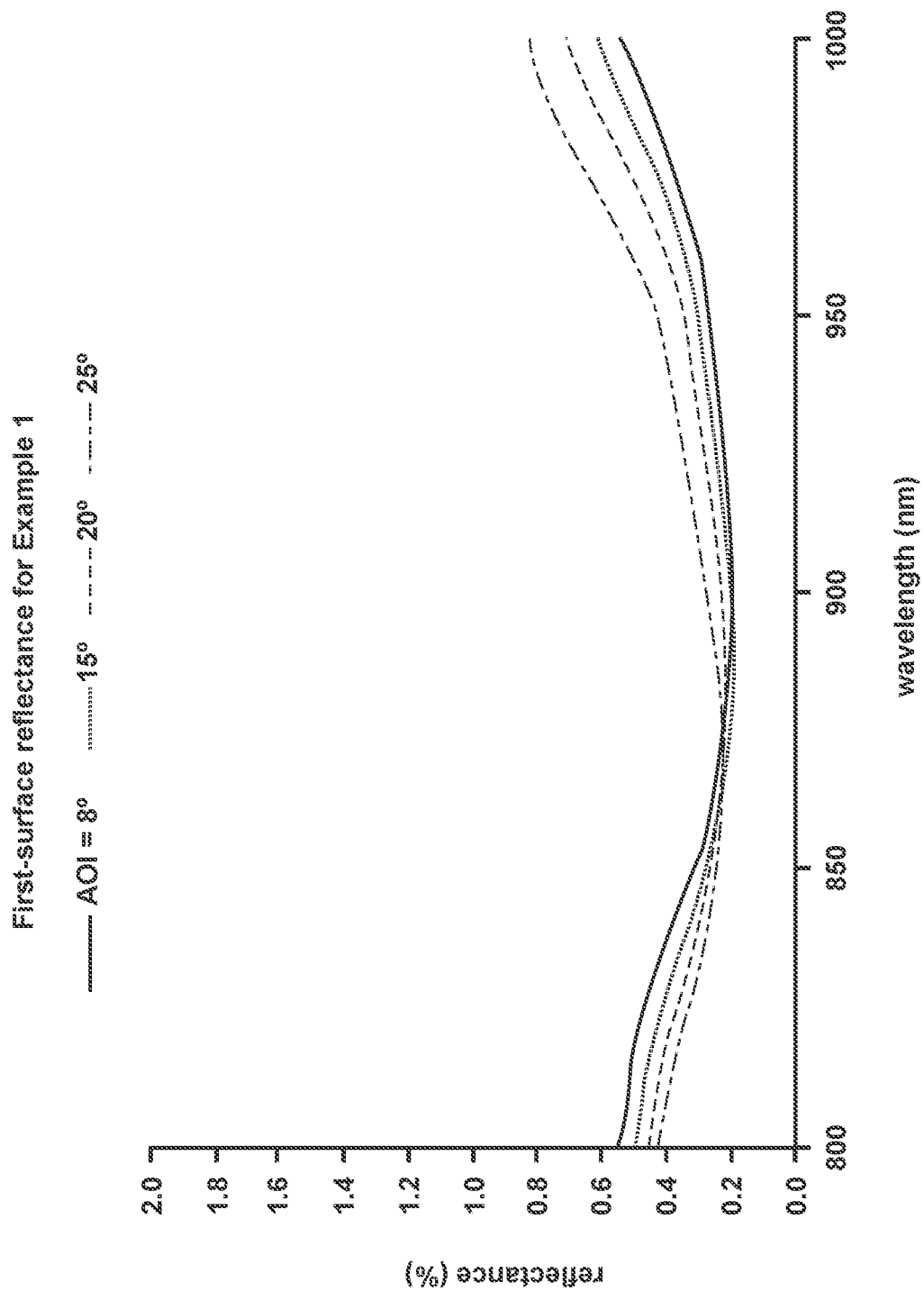
FIG. 5C is a graph of percentage reflectance off of the window described in FIG. 5A, illustrating a percentage reflectance less than 0.4% for the 905 nm wavelength for all angles of incidence, and less than about 0.8% for the wavelength range of 800 nm to 1000 nm for all angles of incidence.
Figure 6A:
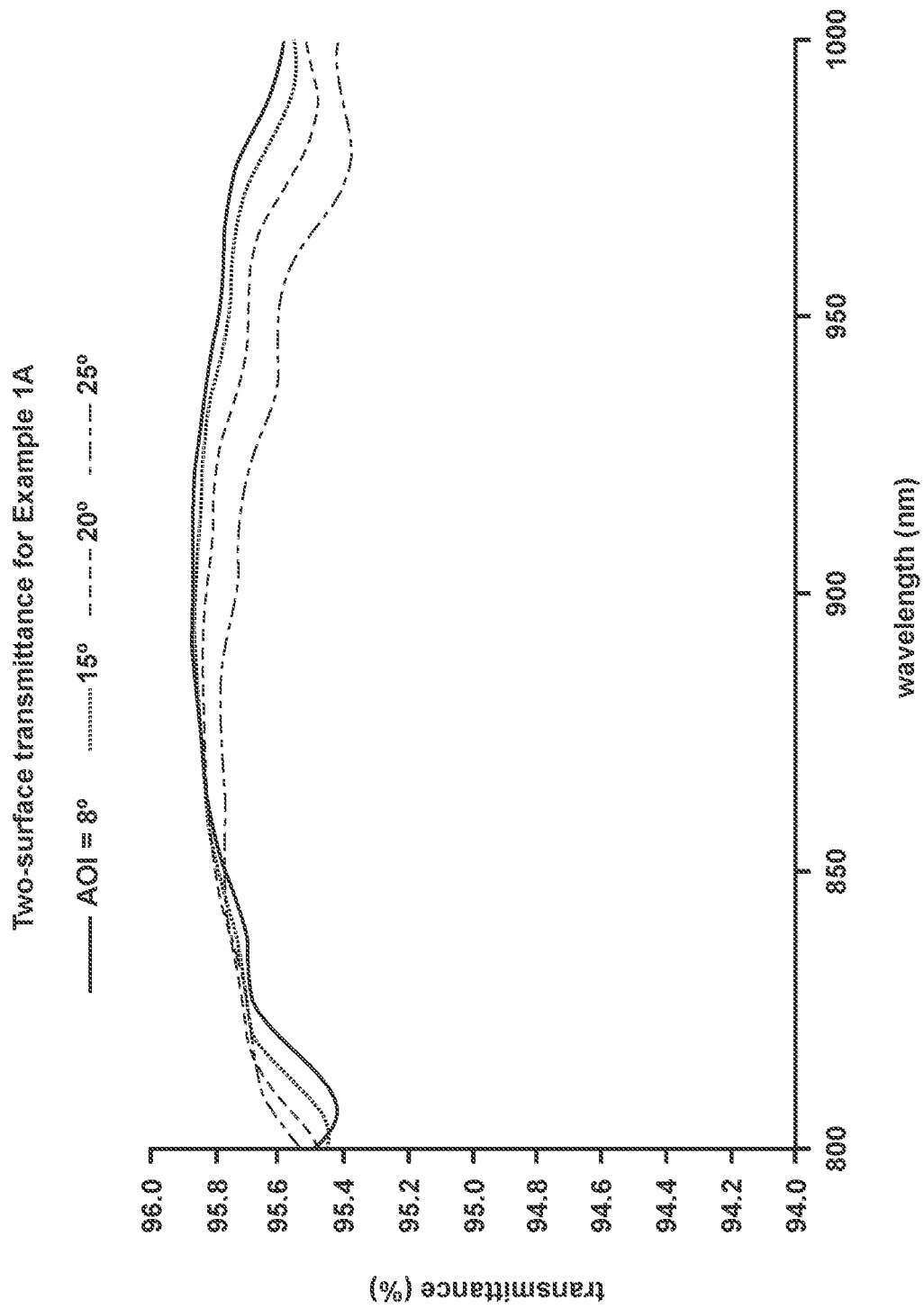
FIG. 6A is a graph of percentage transmittance through the window including a seven (7) layer embodiment of the layered film with a 5000 nm thick layer of $Si_3N_4$ imparting hardness and scratch resistance, as set forth in Example 1A, illustrating a percentage transmittance of greater than 95% through the window for wavelengths within the range of 800 nm to 1000 nm, including 905 nm, for all angles of incidence from 8° to 25°.
Figure 6B:
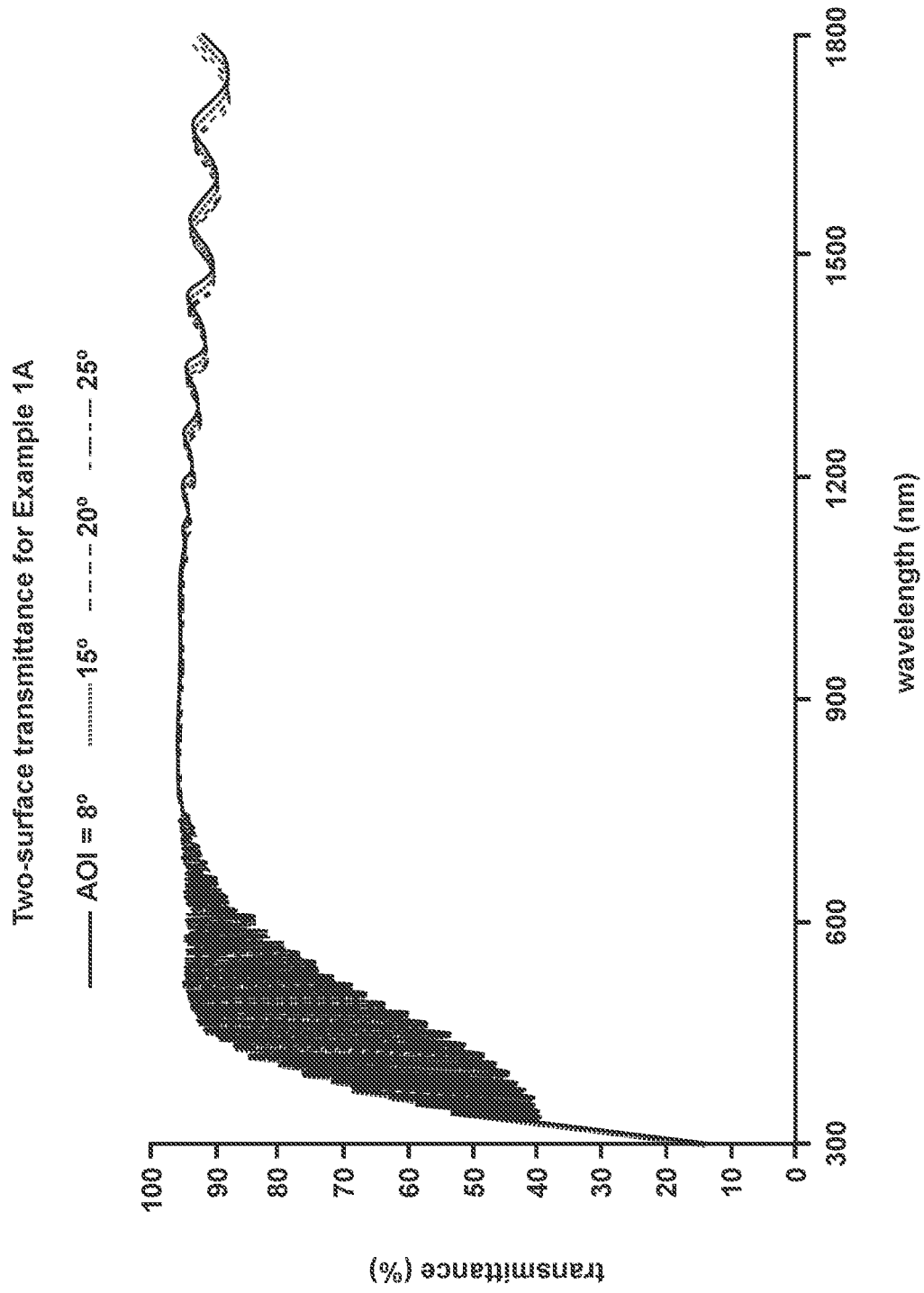
FIG. 6B is a graph of percentage transmittance through the window described in FIG. 6A, illustrating a percentage transmittance greater than 85% for wavelengths of the range from about 750 nm to about 1600 nm or larger, for all angles of incidence from 8° to 25°, but an oscillating reduction in percentage transmittance for wavelengths within the visible range from about 300 nm to about 700 nm.
Figure 6C:
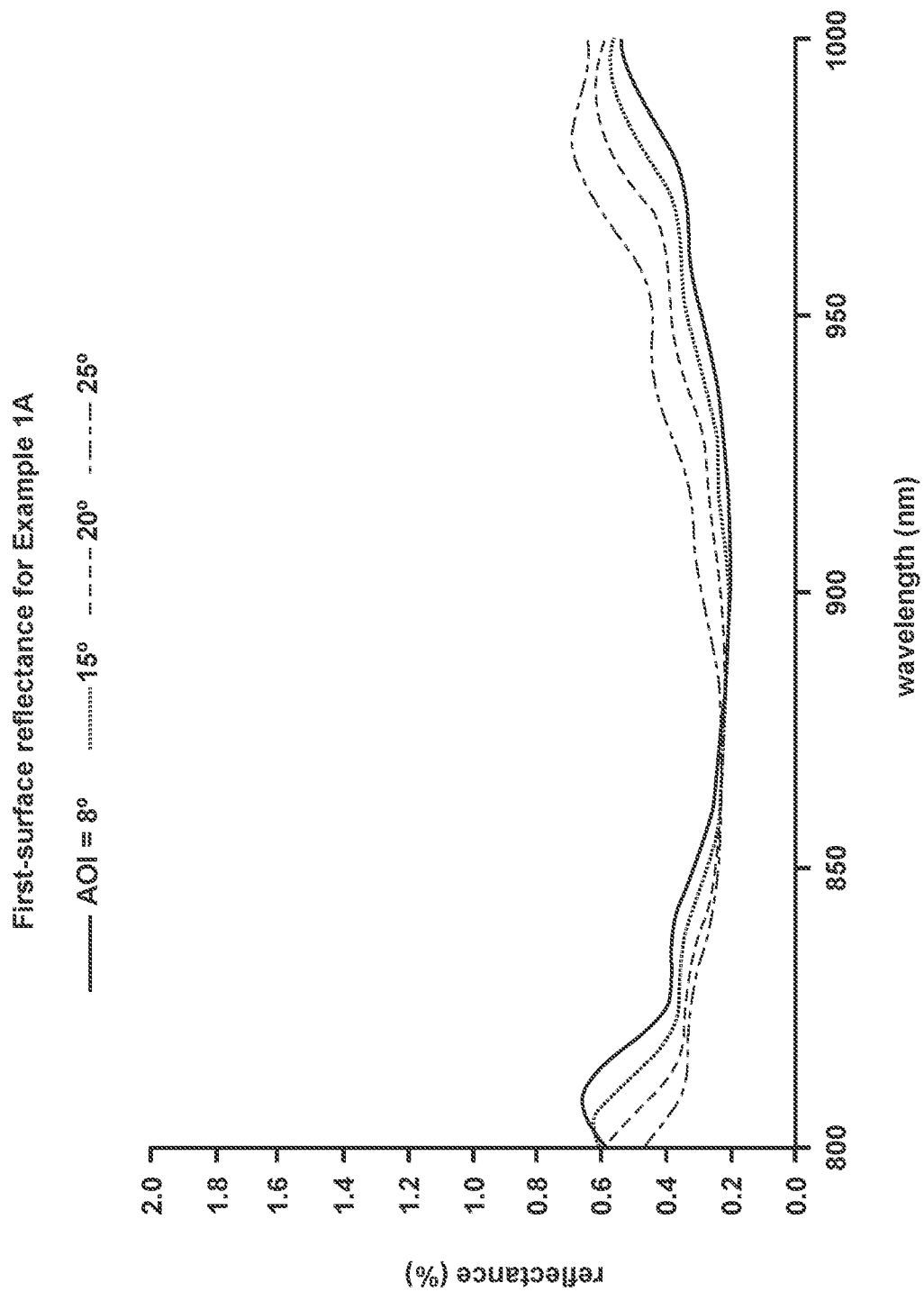
FIG. 6C is a graph of percentage reflectance off of the window described in FIG. 6A, illustrating a percentage reflectance less than 0.4% for the 905 nm wavelength for all angles of incidence from 8° to 25°, and less than about 0.8% for the wavelength range of 800 nm to 1000 nm for all angles of incidence from 8° to 25°.

Comparing the graphs reproduced at FIGS. 6A-6C for Example 1A and the graphs reproduced at FIGS. 5A-5C for Example 1, reveals that the increased thickness of the outermost layer of high refractive index material 40 caused more extreme deviations and oscillations as the wavelength increased in deviation from 905 nm. The window 24 of Example 1A provides the above transmittance and reflectance properties optimized around 905 nm while additionally providing scratch resistance with the thickest outermost layer of high refractive index material 40 ($Si_3N_4$) (layer 2) protecting the majority of other layers of the layered film 36 layered beneath.

Example 2—The window 24 of Example 2 included a layered film 36 of nine (9) alternating layers of a high refractive index material 40 ($Si_3N_4$) and a lower refractive index material 42 ($SiO_2$) sequentially disposed on top of one another, disposed on a strengthened aluminosilicate substrate 30 (Gorilla® Glass (Corning code #5318)), as shown in Table 2.

TABLE 2

Structure of Example 2

| Layer | Material | Refractive Index @ 905 nm | Physical Thickness (nm) |
|---|---|---|---|
| External Environment 26 | Air | 1 | |
| 1 | $SiO_2$ | 1.47139 | 157.4 |
| 2 | $Si_3N_4$ | 1.98054 | 153.1 |
| 3 | $SiO_2$ | 1.47139 | 14.4 |
| 4 | $Si_3N_4$ | 1.98054 | 2000.0 |
| 5 | $SiO_2$ | 1.47139 | 25.9 |
| 6 | $Si_3N_4$ | 1.98054 | 64.7 |
| 7 | $SiO_2$ | 1.47139 | 79.0 |
| 8 | $Si_3N_4$ | 1.98054 | 22.9 |
| 9 | $SiO_2$ | 1.47139 | 25.0 |
| Substrate 30 | GG5318 | 1.49539 | 1000000.0 |
| Medium Within Enclosure 20 | Air | 1 | |
| Total Coating Thickness | | | 2542.3 |

Figure 7A:
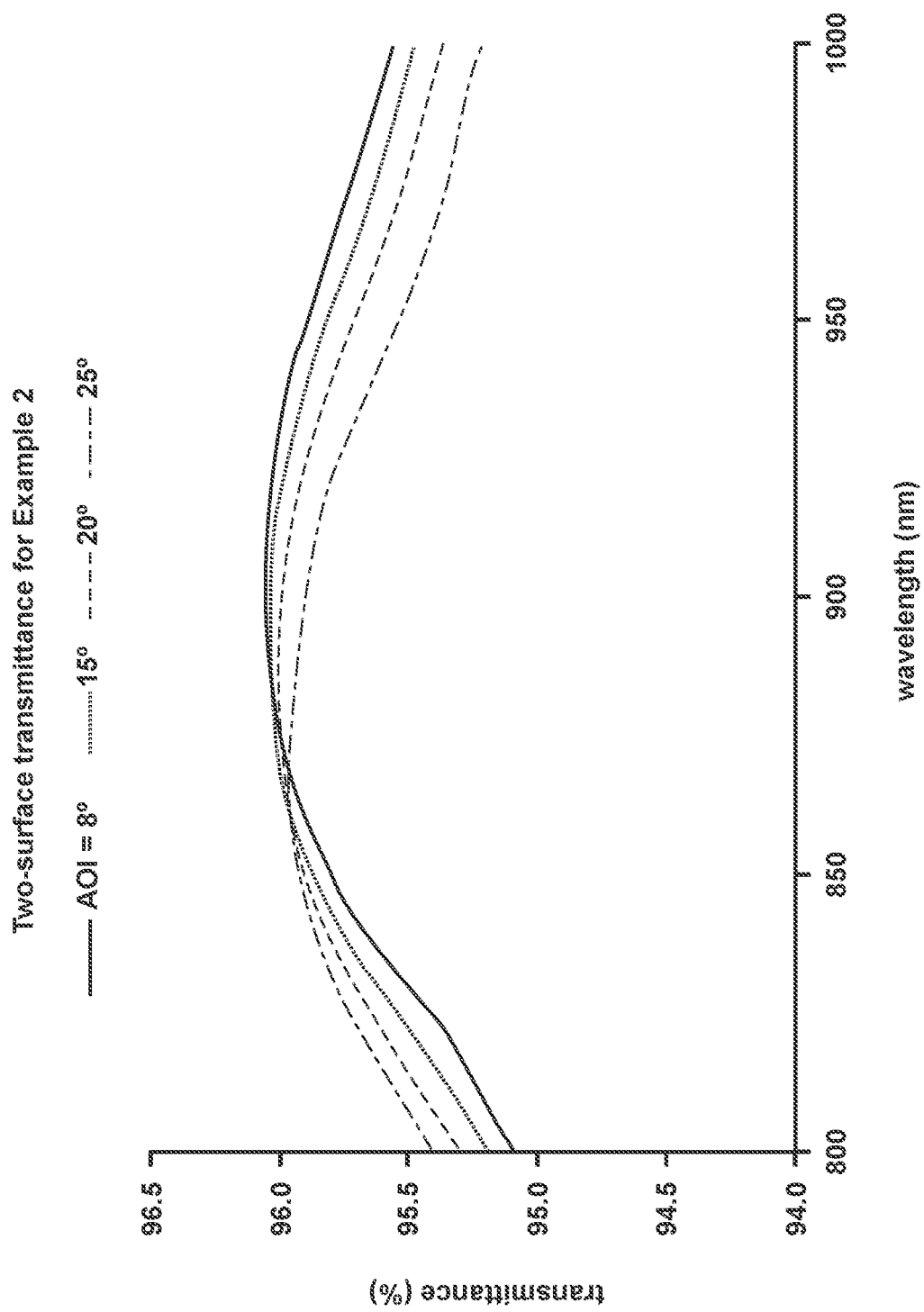
FIG. 7A is a graph of percentage transmittance through the window including a nine (9) layer embodiment of the layered film with a 2000 nm thick layer of $Si_3N_4$ imparting hardness and scratch resistance, as set forth in Example 2, illustrating a percentage transmittance of greater than 95% through the window for wavelengths within the range of 800 nm to 1000 nm, including 905 nm, for all angles of incidence from 8° to 25°.

The graph reproduced at FIG. 7A illustrates a higher rate of decrease in transmittance as the wavelength increases or decreases away from an approximate maximum near 96% at a wavelength of 905 nm than for Example 1 illustrated in FIG. 5A. As illustrated in the graph reproduced at FIG. 7B, the window 24 of Example 2 again has peak transmittance at about 905 nm, with transmittance oscillating again downwards as the wavelength of the incident electromagnetic radiation shortens through the visible light spectrum (740 nm down to 380 nm). The downward oscillation is more extreme in Example 1 compared to Example 2, illustrating that the number of alternating layers and their thicknesses can be configured to provide a greater reduction in transmittance through the window 24 as the wavelength shortens through the visible spectrum. The graph reproduced at FIG. 7C illustrates that the layered film 36 minimally reflects between approximately 0% and 0.2% (depending upon angle of incidence) of reflected radiation 28 having a wavelength of 905 nm off the terminal surface 44. Comparing FIG. 5C for Example 1 and FIG. 7C for Example 2 reveals that the layered film 36 of Example 2 provides a window 24 with a lower reflectance (below 0.2% for angles of incidence from 8° to 25°) than the window 24 of Example 1 (approximately 0.2% or above). As the wavelength increases or decreases away from 905 nm, the reflectance increases and does so more drastically than in Example 1 (FIG. 5C), perhaps a function of the additional layers in the layered film 36. The window 24 of Example 2 provides the above transmittance and reflectance properties optimized around 905 nm while additionally providing scratch resistance.

Example 3—The window 24 of Example 3 included a layered film 36 of eleven (11) alternating layers of a high refractive index material 40 ($Si_3N_4$) and a lower refractive index material 42 ($SiO_2$) sequentially disposed on top of one another, disposed on a strengthened aluminosilicate substrate 30 (Gorilla® Glass (Corning code #5318)), as shown in Table 3.

TABLE 3

Structure of Example 3

| Layer | Material | Refractive Index @905 nm | Physical Thickness (nm) |
|---|---|---|---|
| External Environment 26 | Air | 1 | |
| 1 | $SiO_2$ | 1.47139 | 157.5 |
| 2 | $Si_3N_4$ | 1.98054 | 152.7 |
| 3 | $SiO_2$ | 1.47139 | 14.4 |
| 4 | $Si_3N_4$ | 1.98054 | 2000.0 |
| 5 | $SiO_2$ | 1.47139 | 17.7 |
| 6 | $Si_3N_4$ | 1.98054 | 76.8 |
| 7 | $SiO_2$ | 1.47139 | 63.2 |
| 8 | $Si_3N_4$ | 1.98054 | 39.3 |
| 9 | $SiO_2$ | 1.47139 | 105.6 |
| 10 | $Si_3N_4$ | 1.98054 | 11.0 |
| 11 | $SiO_2$ | 1.47139 | 25.0 |
| Substrate 30 | GG5318 | 1.49539 | 1000000 |
| Medium Within Enclosure 20 | Air | 1 | |
| Total Coating Thickness | | | 2663.2 |

Figure 7B:
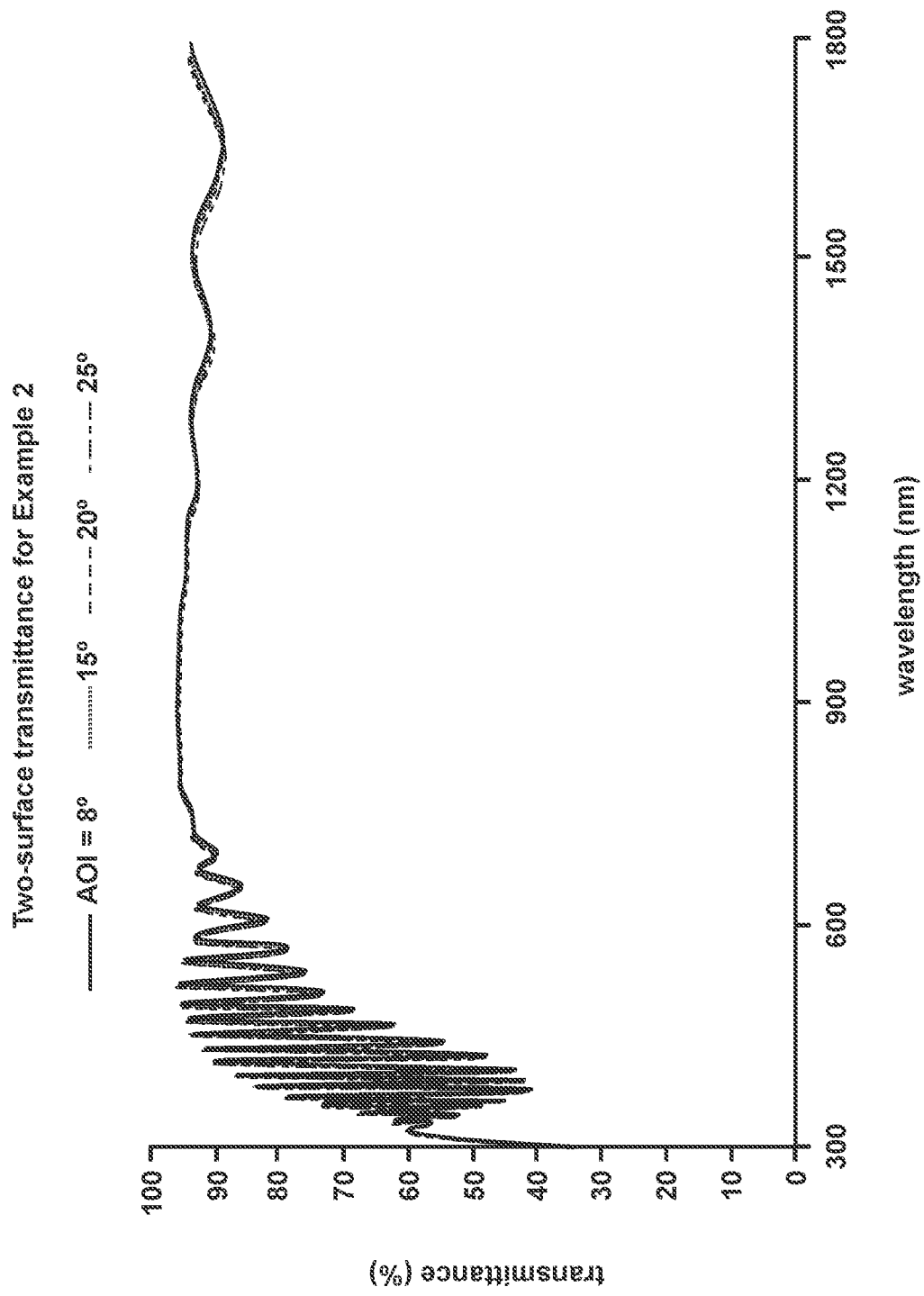
FIG. 7B is a graph of percentage transmittance through the window described in FIG. 7A, illustrating a percentage transmittance greater than 85% for wavelengths of the range from about 750 nm to about 1600 nm or larger, for all angles of incidence from 8° to 25°, but an oscillating reduction in percentage transmittance for wavelengths within the visible range from about 300 nm to about 700 nm.
Figure 7C:
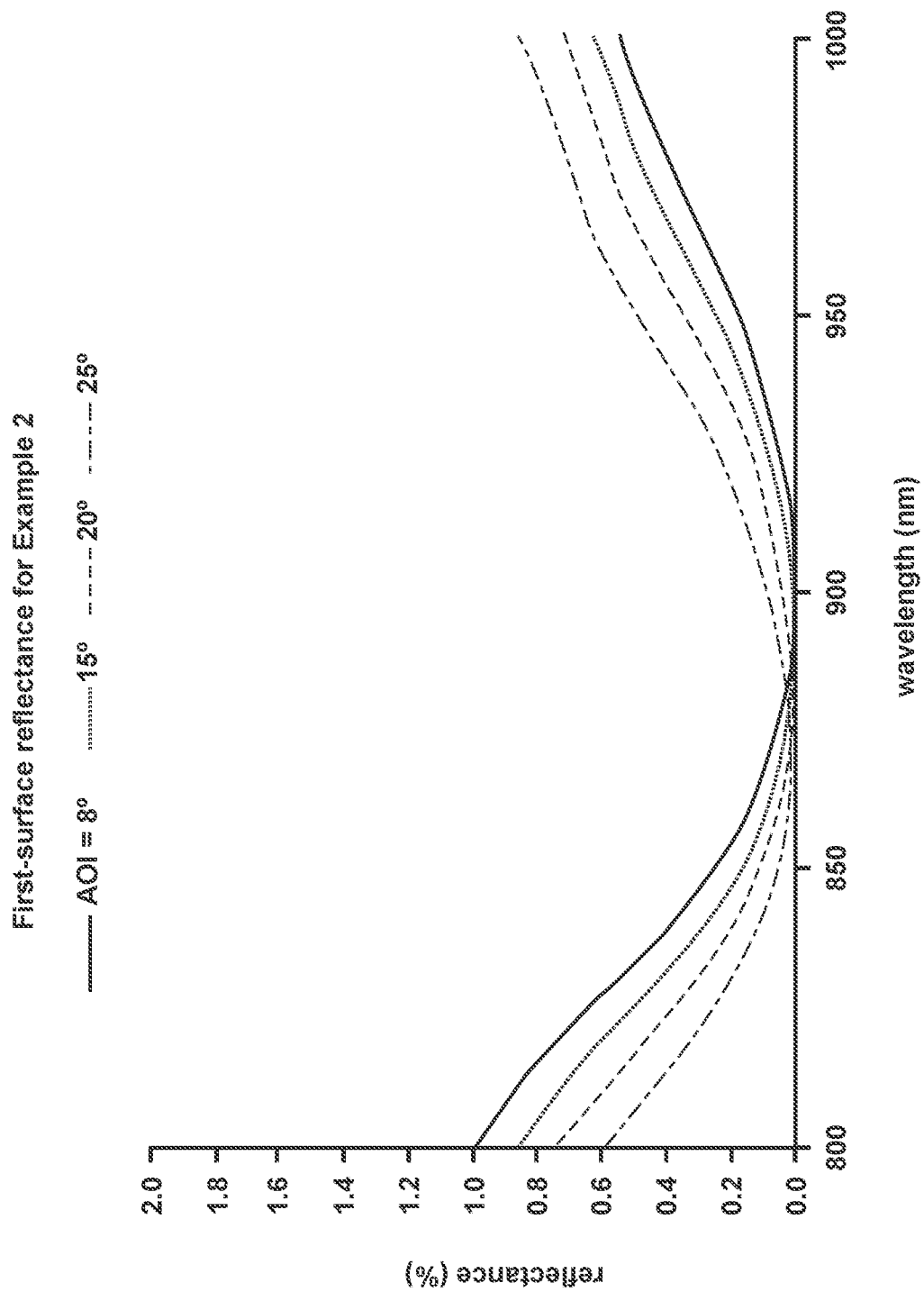
FIG. 7C is a graph of percentage reflectance off of the window described in FIG. 7A, illustrating a percentage reflectance less than 0.2% for the 905 nm wavelength for all angles of incidence from 8° to 25°, and less than about 1.0% for the wavelength range of 800 nm to 1000 nm for all angles of incidence from 8° to 25°.
Figure 8A:
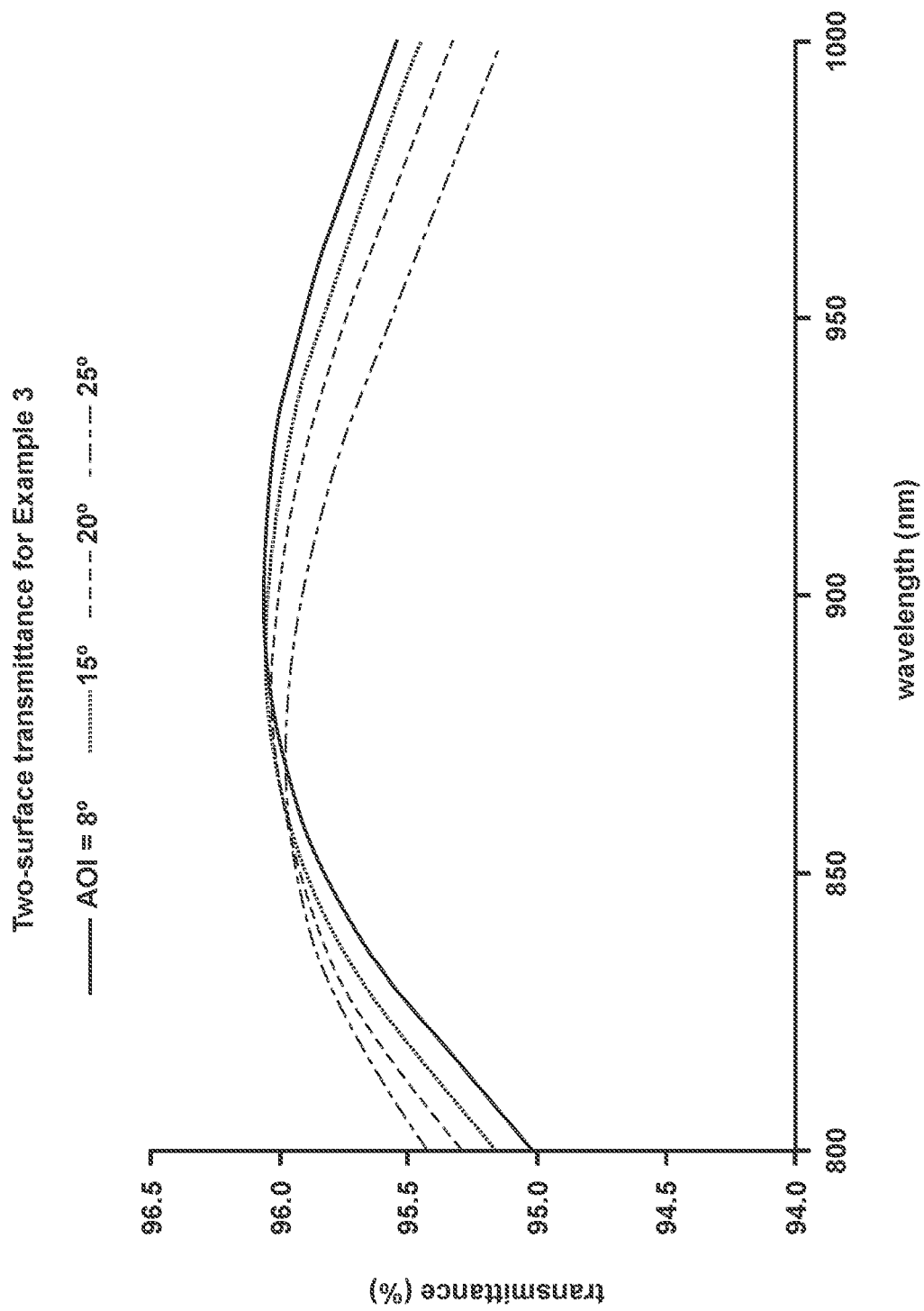
FIG. 8A is a graph of percentage transmittance through the window including an eleven (11) layer embodiment of the layered film with a 2000 nm thick layer of $Si_3N_4$ imparting hardness and scratch resistance, as set forth in Example 3, illustrating a percentage transmittance of greater than 95% through the window for wavelengths within the range of 800 nm to 1000 nm, including 905 nm, for all angles of incidence from 8° to 25°.
Figure 8B:
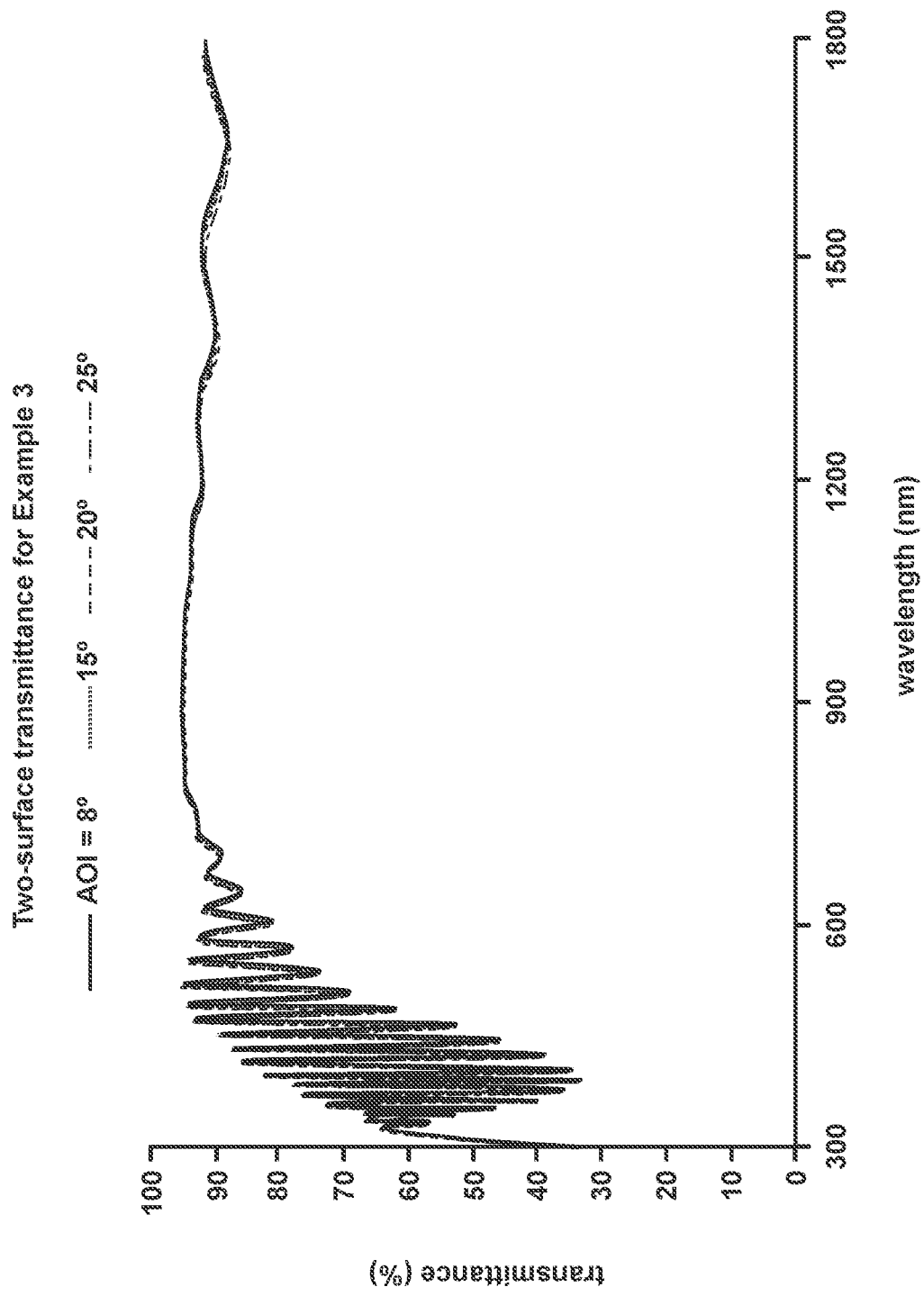
FIG. 8B is a graph of percentage transmittance through the window described in FIG. 8A, illustrating a percentage transmittance greater than 85% for wavelengths of the range from about 750 nm to about 1600 nm or larger, for all angles of incidence from 8° to 25°, but an oscillating reduction in percentage transmittance for wavelengths within the visible range from about 300 nm to about 700 nm.
Figure 8C:
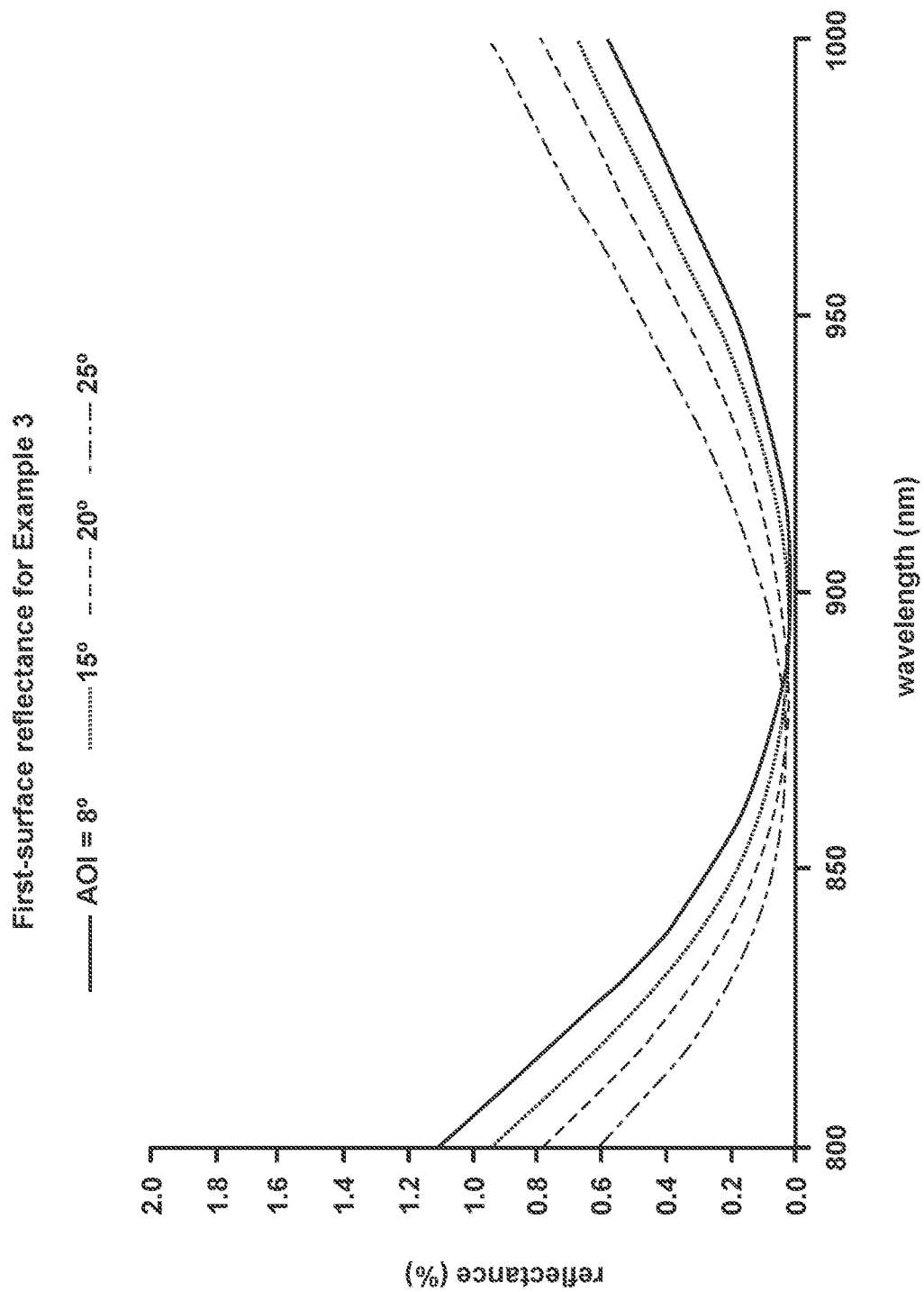
FIG. 8C is a graph of percentage reflectance off of the window described in FIG. 8A, illustrating a percentage reflectance less than 0.2% for the 905 nm wavelength for all angles of incidence, and less than about 1.2% for the wavelength range of 800 nm to 1000 nm for all angles of incidence.

Comparing the graphs reproduced at FIGS. 8A-8C for Example 3 and the graphs reproduced at FIGS. 5A-5C for Example 1 and at FIGS. 7A-7C for Example 2, reveals that increasing the number of layers of the high refractive index material 40 ($Si_3N_4$) and the lower refractive index material 42 ($SiO_2$) in the layered film 36 narrows the band of maximum transmittance and minimum reflectivity centered around 905 nm, and more drastically reduces transmittance and reduces reflectivity as the wavelength moves away from 905 nm. The window 24 of Example 3 provides the above transmittance and reflectance properties optimized around 905 nm while additionally providing scratch resistance.

Example 4—The windows 24 of Examples 4 and 4D included a layered film 36 of seven (7) alternating layers of a high refractive index material 40 ($Si_3N_4$) and a lower refractive index material 42 ($SiO_2$) sequentially disposed on top of one another, disposed on a strengthened aluminosilicate substrate 30 (Gorilla® Glass (Corning code #5318)), as shown in Table 4. Examples 4 and 4D reduce the thickness of the lower refractive index material 42 ($SiO_2$) providing the terminal surface 44 to 10 nm (approximately 1.1% of the 905 nm wavelength). In Example 4, the thickness of the second layer of high refractive index material 40 directly under the lower refractive index material 42 providing the terminal surface 44 is 1955 nm (approximately 82% of the thickness of the layered film 36). In Example 4D, the thickness of the second layer of high refractive index material 40 directly under the lower refractive index material 42 providing the terminal surface 44 is 126.5 nm (approximately 23% of the thickness of the layered film 36).

TABLE 4

Structures of Examples 4 and 4D

| Example: | | | 4 | 4D |
|---|---|---|---|---|
| Layer | Material | Refractive Index @905 nm | Physical Thickness (nm) | Thickness (nm) |
| External Environment 26 | Air | 1 | | |
| 1 | $SiO_2$ | 1.47139 | 10 | 10 |
| 2 | $Si_3N_4$ | 1.98054 | 1955 | 126.5 |
| 3 | $SiO_2$ | 1.47139 | 27.66 | 27.66 |
| 4 | $Si_3N_4$ | 1.98054 | 51.64 | 51.64 |
| 5 | $SiO_2$ | 1.47139 | 206.58 | 206.58 |
| 6 | $Si_3N_4$ | 1.98054 | 94.24 | 94.24 |
| 7 | $SiO_2$ | 1.47139 | 25 | 25 |
| Substrate 30 | GG5318 | 1.49539 | | |
| Medium Within Enclosure 20 | Air | 1 | | |
| Total Coating Thickness | | | 2370.1 | 541.6 |

Figure 9A:
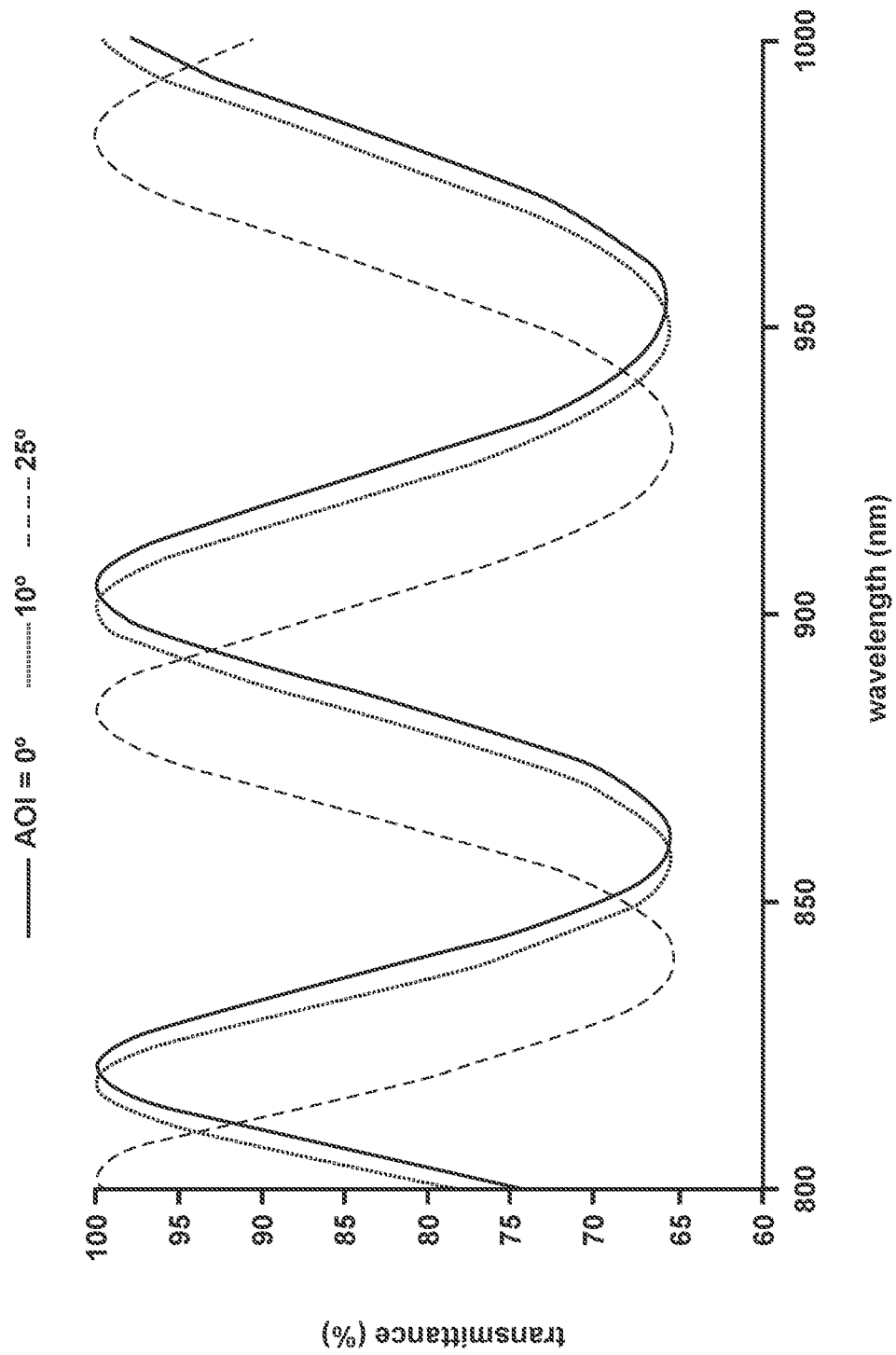
FIG. 9A is a graph of percentage transmittance through a terminal (outermost) surface of the window including a seven (7) layer embodiment of the layered film with a 1955 nm thick layer of $Si_3N_4$ imparting hardness and scratch resistance, as set forth in Example 4, illustrating a nearly 100% transmittance at a 0° angle of incidence but varying considerably as the angle of incidence changes.
Figure 9B:
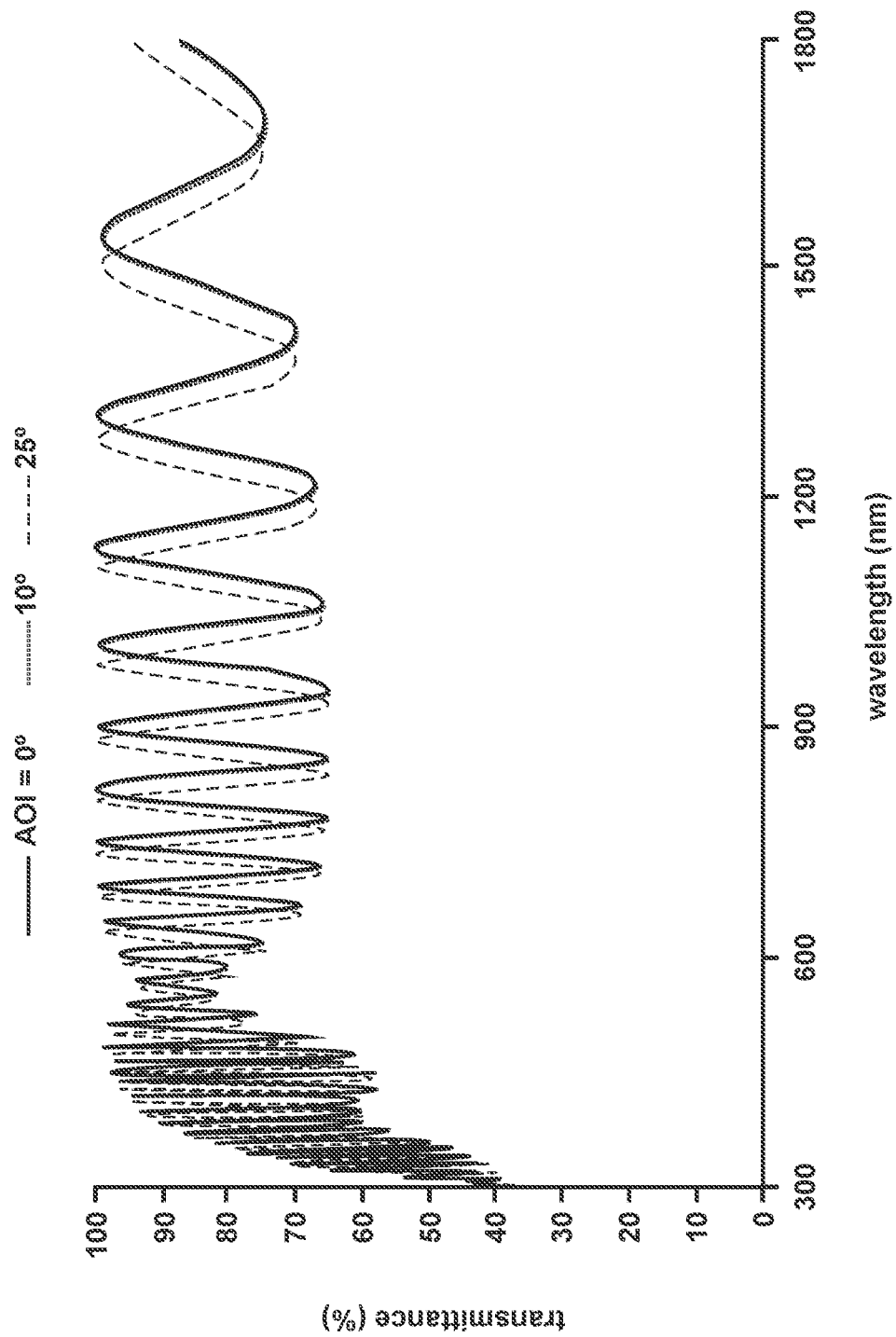
FIG. 9B is a graph of percentage transmittance through the terminal (outermost) surface of the window described in FIG. 9A, illustrating a percentage transmittance greater than 60% for wavelengths of the range from about 500 nm to about 1600 nm or larger, for all angles of incidence from 0° to 25°, but an oscillating reduction in percentage transmittance for wavelengths within the visible range from about 300 nm to about 500 nm.
Figure 9C:
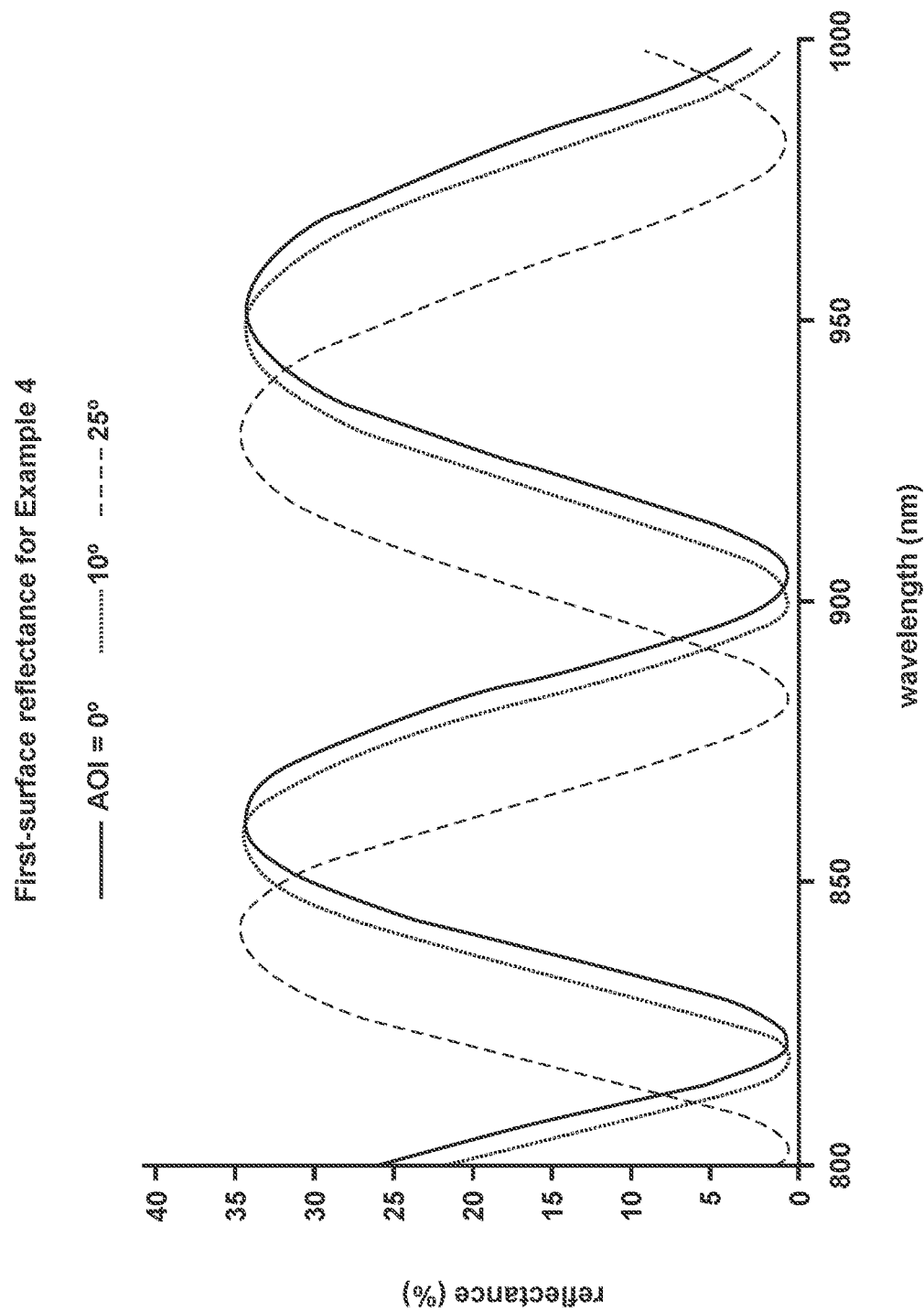
FIG. 9C is a graph of percentage reflectance off of the window described in FIG. 9A, illustrating a percentage reflectance close to 0% for the 905 nm wavelength at a 0° angle of incidence, but varying considerably as the angle of incidence changes.
Figure 10A:
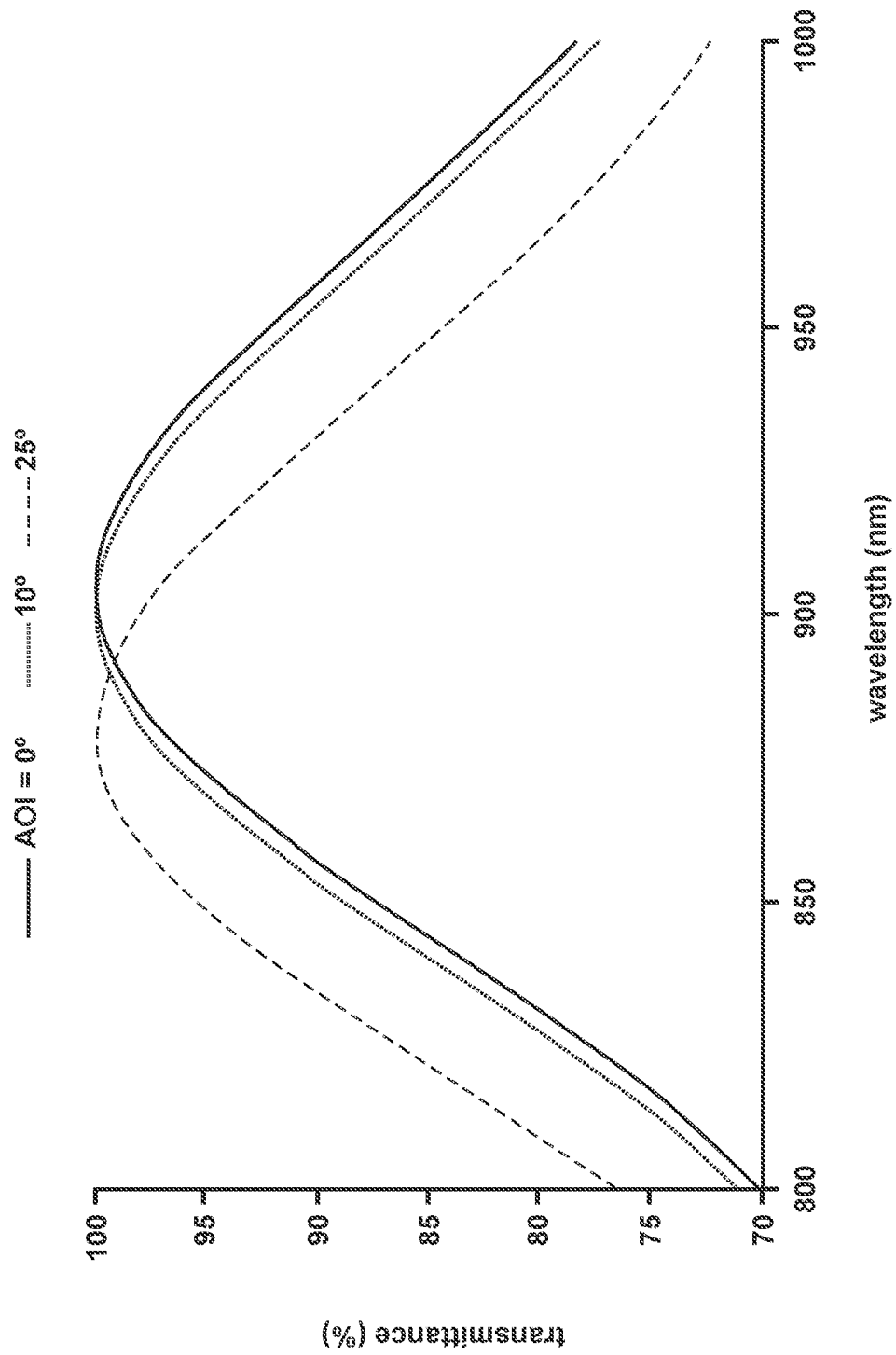
FIG. 10A is a graph of percentage transmittance through a terminal (outermost) surface of the window including a seven (7) layer embodiment of the layered film (Example 4D) with a 126.5 nm thick layer of $Si_3N_4$ instead of the 1955 nm thick layer of $Si_3N_4$ as in Example 4, illustrating a nearly 100% transmittance at a 0° angle of incidence but varying considerably as the angle of incidence and wavelength changes.
Figure 10B:
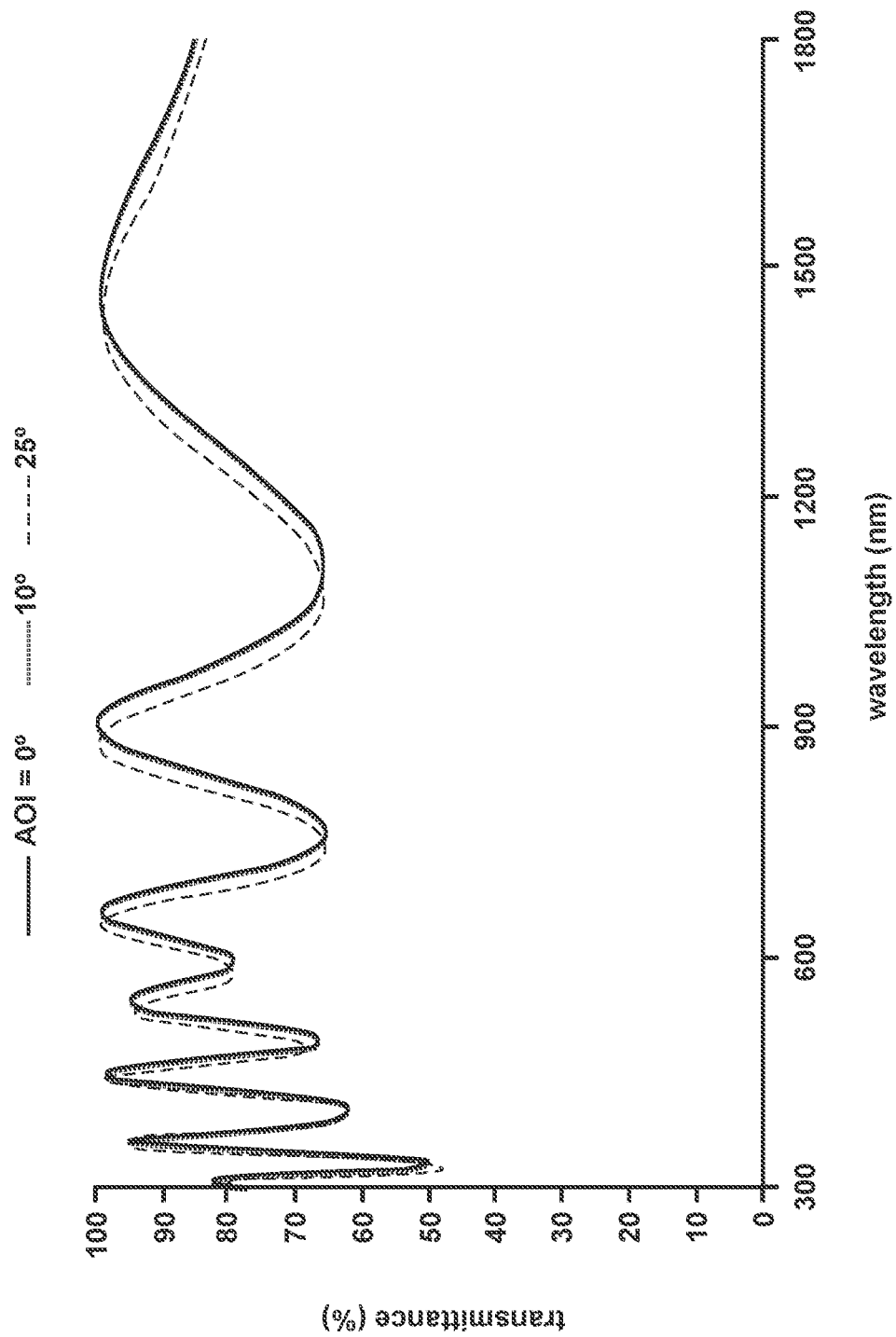
FIG. 10B is a graph of percentage transmittance through the terminal (outermost) surface of the window described in FIG. 10A, illustrating a percentage transmittance greater than 60% for wavelengths of the range from about 400 nm to about 1600 nm or larger, for all angles of incidence from 0° to 25°, but oscillating above 90% as a function of wavelength.
Figure 10C:
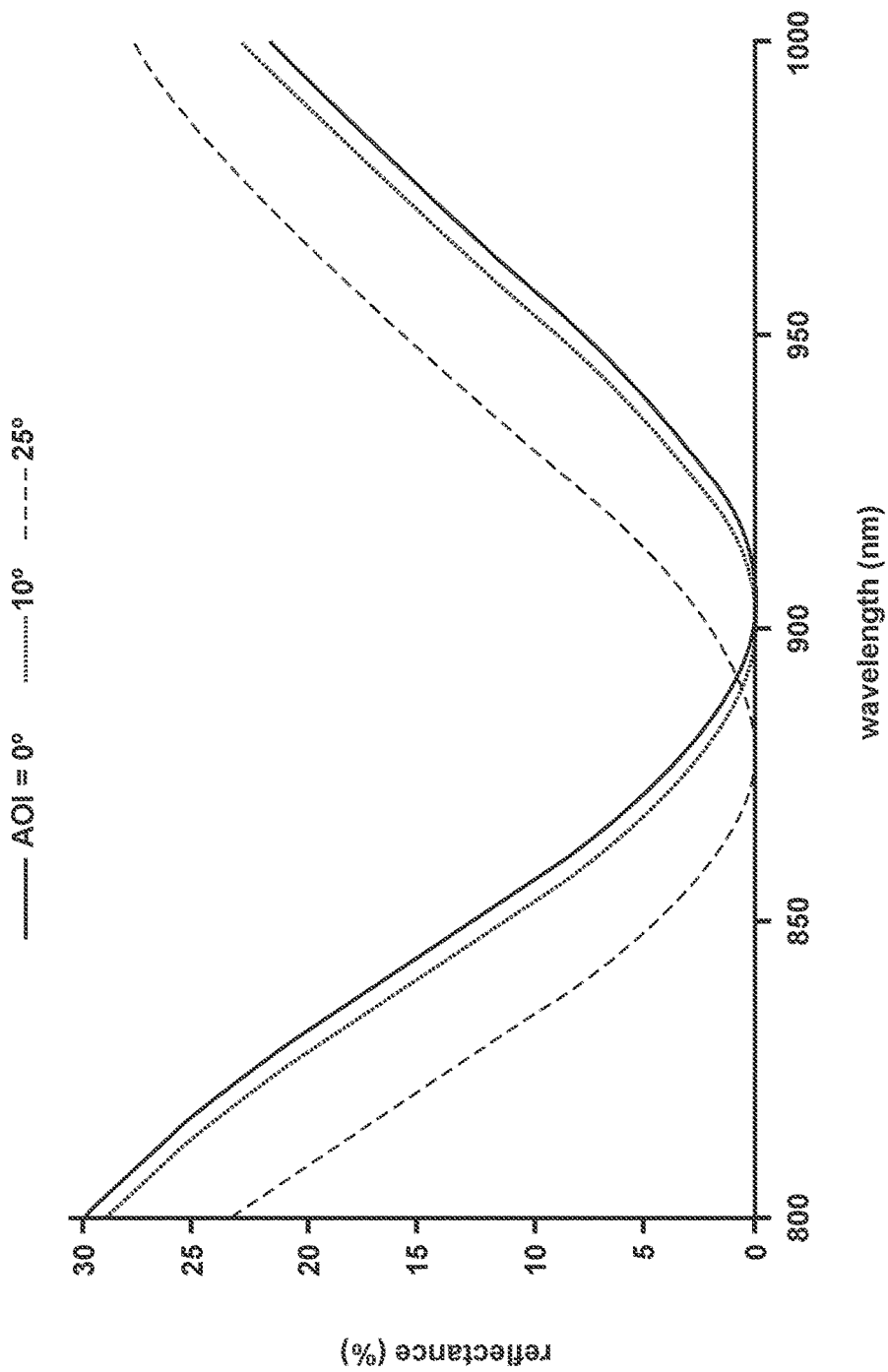
FIG. 10C is a graph of percentage reflectance off of the window described in FIG. 10A, illustrating a percentage reflectance close to 0% for the 905 nm wavelength at a 0° angle of incidence, but varying considerably as the angle of incidence changes and as wavelength changes.

As the graphs reproduced at FIGS. 9A (for Example 4) and 10A (for Example 4D) illustrate, the increased thickness of the layer 2 in the table above of Example 4 relative to Example 4D resulted in a narrowing of the range of wavelengths around 905 nm that the window 24 transmits above any given transmittance percentage (such as above 90%), as well as greater sensitivity to the angle of incidence. Note that the graphs of FIGS. 9A and 10A are for transmittance through the terminal surface 44 only and not through the entire window 24 as in the other examples above. Similarly, a comparison of the graphs reproduced at FIGS. 9B and 10B illustrate that the larger thickness of layer 2 in Example 4 caused greater sensitivity in transmittance through the terminal surface 44 as a function of wavelength. A comparison of the graphs reproduced at FIGS. 9C and 10C reveal that the larger thickness of layer 2 in Example 4 caused greater sensitivity in reflectance off of the terminal surface 44 as a function of wavelength. The larger thickness of layer 2 in Example 4 compared to Example 4D demonstrates that the quantity and thicknesses of the other layers can nevertheless be configured to maximize transmittance and minimize reflectance of incident reflected radiation 28 having a wavelength of 905 nm and at an angle of incidence of zero degrees (0°). However, the larger thickness of layer 2 in Example 4 results in greater sensitivity to deviations of wavelength from 905 nm and angle of incidence from zero degrees (0°).

Example 5—The window 24 of Example 5 included a layered film 36 of twenty-one (21) alternating layers of a high refractive index material 40 ($Si_3N_4$) and a lower refractive index material 42 ($SiO_2$) sequentially disposed on top of one another, disposed on a strengthened aluminosilicate substrate 30, as shown in Table 5.

TABLE 5

Structure of Example 5

| Layer | Material | Refractive Index @905 nm | Physical Thickness (nm) |
|---|---|---|---|
| External Environment 26 | Air | 1 | |
| 1 | $SiO_2$ | 1.4685 | 138.5 |
| 2 | $Si_3N_4$ | 1.9805 | 5087.0 |
| 3 | $SiO_2$ | 1.4685 | 95.4 |
| 4 | $Si_3N_4$ | 1.9805 | 60.7 |
| 5 | $SiO_2$ | 1.4685 | 107.6 |
| 6 | $Si_3N_4$ | 1.9805 | 86.7 |
| 7 | $SiO_2$ | 1.4685 | 111.0 |
| 8 | $Si_3N_4$ | 1.9805 | 71.6 |
| 9 | $SiO_2$ | 1.4685 | 92.1 |
| 10 | $Si_3N_4$ | 1.9805 | 65.2 |
| 11 | $SiO_2$ | 1.4685 | 90.1 |
| 12 | $Si_3N_4$ | 1.9805 | 65.1 |
| 13 | $SiO_2$ | 1.4685 | 89.7 |
| 14 | $Si_3N_4$ | 1.9805 | 64.6 |
| 15 | $SiO_2$ | 1.4685 | 81.9 |
| 16 | $Si_3N_4$ | 1.9805 | 45.3 |
| 17 | $SiO_2$ | 1.4685 | 73.2 |
| 18 | $Si_3N_4$ | 1.9805 | 64.7 |
| 19 | $SiO_2$ | 1.4685 | 85.2 |
| 20 | $Si_3N_4$ | 1.9805 | 49.6 |
| 21 | $SiO_2$ | 1.4685 | 76.2 |
| Substrate 30 | Alunninosilicate glass | 1.5049 | 1000000 |
| Medium Within Enclosure 20 | Air | 1 | |
| Total Coating Thickness | | | 6701.2 |

Figure 11A:
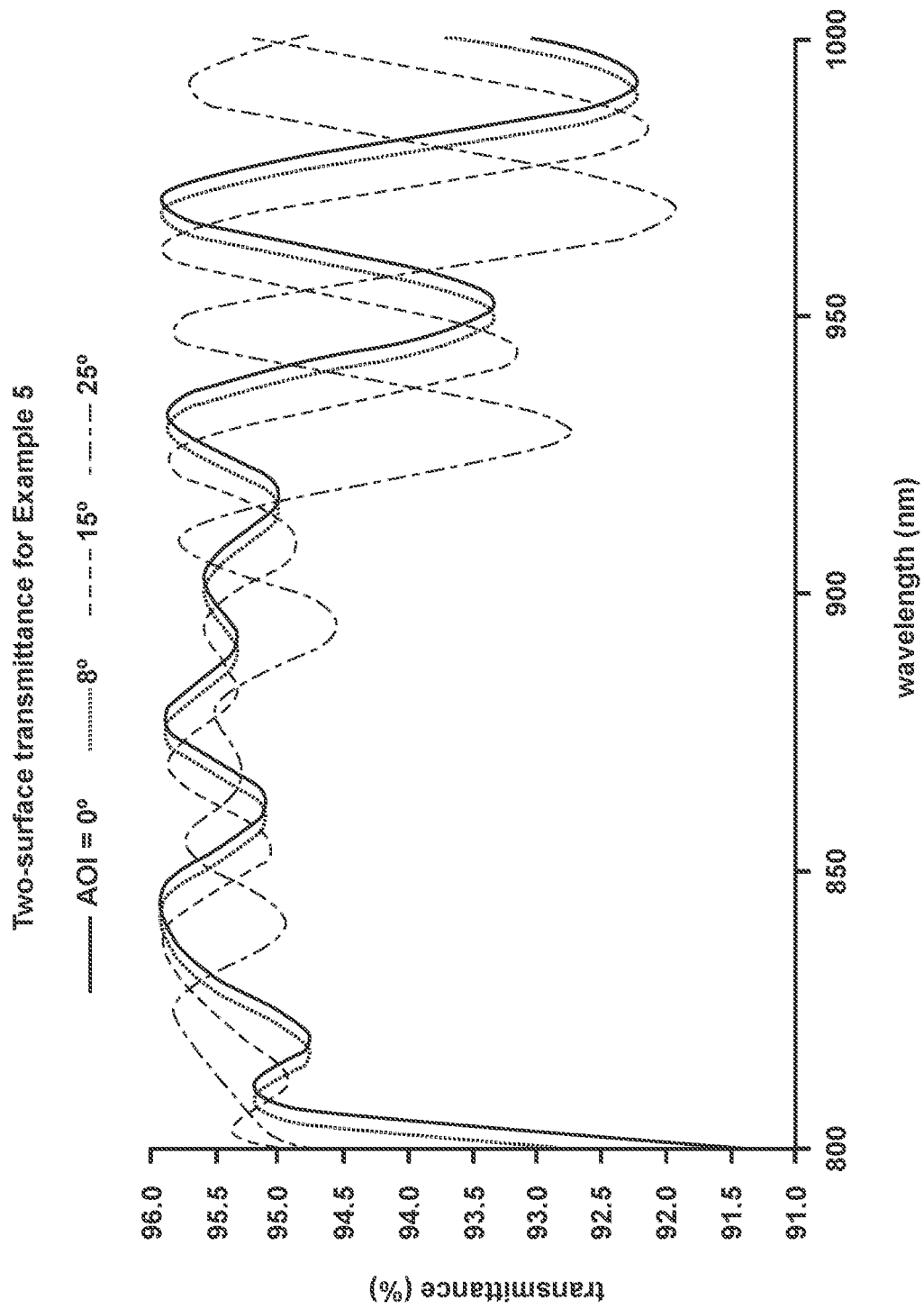
FIG. 11A is a graph of percentage transmittance through the window including a twenty-one (21) layer embodiment of the layered film with a 5087 nm thick layer of $Si_3N_4$ imparting hardness and scratch resistance, as set forth in Example 5, illustrating a percentage transmittance of greater than 94.5% through the window for wavelengths within the range of about 820 nm to about 920 nm, including 905 nm, for all angles of incidence from 8° to 25°, but reducing to greater than 92% within the wavelength range of about 920 nm to 1000 nm.
Figure 11B:
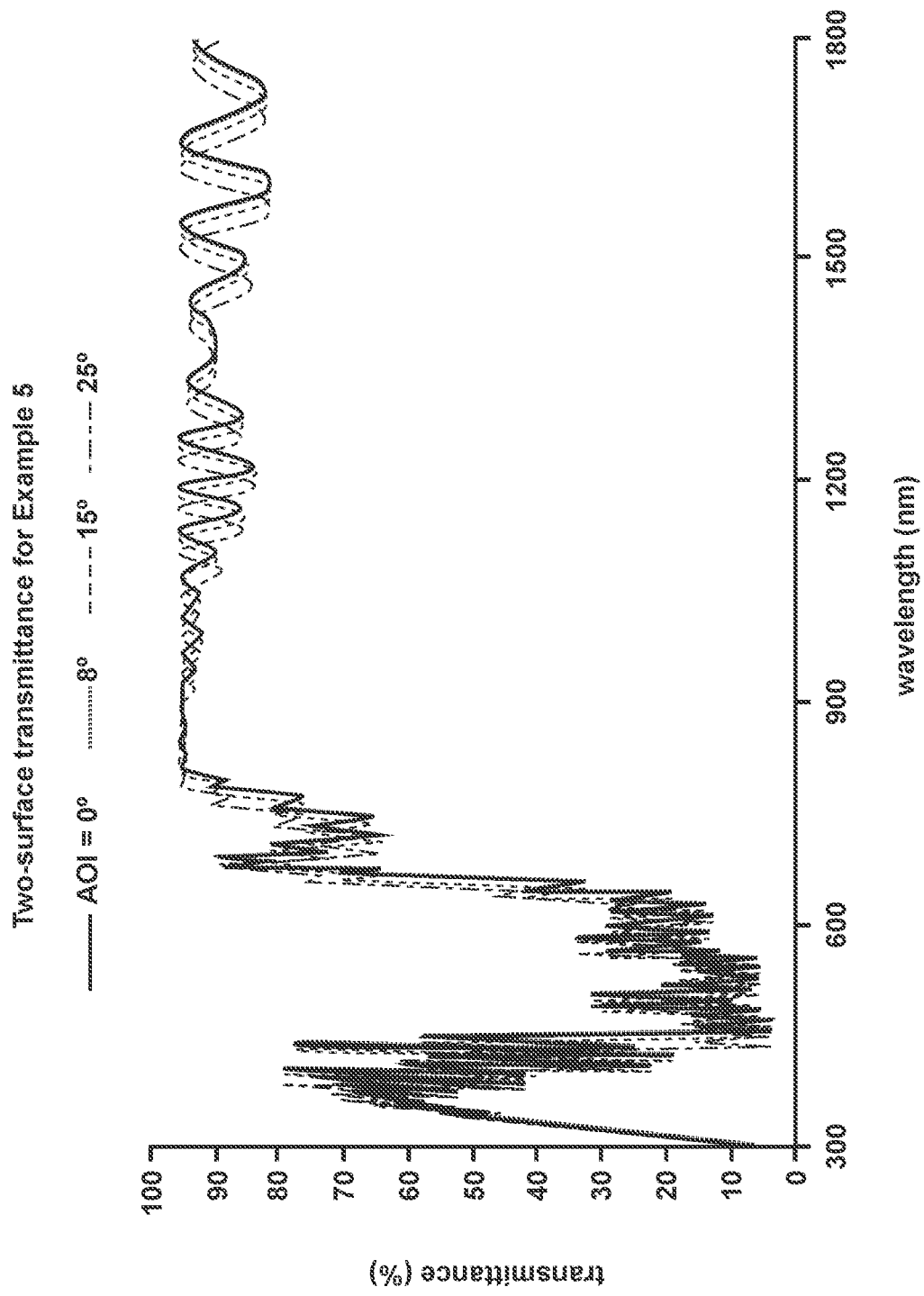
FIG. 11B is a graph of percentage transmittance through the window described in FIG. 11A, illustrating a percentage transmittance greater than 80% for wavelengths within the range of about 750 nm to about 1800 nm, for all angles of incidence from 0° to 25°, but a percentage transmittance below about 30% for wavelengths within the visible range of about 450 nm to about 650 nm.
Figure 11C:
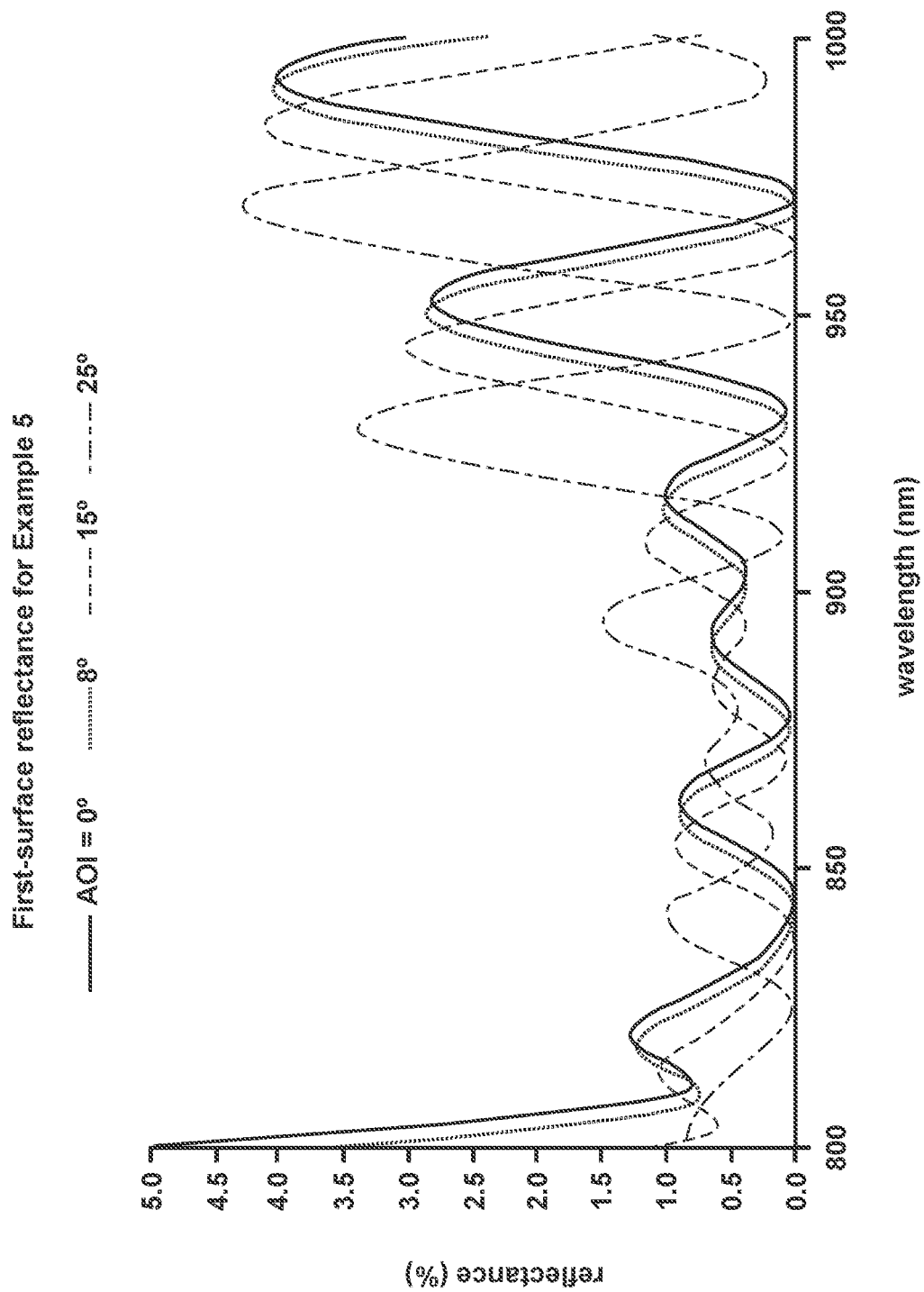
FIG. 11C is a graph of percentage reflectance off of the window described in FIG. 11A, illustrating a percentage reflectance less than 1.5% for the wavelength range of about 820 nm to about 920 nm for all angles of incidence from 0° to 25°, and less than about 4% for the wavelength range of 920 nm to 1000 nm for all angles of incidence from 0° to 25°.
Figure 11D:
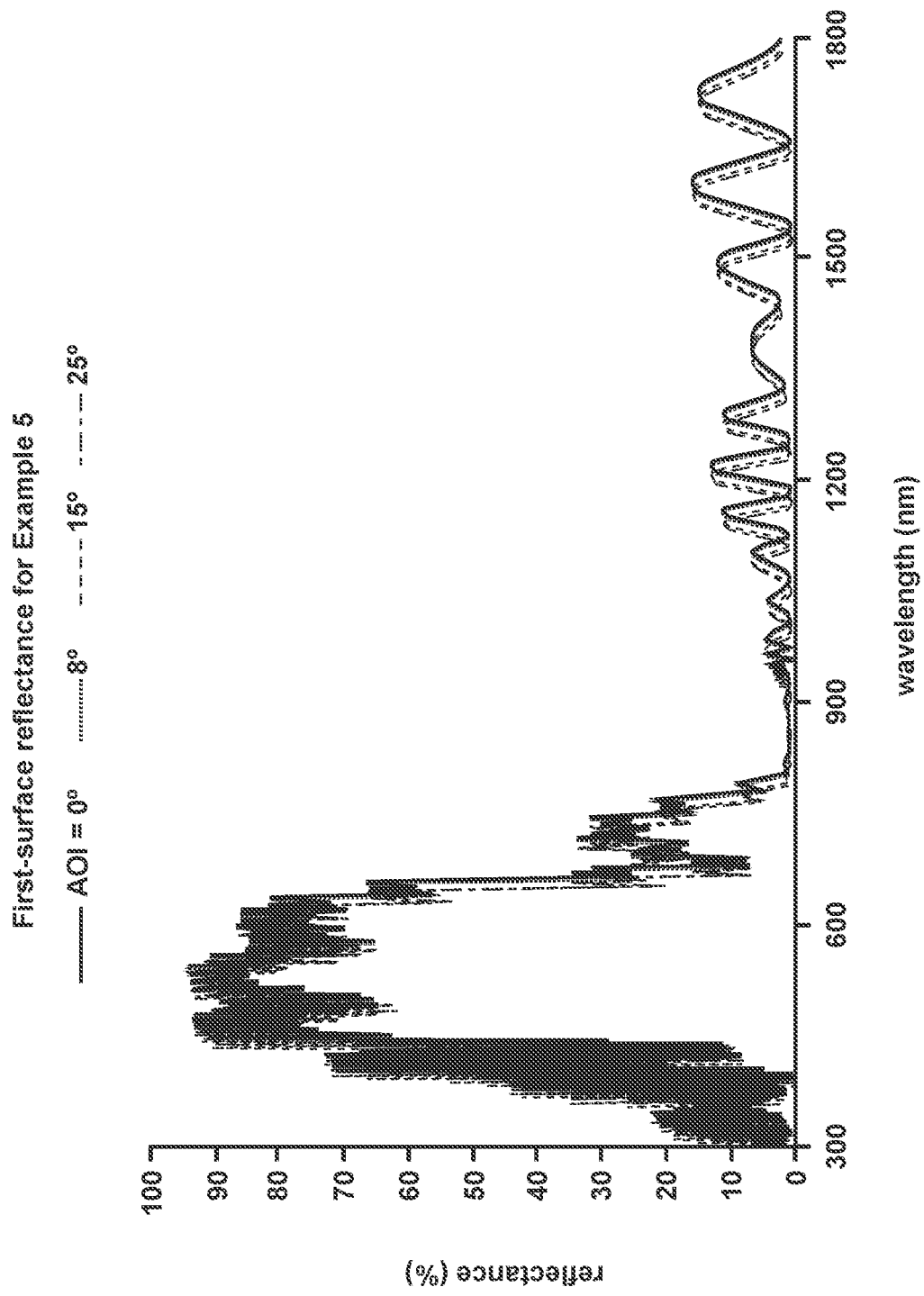
FIG. 11D is a graph of percentage reflectance off of the window described in FIG. 11A, illustrating a percentage reflectance above 60% for wavelengths within the visible light range from about 400 nm to about 700 nm, for all angles of incidence from 0° to 25°.

The graph reproduced at FIG. 11A reveals that the window 24 of Example 5 provides high transmittance (>94.5%) through the window 24 for the 905 nm wavelength throughout a range of angles of incidence from 0° to 25°. The graph reproduced at FIG. 11B reveals that the window of Example 5 simultaneously provides reduced transmittance of visible light, especially within the wavelength of 450 nm-650 nm, where approximately only 5 to 30 percent of visible light of those wavelengths is transmitted through the window 24. The graph reproduced at FIG. 11C reveals that the window 24 of Example 5 reflects little (1.5%, <1%, or even <0.5%) of the 905 nm wavelength for all angles of incidence from 0° to 25°. The graph reproduced at FIG. 11D reveals that the window 24 of Example 5 reflects between 60% and 90% of visible light in the 450 nm-650 nm wavelength range, while simultaneously reflecting little (less than 20%) incident electromagnetic radiation over the entire wavelength range of 800 nm-1800 nm, including less than 1% at wavelengths of 905 nm and 1550 nm incident at 0° to 8°. The window 24 of Example 5 provides the above transmittance and reflectance properties optimized around 905 nm while additionally providing scratch resistance with the thickest outermost layer of high refractive index material 40 ($Si_3N_4$) (layer 2) protecting the majority of other layers of the layered film 36 layered beneath.

Example 6—The window 24 of Example 6 included a layered film 36 of thirty-one (31) alternating layers of a high refractive index material 40 ($Si_3N_4$) and a lower refractive index material 42 ($SiO_2$) sequentially disposed on top of one another, disposed on a strengthened aluminosilicate substrate 30, as shown in Table 6.

TABLE 6

Structure of Example 6

| Layer | Material | Refractive Index @905 nm | Physical Thickness (nm) |
|---|---|---|---|
| External Environment 26 | Air | 1 | |
| 1 | $SiO_2$ | 1.4685 | 136.7 |
| 2 | $Si_3N_4$ | 1.9805 | 2270.0 |
| 3 | $SiO_2$ | 1.4685 | 110.2 |
| 4 | $Si_3N_4$ | 1.9805 | 93.6 |
| 5 | $SiO_2$ | 1.4685 | 93.6 |
| 6 | $Si_3N_4$ | 1.9805 | 77.8 |
| 7 | $SiO_2$ | 1.4685 | 147.1 |
| 8 | $Si_3N_4$ | 1.9805 | 85.0 |
| 9 | $SiO_2$ | 1.4685 | 114.5 |
| 10 | $Si_3N_4$ | 1.9805 | 89.3 |
| 11 | $SiO_2$ | 1.4685 | 97.9 |
| 12 | $Si_3N_4$ | 1.9805 | 67.4 |
| 13 | $SiO_2$ | 1.4685 | 89.9 |
| 14 | $Si_3N_4$ | 1.9805 | 67.0 |
| 15 | $SiO_2$ | 1.4685 | 133.9 |
| 16 | $Si_3N_4$ | 1.9805 | 51.5 |
| 17 | $SiO_2$ | 1.4685 | 84.0 |
| 18 | $Si_3N_4$ | 1.9805 | 62.5 |
| 19 | $SiO_2$ | 1.4685 | 87.6 |
| 20 | $Si_3N_4$ | 1.9805 | 65.0 |
| 21 | $SiO_2$ | 1.4685 | 88.6 |
| 22 | $Si_3N_4$ | 1.9805 | 57.2 |
| 23 | $SiO_2$ | 1.4685 | 64.5 |
| 24 | $Si_3N_4$ | 1.9805 | 47.4 |
| 25 | $SiO_2$ | 1.4685 | 80.5 |
| 26 | $Si_3N_4$ | 1.9805 | 54.3 |
| 27 | $SiO_2$ | 1.4685 | 63.0 |
| 28 | $Si_3N_4$ | 1.9805 | 55.2 |
| 29 | $SiO_2$ | 1.4685 | 84.7 |
| 30 | $Si_3N_4$ | 1.9805 | 57.9 |
| 31 | $SiO_2$ | 1.4685 | 68.7 |
| Substrate 30 | Alunninosilicate glass | 1.5049 | 1000000 |
| Medium Within Enclosure 20 | Air | | 1 |
| Total Coating Thickness | | | 4746.6 |

Figure 12A:
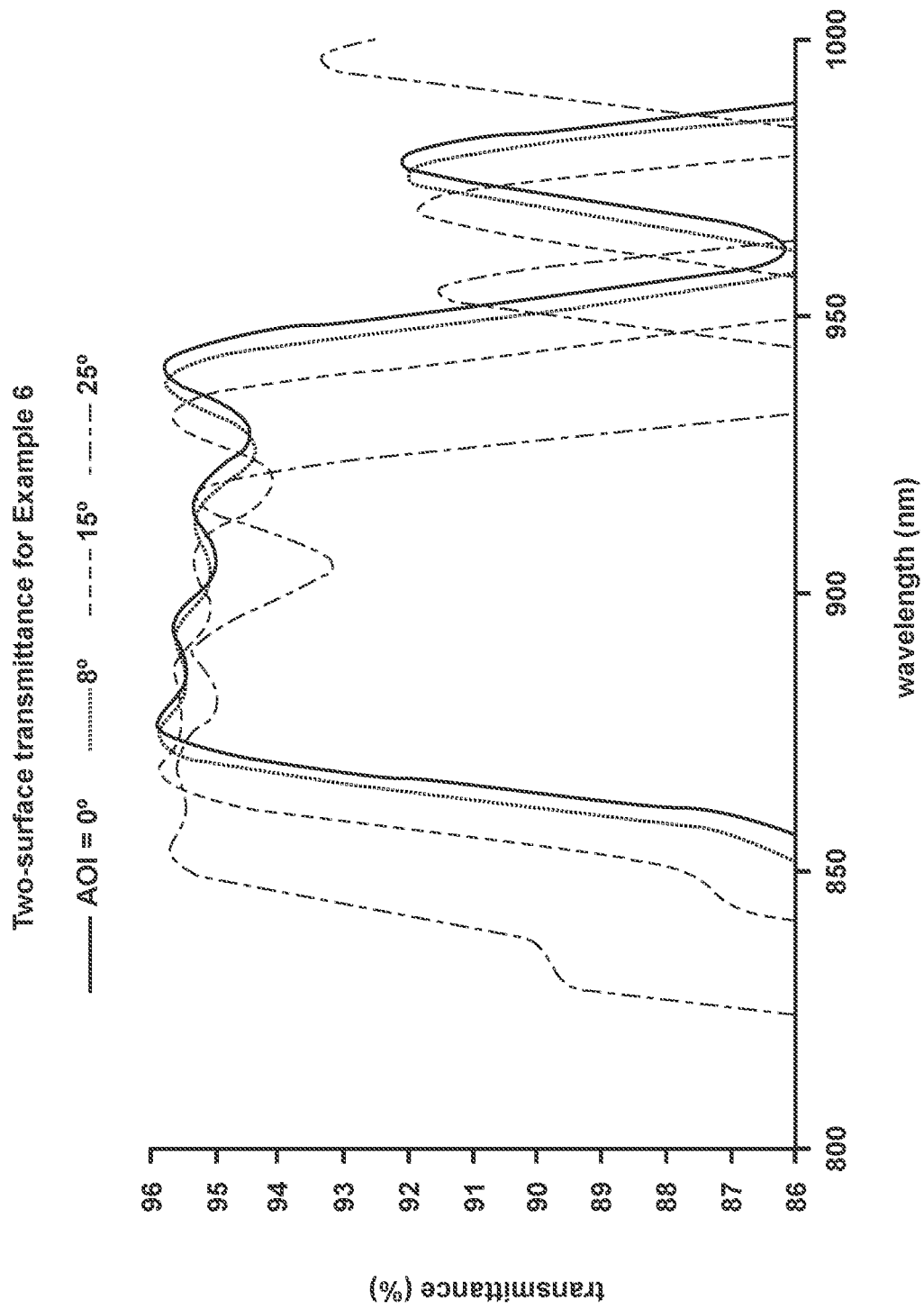
FIG. 12A is a graph of percentage transmittance through the window including a thirty-one (31) layer embodiment of the layered film with a 2270 nm thick layer of $Si_3N_4$ imparting hardness and scratch resistance, as set forth in Example 6, illustrating a percentage transmittance of greater than 93.5% through the window for wavelengths within the range of about 870 nm to about 930 nm, including 905 nm, for all angles of incidence up to 25°, but a decreased percentage of transmittance for wavelengths that fall outside of that wavelength range.
Figure 12B:
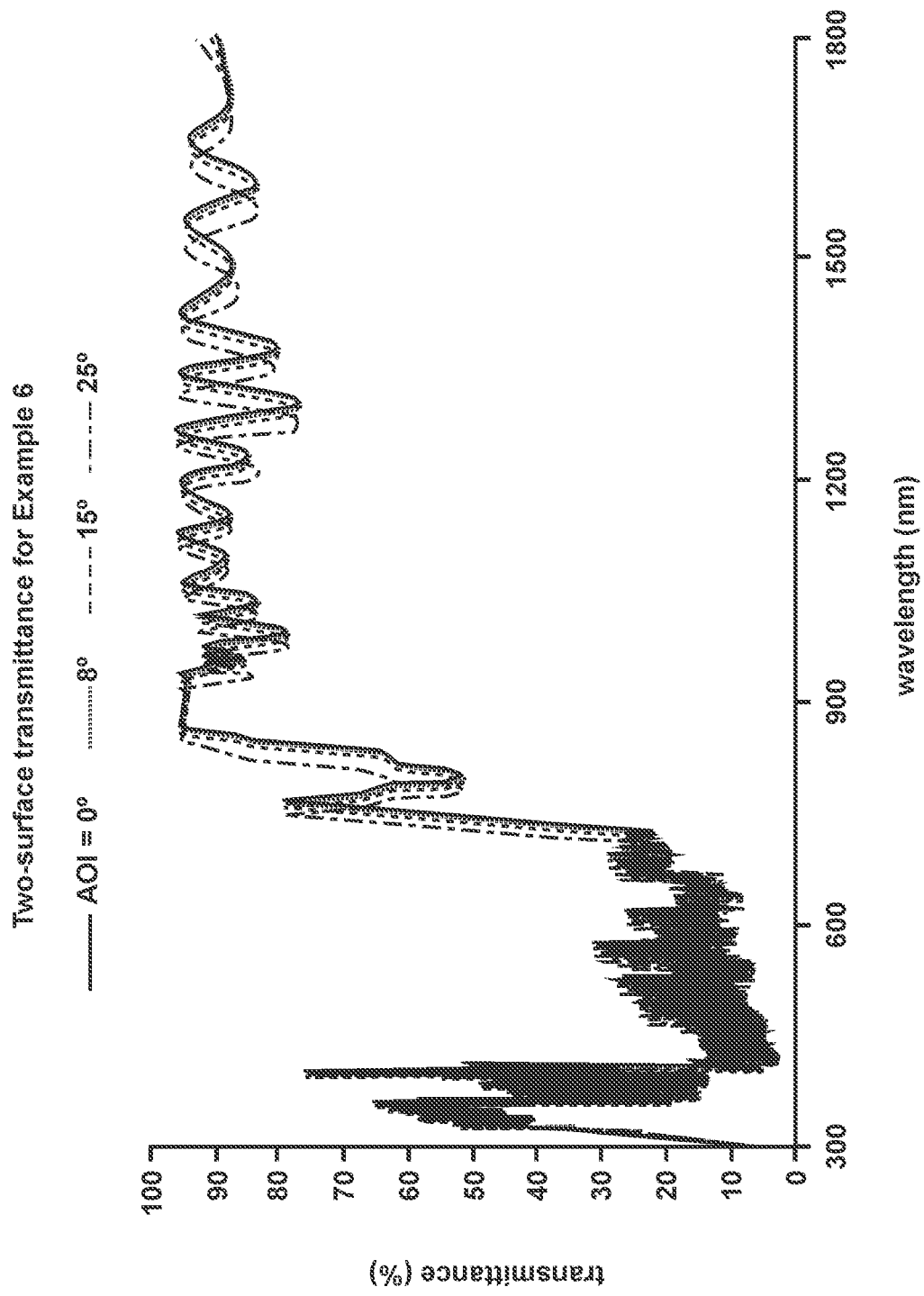
FIG. 12B is a graph of percentage transmittance through the window described in FIG. 12A, illustrating a percentage transmittance greater than 75% for wavelengths of the range from about 850 nm to about 1800 nm, for all angles of incidence to 25°, but a percentage transmittance below about 30% for wavelengths within the visible range from about 400 nm to about 750 nm.
Figure 12C:
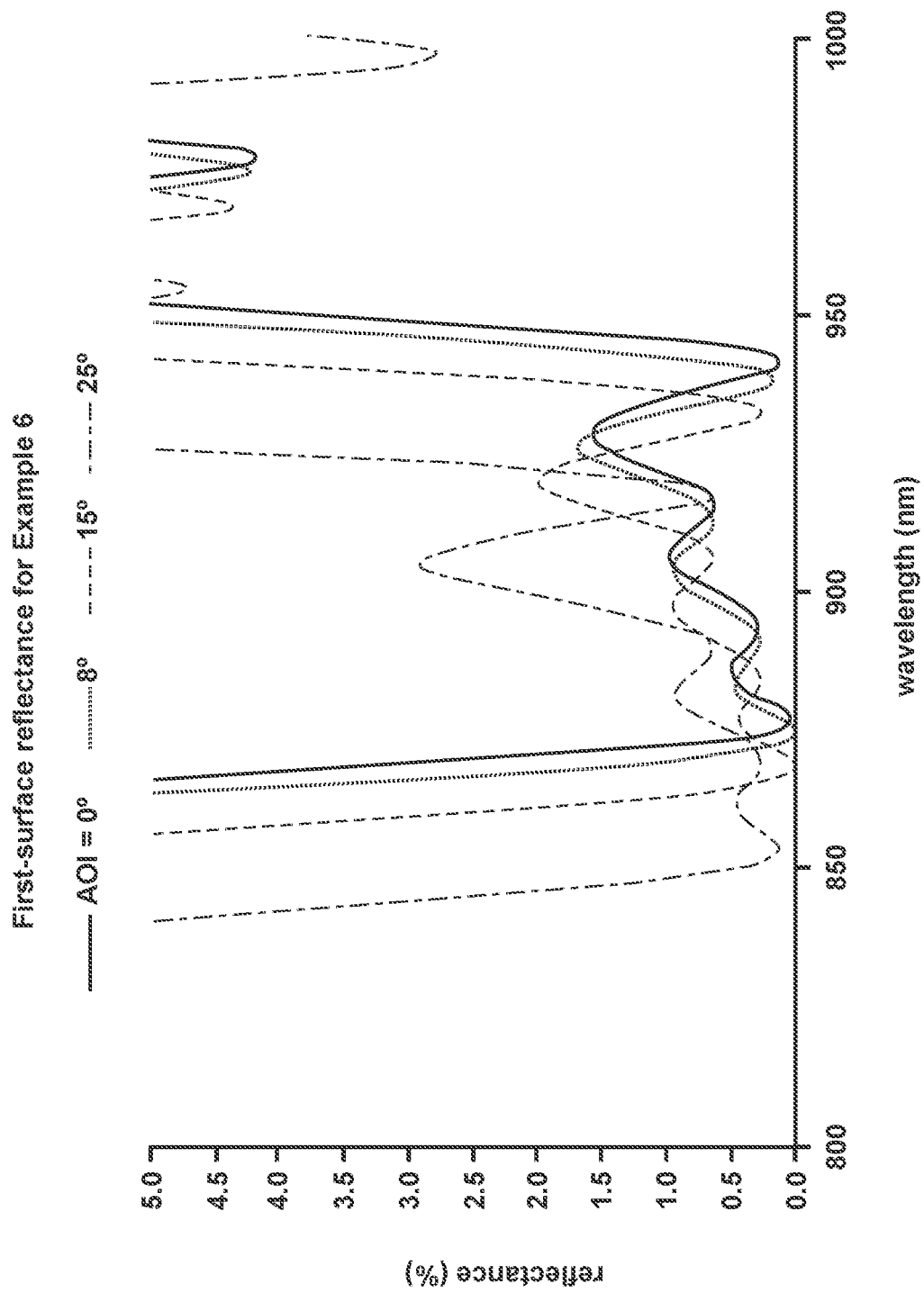
FIG. 12C is a graph of percentage reflectance off of the window described in FIG. 12A, illustrating a percentage reflectance less than 3% for the wavelength range of about 875 nm to about 925 nm for all angles of incidence up to 25°, but increased reflectance for wavelengths outside of that wavelength range.
Figure 12D:
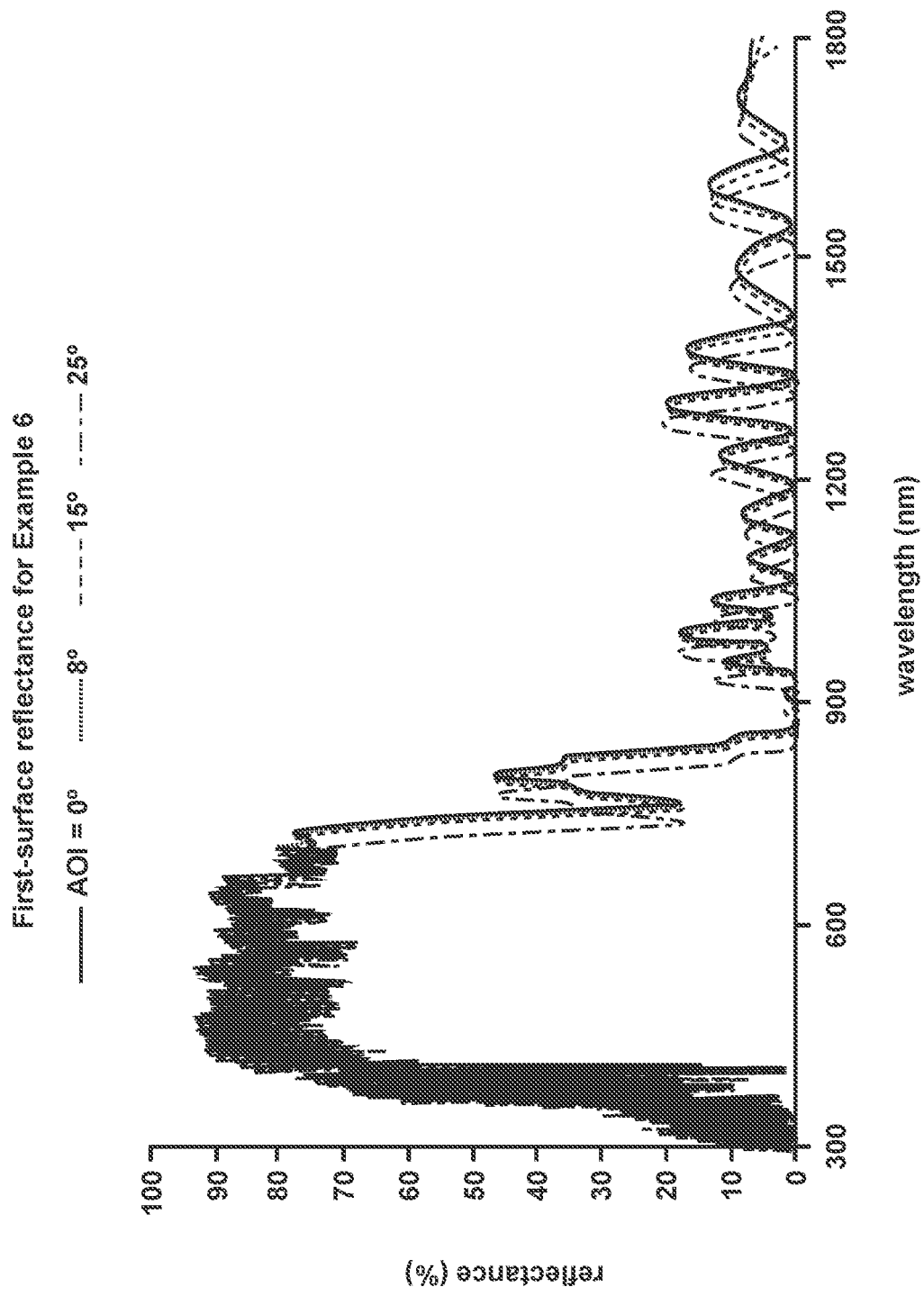
FIG. 12D is a graph of percentage reflectance off of the window described in FIG. 12A, illustrating a percentage reflectance below 20% for wavelengths within the range of about 875 nm to about 1800 nm but above 70% for wavelengths within the range of about 400 nm to about 700 nm.

The graph reproduced at FIG. 12A reveals that the window 24 of Example 6 provides high transmittance (>95%) at the 905 nm wavelength for angles of incidence from 0° to 8°, and the transmittance drops off sharply for wavelengths shorter than approximately 870 nm. The graph reproduced at FIG. 12B reveals that the window 24 of Example 6 transmits less than 30% of visible light through a wide visible light wavelength range between approximately 400 nm and 740 nm, while being optimized for high transmittance at 905 nm. The graph reproduced at FIG. 12C reveals that the terminal surface 44 reflects less than 1% of the 905 nm wavelength for angles of incidence between 0° and 15°, while reflecting less than 3% of the 905 nm wavelength for all angles of incidence 25° and less, with reflection increasing drastically outside of the approximate range of 875 nm to 925 nm. The graph reproduced at FIG. 12D reveals that the terminal surface 44 reflects more than 65% of visible light within the wavelength range of 450 nm to 700 nm, peaking above 90% for various wavelengths within that range. In addition, the terminal surface 44 has a reflectance of less than 25% for wavelengths within the range of 800 nm-1800, with a reflectance of less than 2% at the wavelength of 1550 nm at angles of incidence of between 0° and 8°. The window 24 of Example 6 provides the above transmittance and reflectance properties optimized around 905 nm, as well as low reflectivity also at 1550 nm, while additionally providing scratch resistance with the thickest outermost layer of high refractive index material 40 ($Si_3N_4$) (layer 2) protecting the majority of other layers of the layered film 36 layered beneath.

Example 7—The window 24 of Example 7 included a layered film 36 of fifty-one (51) alternating layers of a high refractive index material 40 ($Si_3N_4$) and a lower refractive index material 42 ($SiO_2$) sequentially disposed on top of one another, disposed on a strengthened aluminosilicate substrate 30, as shown in Table 7.

TABLE 7

Structure of Example 7

| Layer | Material | Refractive Index @905 nm | Physical Thickness (nm) |
|---|---|---|---|
| External Environment 26 | Air | 1 | |
| 1 | $SiO_2$ | 1.4685 | 175.3 |
| 2 | $Si_3N_4$ | 1.9805 | 5130.0 |

TABLE 7-continued

Structure of Example 7

| Layer | Material | Refractive Index @905 nm | Physical Thickness (nm) |
|---|---|---|---|
| 3 | SiO$_2$ | 1.4685 | 131.6 |
| 4 | Si$_3$N$_4$ | 1.9805 | 58.0 |
| 5 | SiO$_2$ | 1.4685 | 121.6 |
| 6 | Si$_3$N$_4$ | 1.9805 | 91.3 |
| 7 | SiO$_2$ | 1.4685 | 122.3 |
| 8 | Si$_3$N$_4$ | 1.9805 | 95.9 |
| 9 | SiO$_2$ | 1.4685 | 120.7 |
| 10 | Si$_3$N$_4$ | 1.9805 | 92.7 |
| 11 | SiO$_2$ | 1.4685 | 118.1 |
| 12 | Si$_3$N$_4$ | 1.9805 | 76.3 |
| 13 | SiO$_2$ | 1.4685 | 110.3 |
| 14 | Si$_3$N$_4$ | 1.9805 | 67.8 |
| 15 | SiO$_2$ | 1.4685 | 108.4 |
| 16 | Si$_3$N$_4$ | 1.9805 | 68.1 |
| 17 | SiO$_2$ | 1.4685 | 105.2 |
| 18 | Si$_3$N$_4$ | 1.9805 | 68.4 |
| 19 | SiO$_2$ | 1.4685 | 105.2 |
| 20 | Si$_3$N$_4$ | 1.9805 | 88.5 |
| 21 | SiO$_2$ | 1.4685 | 99.9 |
| 22 | Si$_3$N$_4$ | 1.9805 | 55.0 |
| 23 | SiO$_2$ | 1.4685 | 100.0 |
| 24 | Si$_3$N$_4$ | 1.9805 | 66.8 |
| 25 | SiO$_2$ | 1.4685 | 94.9 |
| 26 | Si$_3$N$_4$ | 1.9805 | 61.7 |
| 27 | SiO$_2$ | 1.4685 | 96.2 |
| 28 | Si$_3$N$_4$ | 1.9805 | 70.2 |
| 29 | SiO$_2$ | 1.4685 | 89.8 |
| 30 | Si$_3$N$_4$ | 1.9805 | 45.1 |
| 31 | SiO$_2$ | 1.4685 | 81.7 |
| 32 | Si$_3$N$_4$ | 1.9805 | 50.4 |
| 33 | SiO$_2$ | 1.4685 | 87.2 |
| 34 | Si$_3$N$_4$ | 1.9805 | 57.3 |
| 35 | SiO$_2$ | 1.4685 | 86.2 |
| 36 | Si$_3$N$_4$ | 1.9805 | 61.5 |
| 37 | SiO$_2$ | 1.4685 | 84.4 |
| 38 | Si$_3$N$_4$ | 1.9805 | 56.7 |
| 39 | SiO$_2$ | 1.4685 | 74.9 |
| 40 | Si$_3$N$_4$ | 1.9805 | 44.4 |
| 41 | SiO$_2$ | 1.4685 | 76.5 |
| 42 | Si$_3$N$_4$ | 1.9805 | 49.4 |
| 43 | SiO$_2$ | 1.4685 | 68.7 |
| 44 | Si$_3$N$_4$ | 1.9805 | 44.9 |
| 45 | SiO$_2$ | 1.4685 | 77.0 |
| 46 | Si$_3$N$_4$ | 1.9805 | 46.7 |
| 47 | SiO$_2$ | 1.4685 | 67.6 |
| 48 | Si$_3$N$_4$ | 1.9805 | 54.0 |
| 49 | SiO$_2$ | 1.4685 | 76.2 |
| 50 | Si$_3$N$_4$ | 1.9805 | 42.8 |
| 51 | SiO$_2$ | 1.4685 | 69.5 |
| Substrate 30 | Alunninosilicate glass | 1.5049 | 1000000 |
| Medium Within Enclosure 20 | Air | 1 | |
| Total Coating Thickness | | | 9193.1 |

Figure 13A:
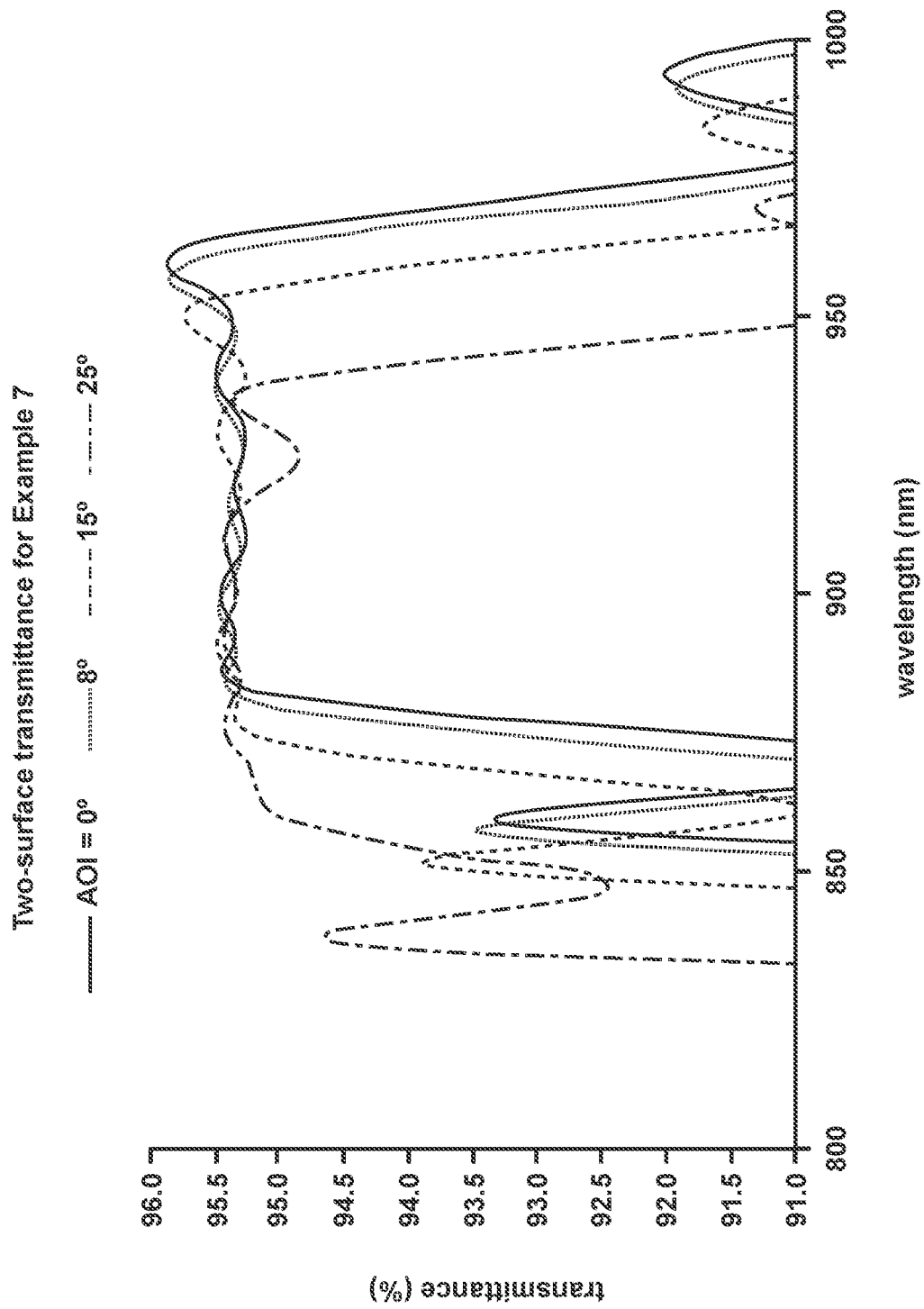
FIG. 13A is a graph of percentage transmittance through the window including a fifty-one (51) layer embodiment of the layered film with a 5130 nm thick layer of $Si_3N_4$ imparting hardness and scratch resistance, as set forth in Example 7, illustrating a percentage transmittance of greater than 93.5% through the window for wavelengths within the range of about 870 nm to about 930 nm, including 905 nm, for all angles of incidence up to 25°, but a decreased percentage transmittance for wavelengths outside of that wavelength range.
Figure 13B:
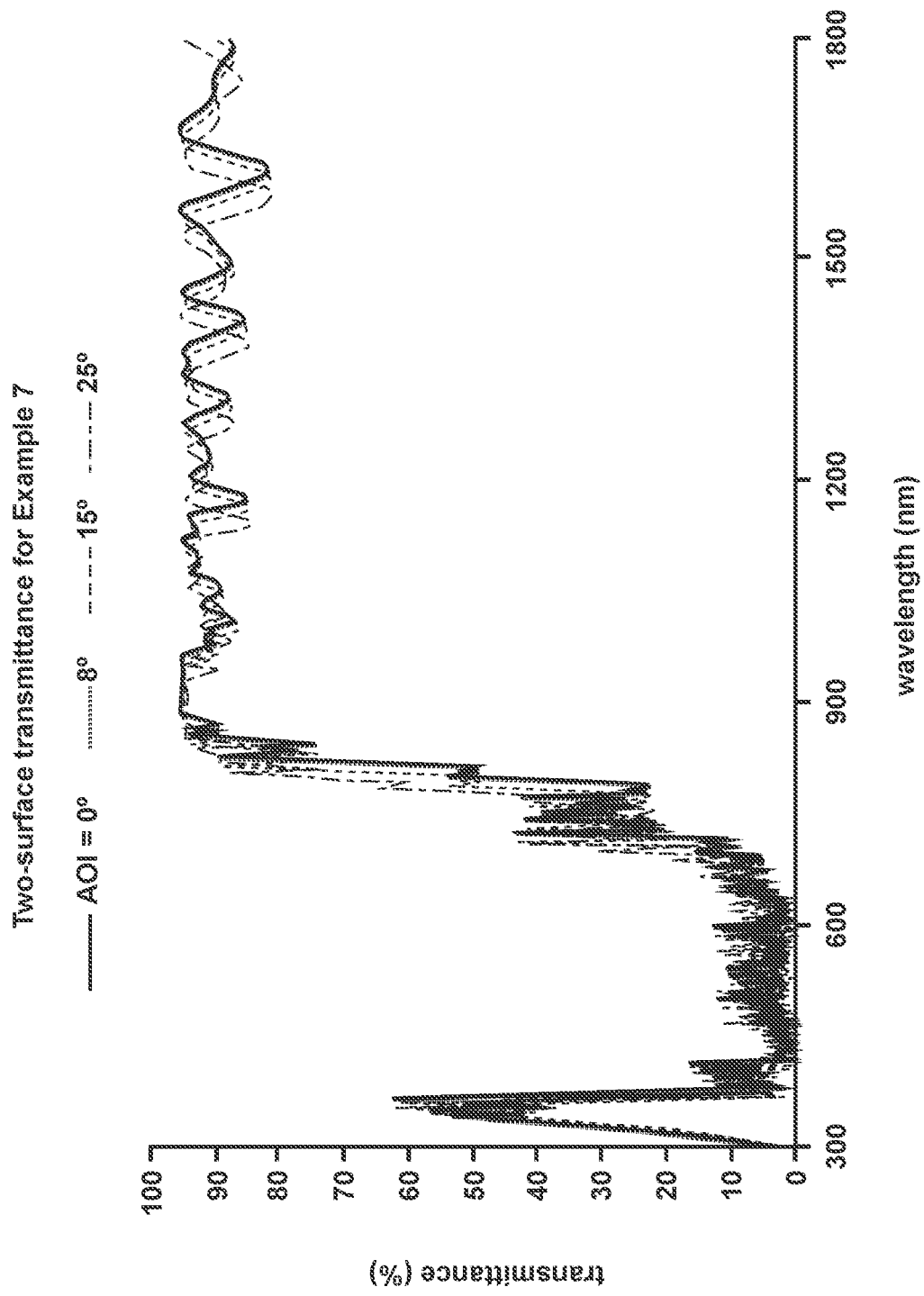
FIG. 13B is a graph of percentage transmittance through the window described in FIG. 13A, illustrating a percentage transmittance greater than 75% for wavelengths within the range of about 850 nm to about 1800 nm, for all angles of incidence to 25°, but a percentage transmittance below about 30% for wavelengths within the visible range from about 400 nm to about 750 nm.
Figure 13C:
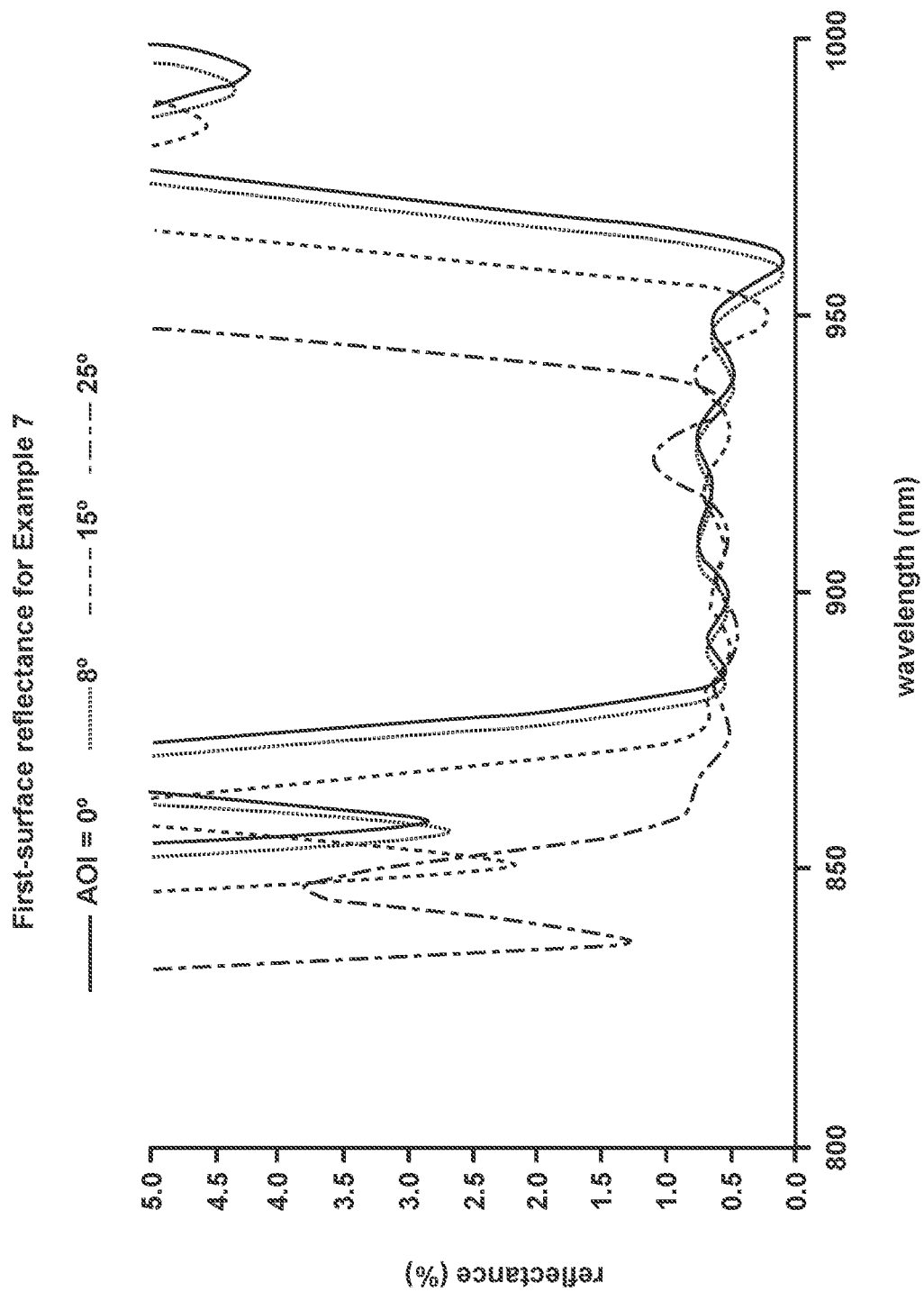
FIG. 13C is a graph of percentage reflectance off of the window described in FIG. 13A, illustrating a percentage reflectance less than 3% for the wavelength range of about 875 nm to about 925 nm for all angles of incidence up to 25°, but increasing outside of that wavelength range.
Figure 13D:
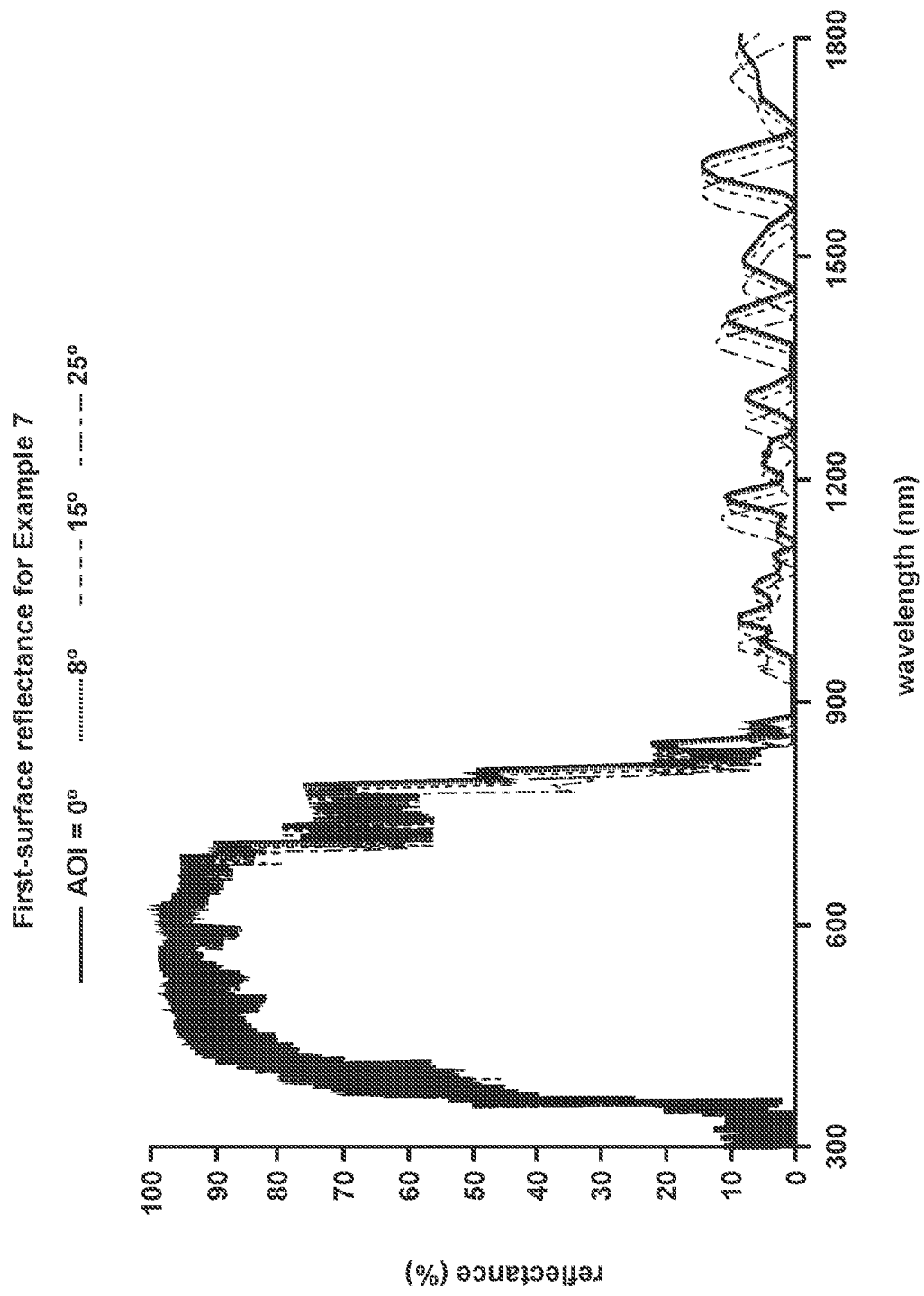
FIG. 13D is a graph of percentage reflectance off of the window described in FIG. 13A, illustrating a percentage reflectance below 20% for wavelengths within the range of about 875 nm to about 1800 nm but above 70% for wavelengths within the range of about 400 nm to about 700 nm.
Figure 14A:
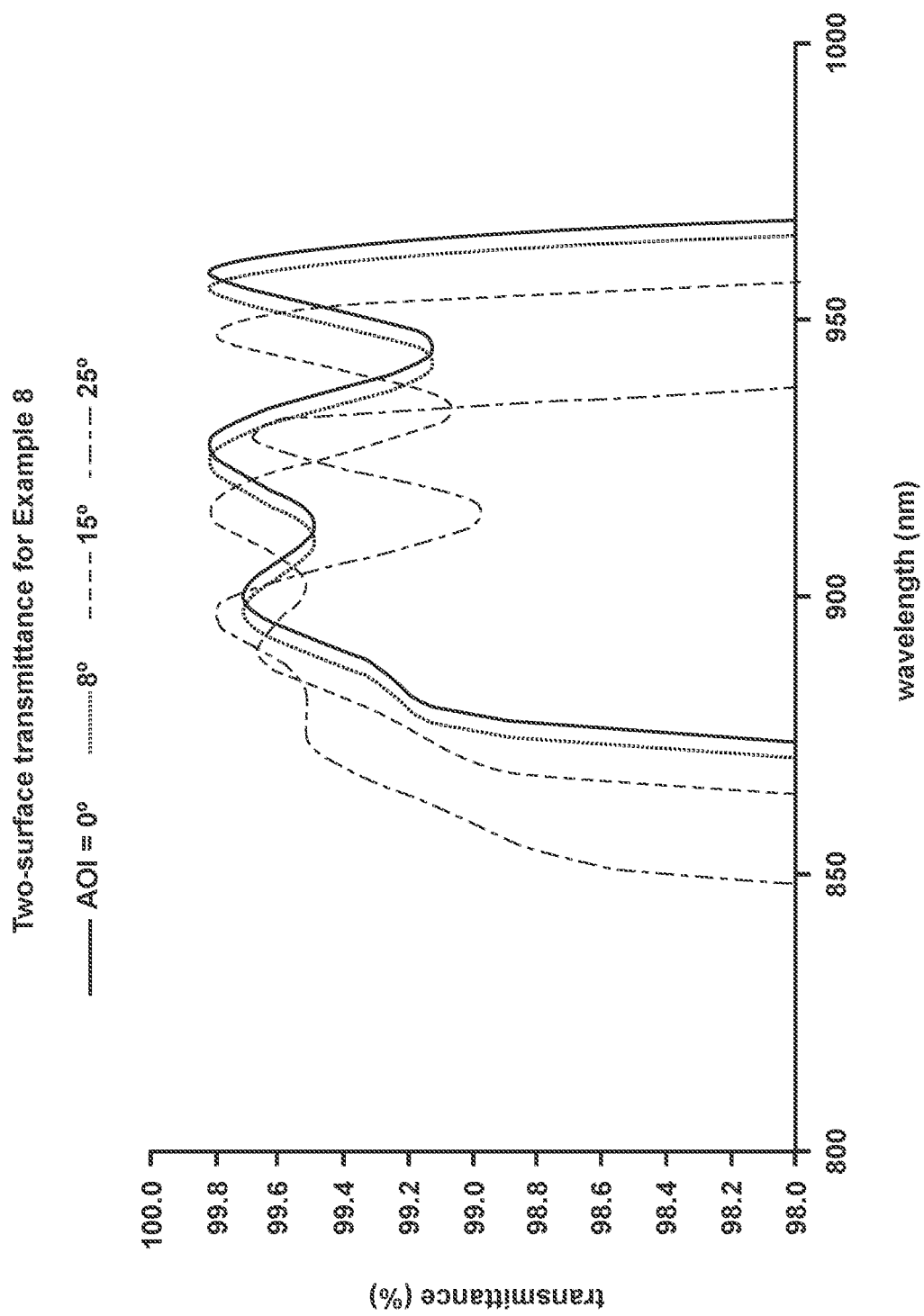
FIG. 14A is a graph of percentage transmittance through the window including a nine (9) layer embodiment of the layered film on the first surface with a 5000 nm thick layer of $Si_3N_4$ imparting hardness and scratch resistance, and an eighty-one (81) layer embodiment of the second layered film on the second surface, as set forth in Example 8, illustrating a percentage transmittance of greater than about 99% through the window for wavelengths within the range of about 875 nm to about 940 nm, including 905 nm, for all angles of incidence up to 25°, but a decreased percentage transmittance for wavelengths outside of that wavelength range.
Figure 14B:
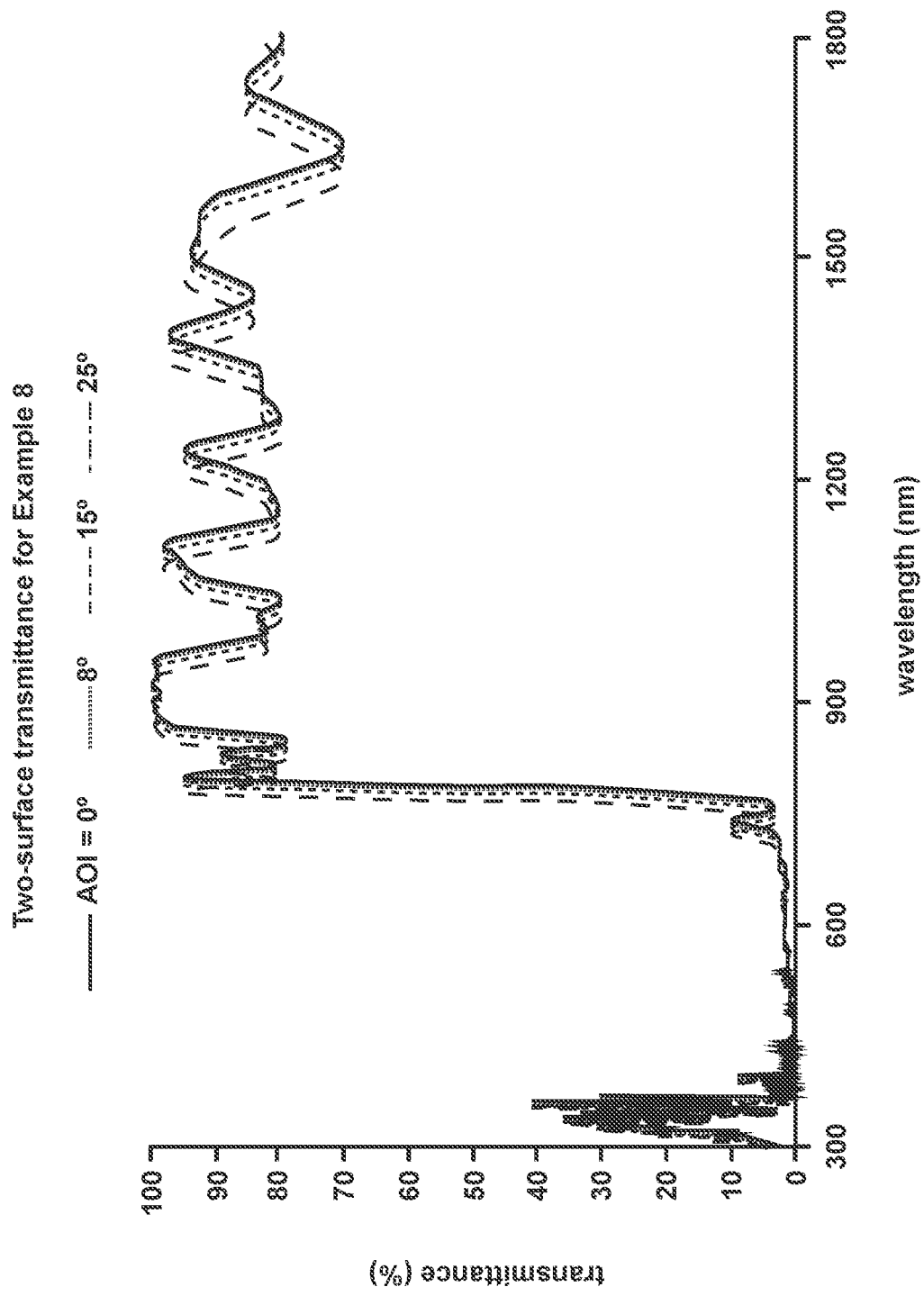
FIG. 14B is a graph of percentage transmittance through the window described in FIG. 14A, illustrating a percentage transmittance greater than 80% for wavelengths within the range of about 800 nm to about 1550 nm, for all angles of incidence to 25°, but a percentage transmittance below about 10% for wavelengths within the visible range from about 400 nm to about 750 nm.
Figure 14C:
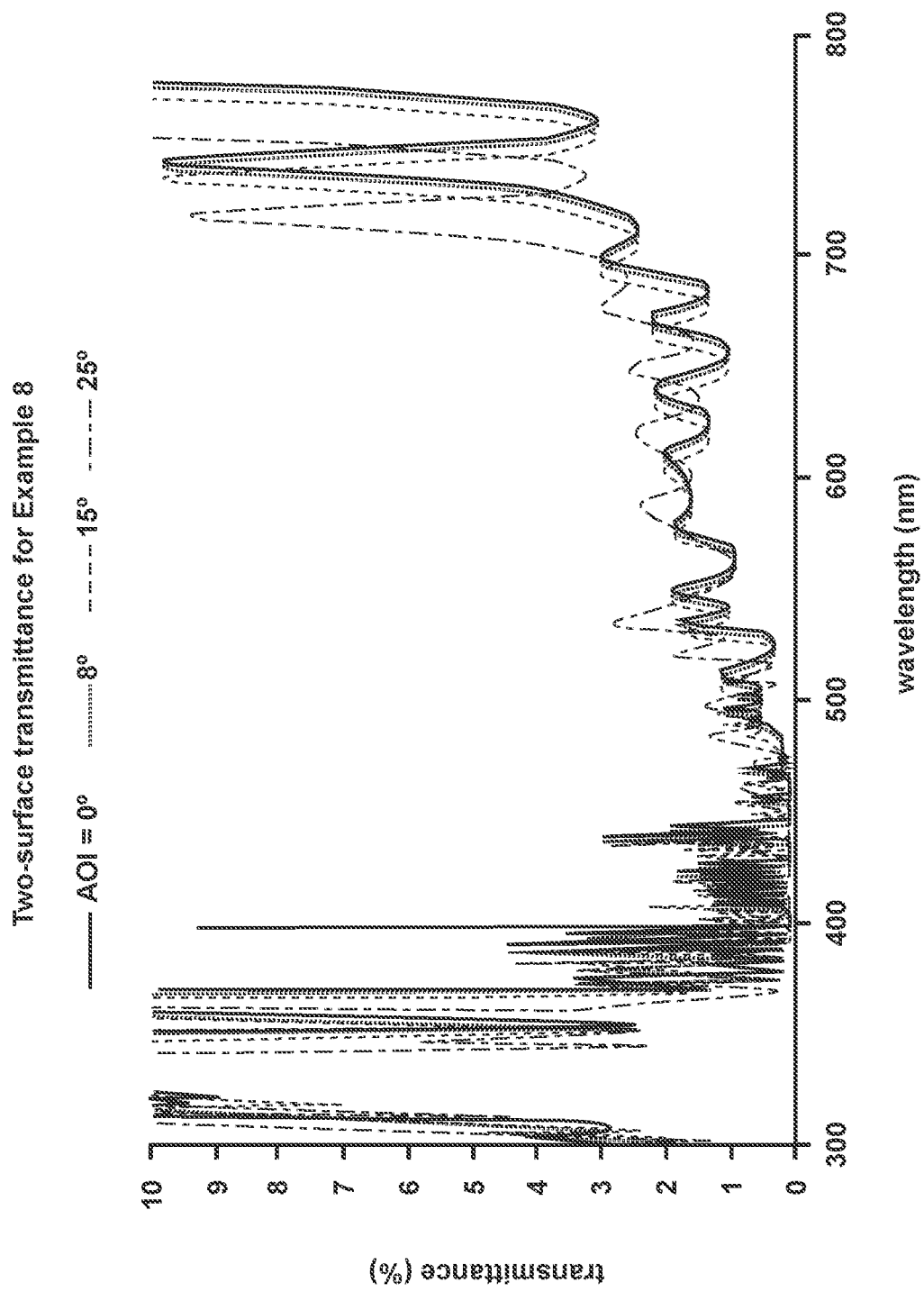
FIG. 14C is a graph of percentage transmittance through the window described in FIG. 14A, illustrating a percentage transmittance less than 3% for wavelengths within the range of about 420 nm to about 700 nm, for all angles of incidence to 25°.
Figure 14D:
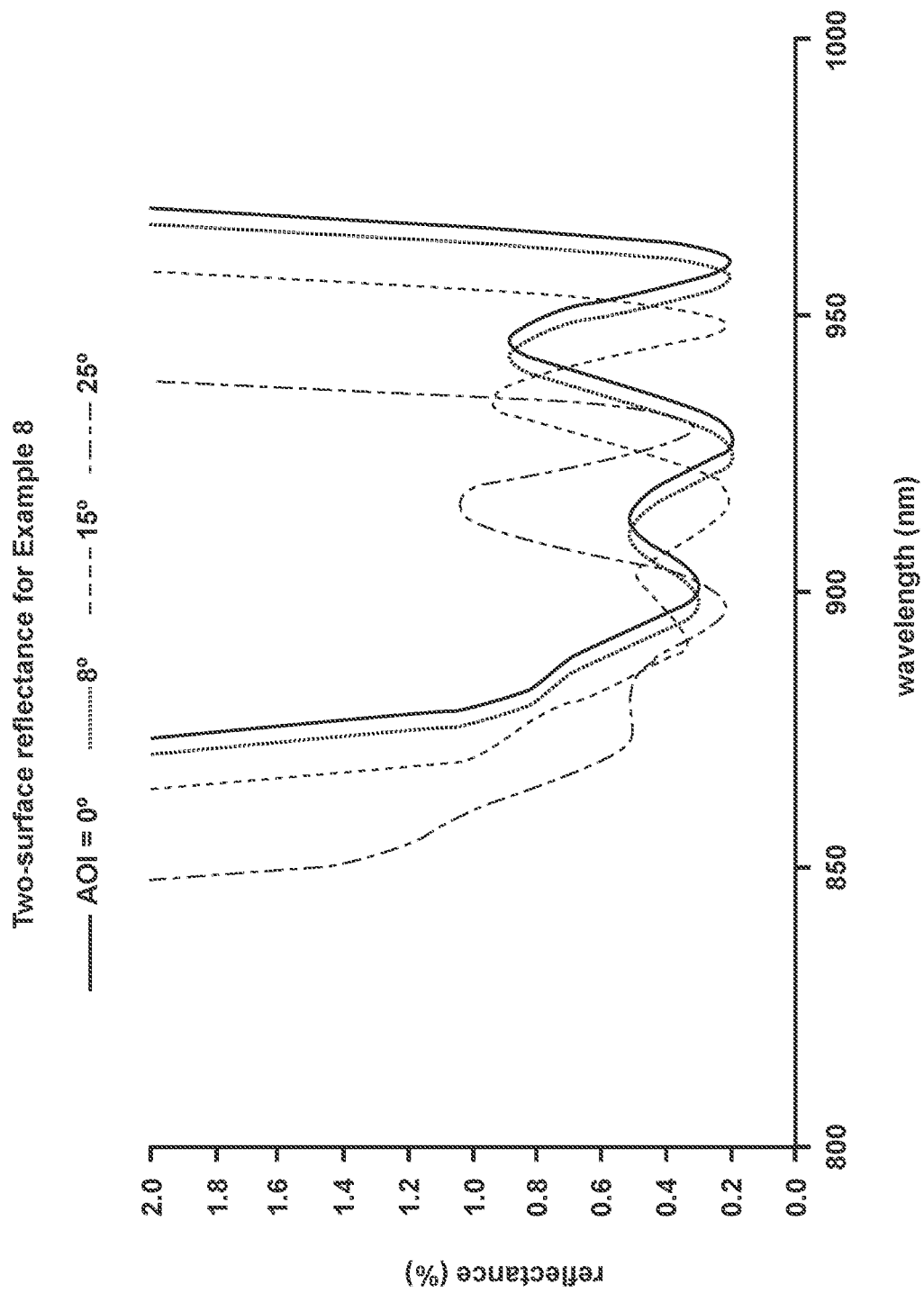
FIG. 14D is a graph of percentage reflectance off of the window described in FIG. 14A, illustrating a percentage reflectance less than 1% for the wavelength range of about 900 nm to about 940 nm, for all angles of incidence up to 25°, but increasing outside of that wavelength range.
Figure 14E:
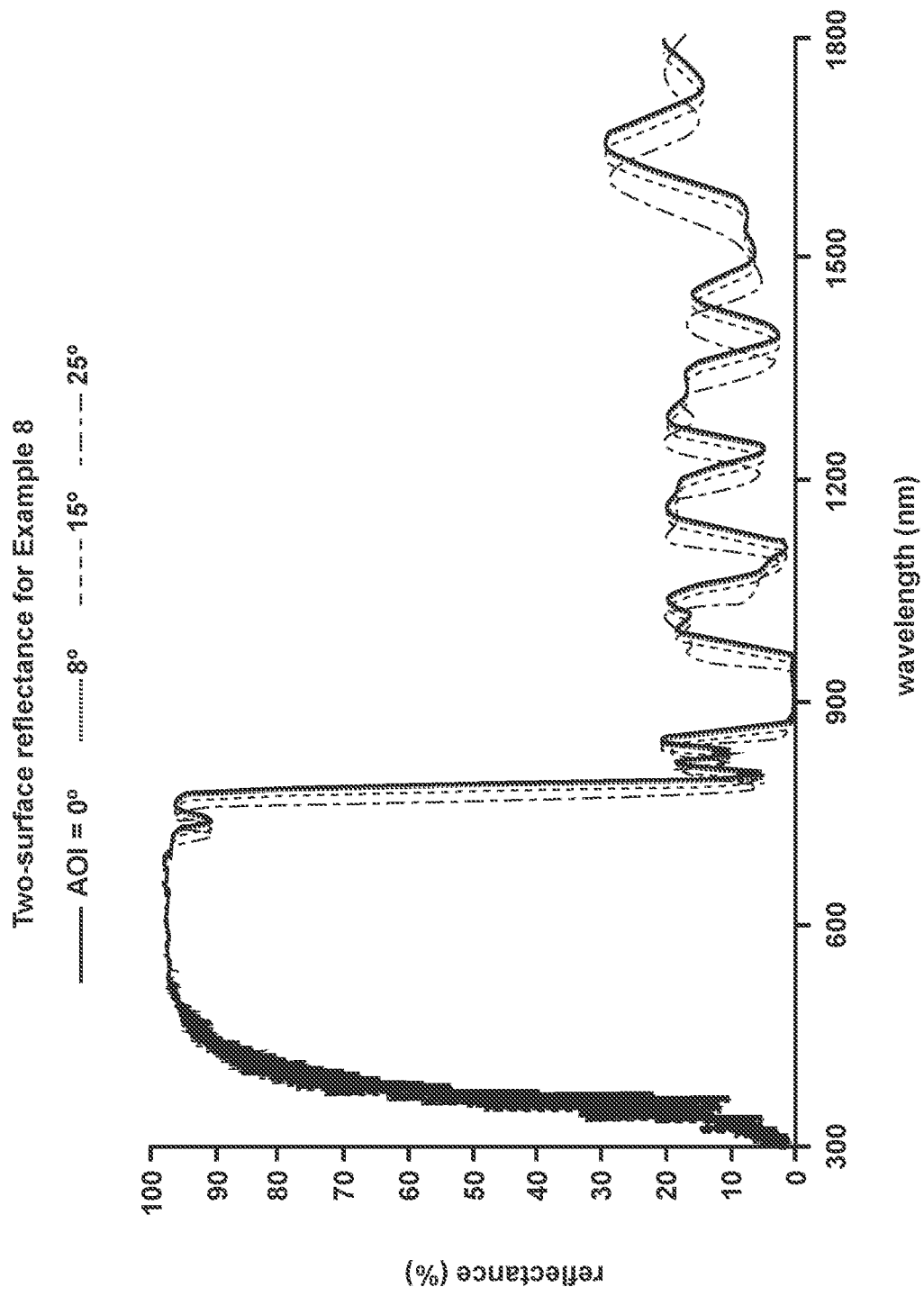
FIG. 14E is a graph of percentage reflectance off of the window described in FIG. 14A, illustrating a percentage reflectance below about 20% for wavelengths within the range of about 850 nm to about 1600 nm but above 95% for wavelengths within the range of about 450 nm to about 750 nm.

The graph reproduced at FIG. 13A reveals that the window 24 of Example 7 has a transmittance above 95% at all angles of incidence between 0° to 25° for the 905 nm wavelength and surrounding range of from approximately 875 nm to approximately 920 nm. The graph reproduced at FIG. 13B reveals that the window 24 of Example 7 has a transmittance above 80% for the wavelength range from approximately 870 nm to approximately 1800 nm, but a transmittance below 20% in the visible wavelength range of 380 nm to 700 nm. The graph reproduced at FIG. 13C reveals that the terminal surface 44 has a reflectance of less than 1% for the 905 nm wavelength at all angles of incidence from 0° to 25°. The graph reproduced at FIG. 13D reveals that the terminal surface 44 has a reflectance of less than 15% throughout the wavelength range of 800 nm to 1800 nm, with a reflectance of less than 5% at the 1550 nm wavelength for angles of incidence from 0° to 15°. In addition, the terminal surface 44 has a reflectance of above 80% for the visible wavelength range of 450 nm to 700 nm, peaking at approximately 98% reflectance.

Example 8—The window 24 of Example 8 included a layered film 36 of nine (9) alternating layers of a high refractive index material 40 (Si$_3$N$_4$) and a lower refractive index material 42 (SiO$_2$) sequentially disposed on top of one another, disposed on a first surface 32 of a strengthened aluminosilicate substrate 30, as shown in Table 7. In addition, the window 24 of Example 8 included a second layered film 38 of eighty-one (81) alternating layers disposed on a second surface 34 of the strengthened aluminosilicate substrate 30, as shown in Table 8.

TABLE 8

Structure of Example 8

| Layer | Material | Refractive Index @905 nm | Physical Thickness (nm) |
|---|---|---|---|
| External Environment 26 | Air | 1 | |
| 1 | $SiO_2$ | 1.4685 | 157.4 |
| 2 | $Si_3N_4$ | 1.9805 | 153.1 |
| 3 | $SiO_2$ | 1.4685 | 14.4 |
| 4 | $Si_3N_4$ | 1.9805 | 5000.0 |
| 5 | $SiO_2$ | 1.4685 | 25.9 |
| 6 | $Si_3N_4$ | 1.9805 | 64.7 |
| 7 | $SiO_2$ | 1.4685 | 79.0 |
| 8 | $Si_3N_4$ | 1.9805 | 22.9 |
| 9 | $SiO_2$ | 1.4685 | 25.0 |
| Substrate 30 | $Si_3N_4$ | 1.5049 | 1000000.0 |
| 1 | $SiO_2$ | 1.4685 | 70.5 |
| 2 | $Si_3N_4$ | 1.9805 | 39.0 |
| 3 | $SiO_2$ | 1.4685 | 83.7 |
| 4 | $Si_3N_4$ | 1.9805 | 46.9 |
| 5 | $SiO_2$ | 1.4685 | 78.3 |
| 6 | $Si_3N_4$ | 1.9805 | 47.4 |
| 7 | $SiO_2$ | 1.4685 | 77.7 |
| 8 | $Si_3N_4$ | 1.9805 | 47.5 |
| 9 | $SiO_2$ | 1.4685 | 74.1 |
| 10 | $Si_3N_4$ | 1.9805 | 47.1 |
| 11 | $SiO_2$ | 1.4685 | 74.2 |
| 12 | $Si_3N_4$ | 1.9805 | 48.1 |
| 13 | $SiO_2$ | 1.4685 | 73.1 |
| 14 | $Si_3N_4$ | 1.9805 | 48.4 |
| 15 | $SiO_2$ | 1.4685 | 74.8 |
| 16 | $Si_3N_4$ | 1.9805 | 50.0 |
| 17 | $SiO_2$ | 1.4685 | 71.9 |
| 18 | $Si_3N_4$ | 1.9805 | 50.3 |
| 19 | $SiO_2$ | 1.4685 | 75.2 |
| 20 | $Si_3N_4$ | 1.9805 | 50.9 |
| 21 | $SiO_2$ | 1.4685 | 73.5 |
| 22 | $Si_3N_4$ | 1.9805 | 53.8 |
| 23 | $SiO_2$ | 1.4685 | 81.4 |
| 24 | $Si_3N_4$ | 1.9805 | 60.0 |
| 25 | $SiO_2$ | 1.4685 | 94.9 |
| 26 | $Si_3N_4$ | 1.9805 | 64.7 |
| 27 | $SiO_2$ | 1.4685 | 86.2 |
| 28 | $Si_3N_4$ | 1.9805 | 57.0 |
| 29 | $SiO_2$ | 1.4685 | 74.9 |
| 30 | $Si_3N_4$ | 1.9805 | 59.1 |
| 31 | $SiO_2$ | 1.4685 | 98.2 |
| 32 | $Si_3N_4$ | 1.9805 | 65.7 |
| 33 | $SiO_2$ | 1.4685 | 79.7 |
| 34 | $Si_3N_4$ | 1.9805 | 56.0 |
| 35 | $SiO_2$ | 1.4685 | 82.0 |
| 36 | $Si_3N_4$ | 1.9805 | 62.8 |
| 37 | $SiO_2$ | 1.4685 | 95.6 |
| 38 | $Si_3N_4$ | 1.9805 | 61.0 |
| 39 | $SiO_2$ | 1.4685 | 82.2 |
| 40 | $Si_3N_4$ | 1.9805 | 61.2 |
| 41 | $SiO_2$ | 1.4685 | 83.1 |
| 42 | $Si_3N_4$ | 1.9805 | 56.0 |
| 43 | $SiO_2$ | 1.4685 | 147.0 |
| 44 | $Si_3N_4$ | 1.9805 | 61.4 |
| 45 | $SiO_2$ | 1.4685 | 85.9 |
| 46 | $Si_3N_4$ | 1.9805 | 90.8 |
| 47 | $SiO_2$ | 1.4685 | 91.7 |
| 48 | $Si_3N_4$ | 1.9805 | 56.9 |
| 49 | $SiO_2$ | 1.4685 | 103.1 |
| 50 | $Si_3N_4$ | 1.9805 | 85.1 |
| 51 | $SiO_2$ | 1.4685 | 90.8 |
| 52 | $Si_3N_4$ | 1.9805 | 71.1 |
| 53 | $SiO_2$ | 1.4685 | 110.6 |
| 54 | $Si_3N_4$ | 1.9805 | 99.6 |
| 55 | $SiO_2$ | 1.4685 | 98.2 |
| 56 | $Si_3N_4$ | 1.9805 | 74.0 |
| 57 | $SiO_2$ | 1.4685 | 87.2 |
| 58 | $Si_3N_4$ | 1.9805 | 60.6 |
| 59 | $SiO_2$ | 1.4685 | 129.9 |
| 60 | $Si_3N_4$ | 1.9805 | 81.0 |
| 61 | $SiO_2$ | 1.4685 | 76.0 |
| 62 | $Si_3N_4$ | 1.9805 | 114.9 |
| 63 | $SiO_2$ | 1.4685 | 79.6 |
| 64 | $Si_3N_4$ | 1.9805 | 120.5 |
| 65 | $SiO_2$ | 1.4685 | 93.7 |
| 66 | $Si_3N_4$ | 1.9805 | 112.7 |
| 67 | $SiO_2$ | 1.4685 | 92.6 |
| 68 | $Si_3N_4$ | 1.9805 | 74.7 |
| 69 | $SiO_2$ | 1.4685 | 120.9 |
| 70 | $Si_3N_4$ | 1.9805 | 111.8 |
| 71 | $SiO_2$ | 1.4685 | 78.2 |
| 72 | $Si_3N_4$ | 1.9805 | 121.3 |
| 73 | $SiO_2$ | 1.4685 | 86.0 |
| 74 | $Si_3N_4$ | 1.9805 | 141.3 |
| 75 | $SiO_2$ | 1.4685 | 82.7 |
| 76 | $Si_3N_4$ | 1.9805 | 66.7 |
| 77 | $SiO_2$ | 1.4685 | 180.0 |
| 78 | $Si_3N_4$ | 1.9805 | 51.6 |
| 79 | $SiO_2$ | 1.4685 | 140.4 |
| 80 | $Si_3N_4$ | 1.9805 | 153.9 |
| 81 | $SiO_2$ | 1.4685 | 146.4 |
| Medium Within Enclosure 20 | Air | 1 | |

The window 24 of Example 8 demonstrates that the layered film 36 with the relatively thick layer 4 of the high refractive index material 40 ($Si_3N_4$) can be disposed on the first surface 32 of the substrate 30 to maximize scratch and impact resistance of the window 24. In addition, the window 24 of Example 8 demonstrates that the majority of the optical filtering layers that the second layered film 38 provides can be disposed below and protected by the relatively much larger thickness of the substrate 30. This second layered film 38 thus does not need to have a relatively thick layer of the high refractive index material 40 to provide scratch and impact resistance as in the layered film 36. Rather, the second layered film 38 can serve as the optical layering that facilitates reflection of wavelengths within the visible range.

Two-sided reflectance and transmittance are the most appropriate metrics for this two-side coated example. The graphs reproduced at FIGS. 14A-14E reveal high reflectance of wavelengths within the visible spectrum, such as greater than 90% within the range from 450 nm to 750 nm, greater than 95% within the range from 500 nm to 700 nm, greater than 97% within the range from 500 nm to 700 nm, and peaking above 98%. Two-sided transmittance is less than 10% for visible wavelengths from 370 nm to 770 nm and less than 3.2% for wavelengths from 400 nm to 700 nm, for all angles of incidence up to 25°. However, two-sided transmittance is greater than 78% throughout the wavelength range from 800 nm to 1600 nm. In addition, the graphs reveal less than 22% reflectance of wavelengths within the range from 800 nm to 1600 nm for all angles incidence up to 15° and less than 1% at 905 nm wavelength range for all angles of incidence up to 25°.

Aspect (1) of this disclosure pertains to a window for a sensing system comprising: a substrate having a predetermined thickness and an index of refraction for electromagnetic radiation having a wavelength of 905 nm; a layered film disposed on the substrate, the layered film comprising alternating layers of a high refractive index material and a lower refractive index material, the high refractive index material having a higher refractive index than the lower refractive index material, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and a hardness of at least 10 GPa, at the layered film, as measured by the Berkovich Indenter Hardness Test.

Aspect (2) pertains to the window of Aspect (1), wherein the substrate is a glass substrate.

Aspect (3) pertains to the window of Aspect (2), wherein the glass substrate is an alkali aluminosilicate or alkali aluminoborosilicate glass with a surface and a region contiguous with the surface that is under compressive stress.

Aspect (4) pertains to the window of any one of Aspects (1) through (3), wherein the thickness of the substrate is between about 1 mm and about 5 mm.

Aspect (5) pertains to the window of Aspect (3), wherein the glass substrate has a thickness of about 1 mm, the compressive stress has a maximum absolute value of at least 600 MPa, and the region under compressive stress has a depth of compression of at least 20 μm.

Aspect (6) pertains to the window of Aspect (1), wherein the substrate comprises an acrylic sheet that has a transmittance of less than 1% for a range of wavelengths within the visible spectrum, and a transmittance of greater than 85% at a wavelength of 905 nm.

Aspect (7) pertains to the window of any one of Aspects (1) through (6), wherein: the index of refraction for the substrate is from about 1.45 to about 1.55; the index of refraction for the high refractive index material is from about 1.7 to about 3.0; and the index of refraction for the lower refractive index material is from about 1.3 to about 1.6.

Aspect (8) pertains to the window of any one of Aspects (1) through (7), wherein the layered film comprises a quantity of layers, and wherein the quantity of layers, as well as the thicknesses of the alternating layers, are configured so that the window has a transmittance of at least 95% for electromagnetic radiation having a wavelength within the range of 850 nm to 950 nm.

Aspect (9) pertains to the window of any one of Aspects (1) through (8), wherein the lower refractive index material comprises one or more of $SiO_2$, $Al_2O_3$, $AlO_xN_y$, and $SiO_xN_y$, and the high refractive index material comprises one or more of $Si_3N_4$, $SiN_x$, $AlN_x$, $SiO_xN_y$, $AlO_xN_y$, the oxygen content in $SiO_xN_y$, $AlO_xN_y$ for the high refractive index material being lower than the oxygen content in $SiO_xN_y$, $AlO_xN_y$ for the lower refractive index material, and the nitrogen content in $SiO_xN_y$, $AlO_xN_y$ for the high refractive index material being higher than the nitrogen content in $SiO_xN_y$, $AlO_xN_y$ for the lower refractive index material.

Aspect (10) pertains to the window of any one of Aspects (1) through (9), wherein: the substrate is a glass substrate; the lower refractive index material is $SiO_2$; and the high refractive index material is $Si_3N_4$.

Aspect (11) pertains to the window of any one of Aspects (1) through (10), wherein: the substrate is a glass substrate, the layer of the layered film that is closest to the glass substrate is the lower refractive index material, and the layer of the layered film that is farthest from the glass substrate is the lower refractive index material.

Aspect (12) pertains to the window of any one of Aspects (1) through (11), wherein the layered film has a thickness, and wherein the layered film comprises a layer of the high refractive index material that has a thickness that is 50% or more of the thickness of the layered film.

Aspect (13) pertains to the window of Aspect (12), wherein the layer of the high refractive index material that has a thickness that is 50% or more of the thickness of the layered film has a thickness of between about 500 nm and about 10,000 nm.

Aspect (14) pertains to the window of any one of Aspects (1) through (13), wherein the layer of the layered film that is farthest away from the glass substrate forms a terminal surface material of the window, the terminal surface material of the window having a thickness that is between about 130 nm and about 180 nm and comprising the lower refractive index material.

Aspect (15) pertains to the window of Aspect (13), wherein the thickness of the layered film is between about 1 μm and about 10 μm.

Aspect (16) pertains to the window of any one of Aspects (1) through (15), wherein the layer of the layered film that is farthest away from the glass substrate forms a terminal surface material of the window, the terminal surface material of the window comprising the lower refractive index material, and wherein the thickest layer of the high refractive index material in the layered film is adjacent to the terminal surface material of the window.

Aspect (17) pertains to the window of any one of Aspects (1) through (16), wherein the thicknesses of the alternating layers of the layered film are configured so that the window has: (a) an average transmittance of greater than 95% for electromagnetic radiation having a wavelength of 905 nm; and (b) an average reflectance of less than 1% at an angle of incidence from 0° to 8° for electromagnetic radiation having a wavelength of 905 nm.

Aspect (18) pertains to the window of Aspect (17), wherein the thicknesses of the alternating layers of the layered film are configured so that the window has an average transmittance of greater than 80% for electromagnetic radiation having a wavelength of 1550 nm.

Aspect (19) pertains to the window of Aspect (17), wherein the thicknesses of the alternating layers of the layered film are configured so that the window has an average reflectance of more than 80% at an angle of incidence within the range of 0° to 8° for electromagnetic radiation having wavelengths within the range of 400 nm to 700 nm of.

Aspect (20) pertains to the window of any one of Aspects (1) through (19), wherein the substrate comprises a first surface, on which the layered film is disposed, and a second surface on which a second layered film is disposed, the second layered film comprising alternating layers of the high refractive index material and the lower refractive index material, wherein both the layered film and the second layered film comprise a quantity of layers each having a thickness, the quantity of layers for both the layered film and the second layered film, as well as the thicknesses of the alternating layers of both the layered film and the second layered film, being configured so that the window has a transmittance of at least 80% for electromagnetic radiation having a wavelength within the range of 850 nm to 950 nm, and wherein the layered film includes the thickest layer of the high refractive index material of the window.

Aspect (21) pertains to the window of any one of Aspects (1) through (20), wherein the sensing system comprises a LIDAR system.

Aspect (22) pertains to a window for a sensing system comprising: a glass substrate having a predetermined thickness and an index of refraction for electromagnetic radiation having a wavelength of 905 nm; a layered film disposed on the glass substrate, the layered film including a quantity of at least seven alternating layers of $Si_3N_4$ and $SiO_2$, the layers of $Si_3N_4$ having a higher refractive index than the layers of $SiO_2$, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and a hardness of at least 8 GPa, at the layered film, as measured by the Berkovich Indenter Hardness Test.

Aspect (23) pertains to the window of Aspect (22), wherein the hardness, at the layered film, as measured by the Berkovich Indenter Hardness Test is at least 10 GPa.

Aspect (24) pertains to the window of any one of Aspects (22) through (23), wherein the layer of $SiO_2$ that is farthest away from the glass substrate comprises a terminal surface material of the window, and wherein the thickest layer of $Si_3N_4$ in the layered film is adjacent to the terminal surface material.

Aspect (25) pertains to the window of any one of Aspects (22) through (24), wherein the thickest layer of $Si_3N_4$ in the layered film has a thickness within the range of about 500 nm to about 10,000 nm.

Aspect (26) pertains to the window of any one of Aspects (22) through (25), wherein the thicknesses of the alternating layers are configured so that the window has: (a) an average transmittance of greater than 95% for electromagnetic radiation having a wavelength of 905 nm; and (b) an average reflectance of less than 1% at an angle of incidence within the range of 0° to 8° for electromagnetic radiation having a wavelength of 905 nm.

Aspect (27) pertains to the window of any one of Aspects (22) through (25), wherein the thicknesses of the alternating layers are configured so that the window has an average transmittance of greater than 80% for electromagnetic radiation having a wavelength of 1550 nm.

Aspect (28) pertains to the window of any one of Aspects (22) through (25), wherein the thicknesses of the alternating layers are configured so that the window has an average reflectance of more than 80% at an angle of incidence within the range of 0° to 8° for electromagnetic radiation having wavelengths within the range of 400 nm to 700 nm.

Aspect (29) pertains to the window of any one of Aspects (22) through (28), wherein the sensing system comprises a LIDAR system.

It will be apparent to those skilled in the art that various modifications and variations can be made without departing from the spirit or scope of the claims.

What is claimed is:

1. A window for a sensing system comprising:
a substrate having a predetermined thickness and an index of refraction for electromagnetic radiation having a wavelength of 905 nm;
a layered film disposed on the substrate, the layered film comprising alternating layers of a high refractive index material and a lower refractive index material, the high refractive index material having a higher refractive index than the lower refractive index material and comprising one or more of $Si_3N_4$, $SiN_x$, $AlN_x$, $SiO_xN_y$, and $AlO_xN_y$, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and
a hardness of at least 10 GPa, at the layered film, as measured by the Berkovich Indenter Hardness Test.

2. The window of claim 1, wherein the substrate comprises an acrylic sheet that has a transmittance of less than 1% for a range of wavelengths within the visible spectrum, and a transmittance of greater than 85% at a wavelength of 905 nm.

3. The window of claim 1, wherein the layered film comprises a quantity of layers, and wherein the quantity of layers, as well as the thicknesses of the alternating layers, are configured so that the window has a transmittance of at least 95% for electromagnetic radiation having a wavelength within the range of 850 nm to 950 nm.

4. The window of claim 1, wherein the lower refractive index material comprises one or more of $SiO_2$, $Al_2O_3$, $AlO_xN_y$, and $SiO_xN_y$, the oxygen content in $SiO_xN_y$, $AlO_xN_y$ for the high refractive index material being lower than the oxygen content in $SiO_xN_y$, $AlO_xN_y$ for the lower refractive index material, and the nitrogen content in $SiO_xN_y$, $AlO_xN_y$ for the high refractive index material being higher than the nitrogen content in $SiO_xN_y$, $AlO_xN_y$ for the lower refractive index material.

5. The window of claim 1, wherein the thicknesses of the alternating layers of the layered film are configured so that the window has: (a) an average transmittance of greater than 95% for electromagnetic radiation having a wavelength of 905 nm; and (b) an average reflectance of less than 1% at an angle of incidence from 0° to 8° for electromagnetic radiation having a wavelength of 905 nm.

6. The window of claim 5, wherein:
the thicknesses of the alternating layers of the layered film are configured so that the window has an average transmittance of greater than 80% for electromagnetic radiation having a wavelength of 1550 nm, and
the thicknesses of the alternating layers of the layered film are configured so that the window has an average reflectance of more than 80% at an angle of incidence within the range of 0° to 8° for electromagnetic radiation having wavelengths within the range of 400 nm to 700 nm.

7. The window of claim 1, wherein the substrate comprises a first surface, on which the layered film is disposed, and a second surface on which a second layered film is disposed, the second layered film comprising alternating layers of the high refractive index material and the lower refractive index material,
wherein both the layered film and the second layered film comprise a quantity of layers each having a thickness, the quantity of layers for both the layered film and the second layered film, as well as the thicknesses of the alternating layers of both the layered film and the second layered film, being configured so that the window has a transmittance of at least 80% for electromagnetic radiation having a wavelength within the range of 850 nm to 950 nm, and
wherein the layered film includes the thickest layer of the high refractive index material of the window.

8. The window of claim 1, wherein the sensing system comprises a LIDAR system.

9. A window for a sensing system comprising:
a substrate having a predetermined thickness and an index of refraction for electromagnetic radiation having a wavelength of 905 nm;
a layered film disposed on the substrate, the layered film comprising alternating layers of a high refractive index material and a lower refractive index material, the high refractive index material having a higher refractive index than the lower refractive index material, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and a hardness of at least 10 GPa, at the layered film, as measured by the Berkovich Indenter Hardness Test, wherein the substrate is a glass substrate formed of an alkali aluminosilicate or alkali aluminoborosilicate glass with a surface and a region contiguous with the surface that is under compressive stress.

10. The window of claim 9, wherein the glass substrate has a thickness between about 1 mm and about 5 mm, the compressive stress has a maximum absolute value of at least 600 MPa, and the region under compressive stress has a depth of compression of at least 20 μm.

11. A window for a sensing system comprising:
a substrate having a predetermined thickness and an index of refraction for electromagnetic radiation having a wavelength of 905 nm;
a layered film disposed on the substrate, the layered film comprising alternating layers of a high refractive index material and a lower refractive index material, the high refractive index material having a higher refractive index than the lower refractive index material, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and
a hardness of at least 10 GPa, at the layered film, as measured by the Berkovich Indenter Hardness Test, wherein the layered film has a thickness, and wherein the layered film comprises a layer of the high refractive index material that has a thickness that is 50% or more of the thickness of the layered film.

12. The window of claim 11, wherein the layer of the high refractive index material has a thickness of between about 500 nm and about 10,000 nm.

13. A window for a sensing system comprising:
a substrate having a predetermined thickness and an index of refraction for electromagnetic radiation having a wavelength of 905 nm;
a layered film disposed on the substrate, the layered film comprising alternating layers of a high refractive index material and a lower refractive index material, the high refractive index material having a higher refractive index than the lower refractive index material, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and a hardness of at least 10 GPa, at the layered film, as measured by the Berkovich Indenter Hardness Test, wherein the layer of the layered film that is farthest away from the glass substrate forms a terminal surface material of the window, the terminal surface material of the window comprising the lower refractive index material, and
wherein the terminal surface material of the window has a thickness that is between about 130 nm and about 180 nm or wherein the thickest layer of the high refractive index material in the layered film is adjacent to the terminal surface material of the window.

14. A window for a sensing system comprising:
a glass substrate having a predetermined thickness and an index of refraction for electromagnetic radiation having a wavelength of 905 nm;
a layered film disposed on the glass substrate, the layered film including a quantity of at least seven alternating layers of $Si_3N_4$ and $SiO_2$, the layers of $Si_3N_4$ having a higher refractive index than the layers of $SiO_2$, wherein each layer of the alternating layers of the layered film has a thickness, and the thicknesses of the alternating layers are configured so that the window has a transmittance of at least 80% for electromagnetic radiation having a wavelength within the range of 850 nm to 950 nm; and
a hardness of at least 8 GPa, at the layered film, as measured by the Berkovich Indenter Hardness Test.

15. The window of claim 14, wherein the hardness, at the layered film, as measured by the Berkovich Indenter Hardness Test is at least 10 GPa.

16. The window of claim 14, wherein the layer of $SiO_2$ that is farthest away from the glass substrate comprises a terminal surface material of the window, and wherein the thickest layer of $Si_3N_4$ in the layered film is adjacent to the terminal surface material.

17. The window of claim 14, wherein the thickest layer of $Si_3N_4$ in the layered film has a thickness within the range of about 500 nm to about 10,000 nm.

18. The window of claim 14, wherein the thicknesses of the alternating layers are configured so that the window has: (a) an average transmittance of greater than 95% for electromagnetic radiation having a wavelength of 905 nm; (b) an average reflectance of less than 1% at an angle of incidence within the range of 0° to 8° for electromagnetic radiation having a wavelength of 905 nm, and an average reflectance of more than 80% at an angle of incidence within the range of 0° to 8° for electromagnetic radiation having wavelengths within the range of 400 nm to 700 nm.

19. The window of claim 14, wherein the thicknesses of the alternating layers are configured so that the window has an average transmittance of greater than 80% for electromagnetic radiation having a wavelength of 1550 nm.

* * * * *